United States Patent
van Os

(12) 
(10) Patent No.: US 8,456,297 B2
(45) Date of Patent: Jun. 4, 2013

(54) DEVICE, METHOD, AND GRAPHICAL USER INTERFACE FOR TRACKING MOVEMENT ON A MAP

(75) Inventor: Marcel van Os, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 283 days.

(21) Appl. No.: 12/789,440

(22) Filed: May 27, 2010

(65) Prior Publication Data

US 2011/0163874 A1    Jul. 7, 2011

Related U.S. Application Data

(66) Substitute for application No. 61/292,643, filed on Jan. 6, 2010.

(51) Int. Cl.
*G08B 1/08* (2006.01)

(52) U.S. Cl.
USPC ............ 340/539.13; 340/539.26; 340/539.32; 340/5.65; 340/5.91; 340/425.5; 340/531; 340/905; 340/995.1; 345/173; 345/619; 345/633; 345/650; 345/676; 455/456.2; 455/466; 455/566

(58) Field of Classification Search
USPC ................. 340/539.13, 539.26, 539.32, 5.65, 340/5.91, 425.5, 531, 905, 995.1; 345/173, 345/619, 633, 650, 676; 455/456.2, 466, 455/566
See application file for complete search history.

(56) References Cited

U.S. PATENT DOCUMENTS

| | | | |
|---|---|---|---|
| 5,416,890 A | 5/1995 | Beretta | ......................... 395/131 |
| 5,608,635 A | 3/1997 | Tamai | |
| 5,760,773 A | 6/1998 | Berman et al. | ................ 345/347 |
| 5,825,352 A | 10/1998 | Bisset et al. | |
| 5,877,751 A | 3/1999 | Kanemitsu et al. | ........... 345/173 |
| 6,009,462 A | 12/1999 | Birrell et al. | |
| 6,040,824 A | 3/2000 | Maekawa et al. | |
| 6,115,025 A | 9/2000 | Buxton et al. | |

(Continued)

FOREIGN PATENT DOCUMENTS

| DE | 10 2005 047 648 A1 | 4/2007 |
|---|---|---|
| DE | 10 2008 008 948 A1 | 8/2009 |

(Continued)

OTHER PUBLICATIONS

AV Bros., "AV Bros. Page Curl 2.0 for Windows and Mac OS X," AV Bros. Curl 2.0 User Guide, 2004, 26 pages, http://c0002649.cdn2.cloudfiles.rackspacecloud.com/avpagecurl20.pdf.

(Continued)

*Primary Examiner* — Tai T Nguyen
(74) *Attorney, Agent, or Firm* — Morgan, Lewis & Bockius LLP

(57) ABSTRACT

A method includes: receiving location information for the portable electronic device; and entering a tracked mode of a mapping application. The tracked mode includes: displaying a map on the display with an orientation that is independent of a current orientation of the portable electronic device; displaying a current location icon on the map that corresponds to a current location of the portable electronic device; and maintaining the current location icon in a predefined area on the display as the current location of the portable electronic device changes. The method also includes moving the current location icon along a boundary of the predefined area on the display in accordance with movement of the current location of the portable electronic device.

31 Claims, 60 Drawing Sheets

U.S. PATENT DOCUMENTS

| | | |
|---|---|---|
| 6,380,931 B1 | 4/2002 | Gillespie et al. |
| 6,600,502 B1 | 7/2003 | Brewster, Jr. |
| 6,667,751 B1 | 12/2003 | Wynn et al. |
| 6,687,613 B2 | 2/2004 | Yokota |
| 6,983,203 B1 | 1/2006 | Wako ............................ 701/208 |
| 7,032,187 B2 | 4/2006 | Keely, Jr. et al. |
| 7,046,230 B2 | 5/2006 | Zadesky et al. |
| 7,047,113 B1 | 5/2006 | Burch et al. |
| 7,366,609 B2 | 4/2008 | Lee |
| 7,376,640 B1 | 5/2008 | Anderson et al. |
| 7,379,811 B2 | 5/2008 | Rasmussen et al. |
| 7,439,969 B2 | 10/2008 | Chithambaram et al. |
| 7,479,949 B2 | 1/2009 | Jobs et al. |
| 7,484,180 B2 | 1/2009 | McCormack et al. |
| 7,495,659 B2 | 2/2009 | Marriott et al. |
| 7,499,040 B2 | 3/2009 | Zadesky et al. |
| 7,640,100 B2 | 12/2009 | Spinelli |
| 7,656,393 B2 | 2/2010 | King et al. |
| 7,663,607 B2 | 2/2010 | Hotelling et al. |
| 7,676,767 B2 | 3/2010 | Hofmeister et al. |
| 7,728,821 B2 | 6/2010 | Hillis et al. |
| 7,768,395 B2 | 8/2010 | Gold |
| 7,797,642 B1 | 9/2010 | Karam |
| 7,800,592 B2 | 9/2010 | Kerr et al. |
| 7,808,479 B1 | 10/2010 | Hotelling et al. |
| 7,812,826 B2 | 10/2010 | Ording et al. |
| 7,831,917 B1 | 11/2010 | Karam |
| 7,840,350 B2 | 11/2010 | Spinelli |
| 7,890,886 B2 | 2/2011 | Matthews et al. |
| 7,907,124 B2 | 3/2011 | Hillis et al. |
| 7,945,546 B2 | 5/2011 | Bliss et al. |
| 8,095,303 B1 | 1/2012 | Nesbitt et al. |
| 8,171,432 B2 | 5/2012 | Matas et al. |
| 2001/0020211 A1 | 9/2001 | Takayama et al. |
| 2001/0045949 A1 | 11/2001 | Chithambaram et al. |
| 2002/0087262 A1 | 7/2002 | Bullock et al. |
| 2002/0183924 A1 | 12/2002 | Yokota |
| 2003/0177265 A1 | 9/2003 | Page et al. |
| 2004/0243307 A1 | 12/2004 | Geelen ........................ 701/213 |
| 2005/0114021 A1 | 5/2005 | Krull et al. .................... 701/211 |
| 2005/0251331 A1 | 11/2005 | Kreft ............................ 701/207 |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0047416 A1 | 3/2006 | Goldberg et al. |
| 2006/0143574 A1 | 6/2006 | Ito et al. |
| 2006/0181517 A1 | 8/2006 | Zadesky et al. |
| 2006/0197753 A1 | 9/2006 | Hotelling |
| 2006/0224311 A1 | 10/2006 | Watanabe et al. |
| 2006/0239248 A1 | 10/2006 | Hawk et al. |
| 2006/0284852 A1 | 12/2006 | Hofmeister et al. |
| 2007/0124062 A1 | 5/2007 | Janky et al. |
| 2007/0168888 A1 | 7/2007 | Jawerth |
| 2007/0189737 A1 | 8/2007 | Chaudhri et al. |
| 2007/0225904 A1 | 9/2007 | Pantalone et al. |
| 2007/0273664 A1 | 11/2007 | Kim et al. |
| 2008/0036743 A1 | 2/2008 | Westerman et al. |
| 2008/0040315 A1 | 2/2008 | Auerbach et al. |
| 2008/0055263 A1 | 3/2008 | Lemay et al. |
| 2008/0055269 A1 | 3/2008 | Lemay et al. |
| 2008/0086356 A1 | 4/2008 | Glassman et al. |
| 2008/0088602 A1 | 4/2008 | Hotelling |
| 2008/0122796 A1 | 5/2008 | Jobs et al. |
| 2008/0165153 A1 | 7/2008 | Platzer et al. |
| 2008/0167809 A1 | 7/2008 | Geelen |
| 2008/0168396 A1 | 7/2008 | Matas et al. |
| 2008/0172357 A1 | 7/2008 | Rechis et al. |
| 2008/0208456 A1 | 8/2008 | Jouline et al. |
| 2008/0228386 A1* | 9/2008 | Geelen et al. ................. 701/201 |
| 2008/0320391 A1 | 12/2008 | Lemay et al. |
| 2008/0320419 A1 | 12/2008 | Matas et al. |
| 2009/0024590 A1 | 1/2009 | Sturge et al. |
| 2009/0058820 A1 | 3/2009 | Hinckley |
| 2009/0064055 A1 | 3/2009 | Chaudhri et al. |
| 2009/0172599 A1* | 7/2009 | Nezu ............................ 715/841 |
| 2009/0177385 A1 | 7/2009 | Matas et al. |
| 2009/0178007 A1 | 7/2009 | Matas et al. |
| 2009/0244023 A1 | 10/2009 | Kim et al. |
| 2009/0281724 A1 | 11/2009 | Blumenberg et al. |
| 2009/0295753 A1 | 12/2009 | King et al. |
| 2010/0031186 A1 | 2/2010 | Tseng et al. |
| 2010/0225607 A1 | 9/2010 | Kim |
| 2010/0293186 A1 | 11/2010 | Nambata et al. |
| 2010/0309149 A1* | 12/2010 | Blumenberg et al. ......... 345/173 |
| 2010/0312462 A1 | 12/2010 | Guéziec et al. |
| 2011/0041084 A1 | 2/2011 | Karam |
| 2011/0045868 A1 | 2/2011 | Sheha et al. |
| 2012/0011137 A1 | 1/2012 | Sheha et al. |

FOREIGN PATENT DOCUMENTS

| | | |
|---|---|---|
| EP | 0 908 835 A2 | 4/1999 |
| EP | 1 653 376 A2 | 5/2006 |
| EP | 1 840 511 A1 | 10/2007 |
| WO | WO 97/07467 A1 | 2/1997 |
| WO | WO 98/07112 A2 | 2/1998 |
| WO | WO 03/017120 A1 | 2/2003 |
| WO | WO 2004/076977 A1 | 9/2004 |
| WO | WO 2005/104039 A2 | 11/2005 |
| WO | WO 2009/002942 A2 | 12/2008 |

OTHER PUBLICATIONS

Dornfest. "Google Hacks." Third Edition, Aug. 3, 2006, O'Reilly Media, Inc., 5 pages.

Google, "Google Maps Shows Real-Time Traffic Data," Google Operating System, Feb. 28, 2007, 1 pg., http://googlesystem.blogspot.com/2007/02/google-maps-shows-real-time-traffic.html.

Gralla, "Google™ Search and Tools in a Snap," Sams, Apr. 4, 2006, 15 pages.

Holthe et al., "Video Browsing Techniques for Web Interfaces," 2005, 5 pages, http://ieeexplore.ieee.org/Xplore/login.jsp?url= http%3A%2F%2Fieeexplore.ieee.org%2Fstamp.jsp%3Farnumber%3D01593233&authDecision=-203.

Mio, MioMap v 3.2 User Manual—Navigation software for Mio DigiWalker C310, Aug. 2006 (v1.00), US English version, http://www.gpspassion.com/upload/MioMap_englishUS.pdf, 84 pages.

Mol, H., "Plan Your Trip With Google Maps," Visual Steps, Dec. 2009, 36 pages, http://www.visualsteps.com/downloads/Free_guide_google_maps.pdf.

Pixlewit, "PageFlip," Apr. 11, 2007, 1 page, http://web.archive.org/web/20070419035158/http://www.pixelwit.com/blog/page-flip/.

Invitation to Pay Additional Fees dated Dec. 1, 2011, which corresponds to U.S. Appl. No. 12/788,281 (van Os).

Office Action dated Feb. 25, 2011, received in U.S. Appl. No. 11/969,211 (Matas).

Final Office Action dated Aug. 17, 2011; received in U.S. Appl. No. 11/969,211 (Matas).

Office Action dated Jan. 25, 2011, received in U.S. Appl. No. 12/143,741 (Matas).

Notice of Allowance dated Jul. 12, 2011, received in U.S. Appl. No. 12/143,741 (Matas).

Office Action dated May 17, 2011, received in U.S. Appl. No. 12/143,752 (Matas).

Dalrymple, J., "Google Maps Adds Locator, but not for iPhone," 2007, 1 page, http://news.yahoo.com/s/macworld/20071130/tc_macworld/googlemaps20071130_0&printer=1;_ylt+Auvf3s6LQK_p)ajtb954T_DQni6gB.

DaimlerChrysler, "Usecases Overview Map," 1 page.

Mio, "User's Manual MioMap 2.0," Mio Technology, Aug. 2005, http://web.archive.org/web/200612140000736/http://www.mio-tech.be/Manuals/269+/MioMapV2-Manual/268+_269+_miomap_Manual_EN.pdf.

Mio, Mio 269+ User's Manual, Mio Technology, Aug. 2005, http://www.mio-tech.be/Manuals/269+/Device-Manual/268-plus-269-plus-Device-Manual-EN.pdf.

Windows Moblile 6 Professional Video Tour, Mar. 11, 2007, 4 pages, http://gizmodo.com/gadges/cellphones/windows-mobile-6-professional-video-tour-237039.php.

Windows Moblile Map Contact List, "Windows Live Search for Mobile Goes Final, Still Great," Mar. 11, 2007, http://gizmodo.com/gadgets/software/windows-live-search-for-mobile-goes-final-still-great-236002.php.

Carew, S., "Phones that tell you where to Drive, Meet, Eat," 2 pages, May 26, 2007.

Dalrymple, J., "Google Maps Adds Locator, but not for iPhone," 2007, 1 page, http://news.yahoo.com/s/macworld/20071130/tc_macworld/googlemaps20071130_0&printer=1;_ylt+Auvf3s6LQK_p)ajtb954T_DQni6gB.

Flipping Book, "Premium Page Flipping," Flipping Book.com, downloaded Nov. 12, 2009, 1 page, http://web.archive.org/web/20041207072330/http://www.page-flip.com/.

Google, "Review Guide-Google Maps for Mobile (Beta)," 7 pages, 2006.

iPhone Hacks, "iPhone Software/Hardware Hack: LocoGPS—GPS Add-on for the iPhone," 41 pages, Dec. 25, 2007, http://www.iphonehacks.com/iphone_applications/index.html.

Mio, "User's Manual MioMap 2.0," Mio Technology, Aug. 2005, http://web.archive.org/web/200612140000736/http://www.mio-tech.be/Manuals/269+ /MioMapV2-Manual/268+ _269+ _ miomap_Manual_EN.pdf.

Mio, Mio 269+ User's Manual, Mio Technology, Aug. 2005, http://www.mio-tech.be/Manuals/269+ /Device-Manual/268-plus-269-plus-Device-Manual-EN.pdf.

Mio, "27 Countries in Your Pocket," Mio Technology, Sep. 2005, http://www.mio-tech.be/en/printview/press-releases-2005-09-29.htm.

Navizon, "FAQ, Peer-to Peer Wireless Positioning," 8 pages, Nov. 30, 2007, http://www.navizon.com/FAQ.htm.

Navizon, "How it Works," 7 pages, Nov. 30, 2007, http://www.navizon.com/FullFeatures.htm.

Navizon, "The First Positioning System that Combines GPS, WiFi and Phone Positioning," 2 pages, Nov. 30, 2007, http://www.navizon.com.

Tidwell, J., "Animated Transition," from Designing Interfaces, O'Reilly Media, Inc., Nov. 2005, pp. 84-85.

Waypoints Maplist View, "Featured Projects," Jun. 14, 2007, 3 pages, http://eric.wahlforss.com/folio.

Windows Mobile 6, "Fact Sheet," 2 pages, 2007, www.WindowsMobile.com.

Windows Moblile 6 Professional Video Tour, Mar. 11, 2007, 4 pages, http://gizmodo.com/gadqes/cellphones/windows-mobile-6-professional-video-tour-237039.php.

Windows Moblile Map Contact List, "Windows Live Search for Mobile Goes Final, Still Great," Mar. 11, 2007, http://gizmodo.com/qadgets/software/windows-live-search-for-mobile-goes-final-still-great-236002.php.

Invitation to Pay Additional Fees dated Jul. 29, 2008, received in International Application No. PCT/US2008/050295, which corresponds to U.S. Appl. No. 11/969,211.

International Search Report and Written Opinion dated Jan. 14, 2009, received in International Application No. PCT/US2008/050295, which corresponds to U.S. Appl. No. 11/969,211.

Invitation to Pay Additional Fees dated Oct. 13, 2008, received in International Application No. PCT/US2008/067925, which corresponds to U.S. Appl. No. 12/143,752.

International Search Report and Written Opinion dated Dec. 17, 2008, received in International Application No. PCT/US2008/067925, which corresponds to U.S. Appl. No. 12/143,752.

International Preliminary Report on Patentability dated Jan. 7, 2010, received in International Application No. PCT/US2008/067925, which corresponds to U.S. Appl. No. 12/143,752.

Final Office Action dated Dec. 23, 2011, received in U.S. Appl. No. 12/143,752, 20 pages (Matas).

Notice of Allowance dated Dec. 30, 2011, received in U.S. Appl. No. 12/143,741, 7 pages (Matas).

Office Action dated Feb. 17, 2012, received in U.S. Appl. No. 12/788,281, 14 pages (van Os).

International Search Report and Written Opinion dated Apr. 12, 2012, received in International Application No. PCT/US2010/020229, which corresponds to U.S. Appl. No. 12/788,281, 20 pages (van Os).

Tidwell, J., "Designing Interfaces," Copyright© 2006 O'Reilly Media, Inc., 348 pages.

Westerman, W., "Hand Tracking Finger Identification and Chordic Manipulation on a Multi-touch Surface, " Doctoral Dissertation, submitted Spring 1999, 363 pages.

Office Action dated Jun. 18, 2012, received in U.S. Appl. No. 12/566,668, 40 pages (Blumenberg).

Google, "Google Maps in Search History," Apr. 2005, http://googlesystem.blogspot.com/2006/11/google-maps-in-search-history.html, 1 page.

Office Action dated Sep. 20, 2012, received in U.S. Appl. No. 11/969,211, 30 pages (Matas).

Notice of Allowance dated Sep. 17, 2012, received in U.S. Appl. No. 12/143,752, 13 pages (Matas).

Notice of Allowance dated Oct. 23, 2012, received in U.S. Appl. No. 12/566,668, 12 pages (Blumenberg).

Office Action dated Sep. 26, 2012, received in U.S. Appl. No. 12/788,281 14 pages (Van Os).

Apple.com, "Maps with GPS," Apple.com May 2009, http://www.apple.com/iphone/features/maps.html, 2 pages.

Kim, "Video-In and Magnetometers Could Introduce Interesting iPhone App Possibilities," Mac Rumors, Apr. 8, 2009, http://www.macrumors.com/2009/04/08/video-in-and-magnetometers-could-introduce-interesting-iphone-app-possibilites/, 5 pages.

The Boy Genius, "Magnetometer in next iPhone confirmed?" The Boy Genius Report, May 7, 2009, http://www.boygeniusreport.com/2009/05/07/magnetometer-in-next-iphone-confirmed/, 15 pages.

YouTube, "G-Map for iPhone Demo: 3-Way Map Mode," at 1:03/1:34 Heading-up Mode, 1:34 video uploaded to YouTube by navi0808, on Feb. 13, 2009, http://www.youtube.com/watch?v=QQusXdIXarl&feature=related, 2 pages.

YouTube, "G-Map U.S. iPhone: About menus and basic functions, " at 1:37/5:49 Heading up Map View Mode, 5:49 video uploaded to YouTube by navi0808, on Feb. 24, 2009, http://www.youtube.com/watch?v=tN8uW_rM0Q, 1 page.

YouTube, "G-Map for iPhone: About menus and basic functions," at 1:45/5:49 North-up Map View Mode, 5:49 video uploaded to YouTube by navi0808, on Feb. 24, 2009, http://www.youtube.com/watch?v=tN8uW_rM0Q, 1 page.

YouTube, "G-Map U.S. iPhone Review," 6:29 video uploaded to YouTube by TapCritic, on Mar. 10, 2009, http://www.youtube.com/watch?v=xrWUKwXQwIQ&feature=related, 1 page.

\* cited by examiner

DEVICE, METHOD, AND GRAPHICAL USER INTERFACE FOR TRACKING MOVEMENT ON A MAP

RELATED APPLICATIONS

This application claims priority on U.S. Provisional Application No. 61/292,643, filed Jan. 6, 2010, entitled "Device, Method, and Graphical User Interface for Tracking Movement on a Map," which is incorporated by reference herein in its entirety.

This is related to the following applications: (1) U.S. patent application Ser. No. 11/969,211, filed Jan. 3, 2008, "Portable Multifunction Device, Method, and Graphical User Interface for Providing Maps and Directions;" (2) U.S. patent application Ser. No. 12/143,752, filed Jun. 20, 2008, "Touch Screen Device, Method, and Graphical User Interface for Providing Maps, Directions, and Location-Based Information;" and (3) U.S. patent application Ser. No. 12/566,668, filed Sep. 25, 2009, "Device, Method, and Graphical User Interface for Providing Maps, Directions, and Location-Based Information." All of these applications are incorporated by reference herein in their entirety.

TECHNICAL FIELD

This relates generally to electronic devices with displays, including but not limited to electronic devices with displays that track movements on maps.

BACKGROUND

The use of portable electronic devices that display maps has increased significantly in recent years. Exemplary portable electronic devices that display maps include navigation systems (e.g., global positioning system (GPS) navigation system). Such devices are widely used to track movements on maps.

But existing methods for tracking movements on maps are cumbersome and inefficient. For example, using conventional GPS systems to track movements on maps is tedious and creates a significant cognitive burden on a user. In addition, existing methods take longer than necessary, thereby wasting energy. This latter consideration is particularly important in battery-operated devices.

SUMMARY

Accordingly, there is a need for portable electronic devices with more efficient methods and interfaces for tracking movement on a map. Such methods and interfaces may complement or replace conventional methods for tracking movement on a map. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for portable electronic devices are reduced or eliminated by the disclosed devices. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, in addition to mapping, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at a portable electronic device with a display. The method includes: receiving location information for the portable electronic device; and entering a tracked mode of a mapping application. The tracked mode includes: displaying a map on the display with an orientation that is independent of a current orientation of the portable electronic device; displaying a current location icon on the map that corresponds to a current location of the portable electronic device; and maintaining the current location icon in a predefined area on the display as the current location of the portable electronic device changes. The method also includes moving the current location icon along a boundary of the predefined area on the display in accordance with movement of the current location of the portable electronic device.

In accordance with some embodiments, a method is performed at a portable electronic device with a touch screen display. The method includes: receiving location information for the portable electronic device; and entering a tracked mode of a mapping application. The tracked mode includes: displaying a map on the display with an orientation that is independent of a current orientation of the portable electronic device; displaying a current location icon on the map that corresponds to a current location of the portable electronic device; and maintaining the current location icon in a predefined area on the display as the current location of the portable electronic device changes. The method also includes, while in the tracked mode of the mapping application, detecting a first finger gesture on the touch screen display; and in response to detecting the first finger gesture, translating the map on the display such that the current location icon is located outside a displayed portion of the map. The method further includes detecting a second finger gesture on the touch screen display; in response to detecting the second finger gesture, translating the map on the display such that the current location icon is redisplayed in the predefined area; determining a first length of time when the current location icon is located outside the predefined area; maintaining the tracked mode of the mapping application when the first length of time is less than a first predefined duration; and exiting the tracked mode of the mapping application when the first length of time exceeds the first predefined duration.

In accordance with some embodiments, a portable electronic device includes a display, one or more processors, memory, and one or more programs; the one or more programs are stored in the memory and configured to be executed by the one or more processors and the one or more programs include instructions for performing the operations of any of the methods described above. In accordance with some embodiments, a graphical user interface on a portable electronic device with a display, a memory, and one or more processors to execute one or more programs stored in the memory includes one or more of the elements displayed in any of the methods described above, which are updated in response to inputs, as described in any of the methods above. In accordance with some embodiments, a computer readable storage medium has stored therein instructions which when executed by a portable electronic device with a display, cause the device to perform the operations of any of the methods described above. In accordance with some embodiments, a portable electronic device includes: a display; and means for performing the operations of any of the methods described above. In accordance with some embodiments, an information processing apparatus, for use in a portable electronic device with a display, includes means for performing the operations of any of the methods described above.

Thus, portable electronic devices are provided with faster, more efficient methods and interfaces for tracking movement on a map, thereby increasing the effectiveness, efficiency, and user satisfaction with such devices. Such methods and interfaces may complement or replace conventional methods for tracking movement on a map.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
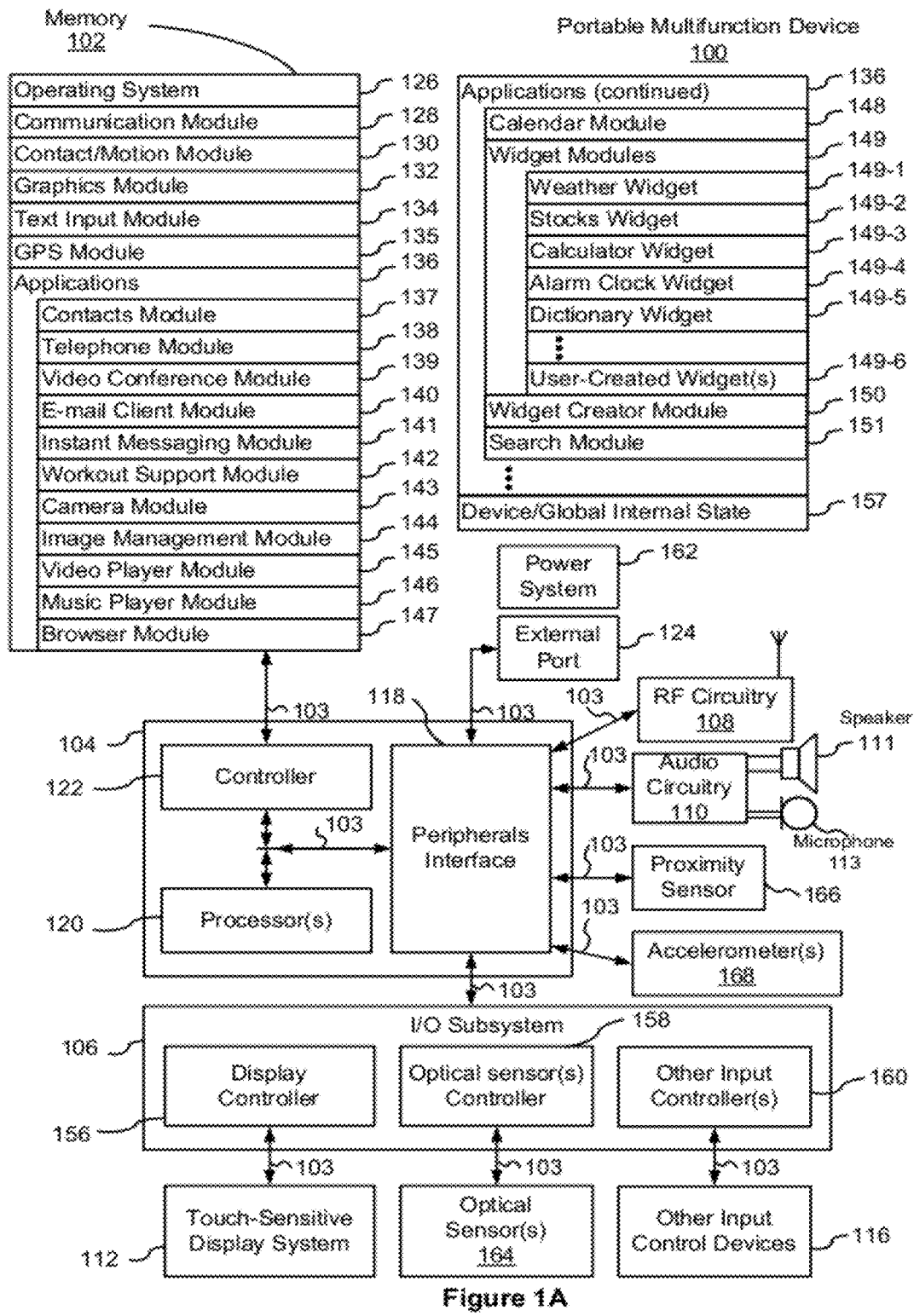
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the terms "speech recognition" are "voice recognition" are used interchangeably to refer to audio inputs based on speech and/or voice.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone® and iPod Touch® devices from Apple Inc. of Cupertino, Calif. Other portable devices such as laptops or tablet computers with touch-sensitive surfaces (e.g., touch screen displays and/or touch pads) may also be used.

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications in addition to a mapping application, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browser application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. Nos. 11/459,606, "Keyboards For Portable Electronic Devices," filed Jul. 24, 2006, and 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
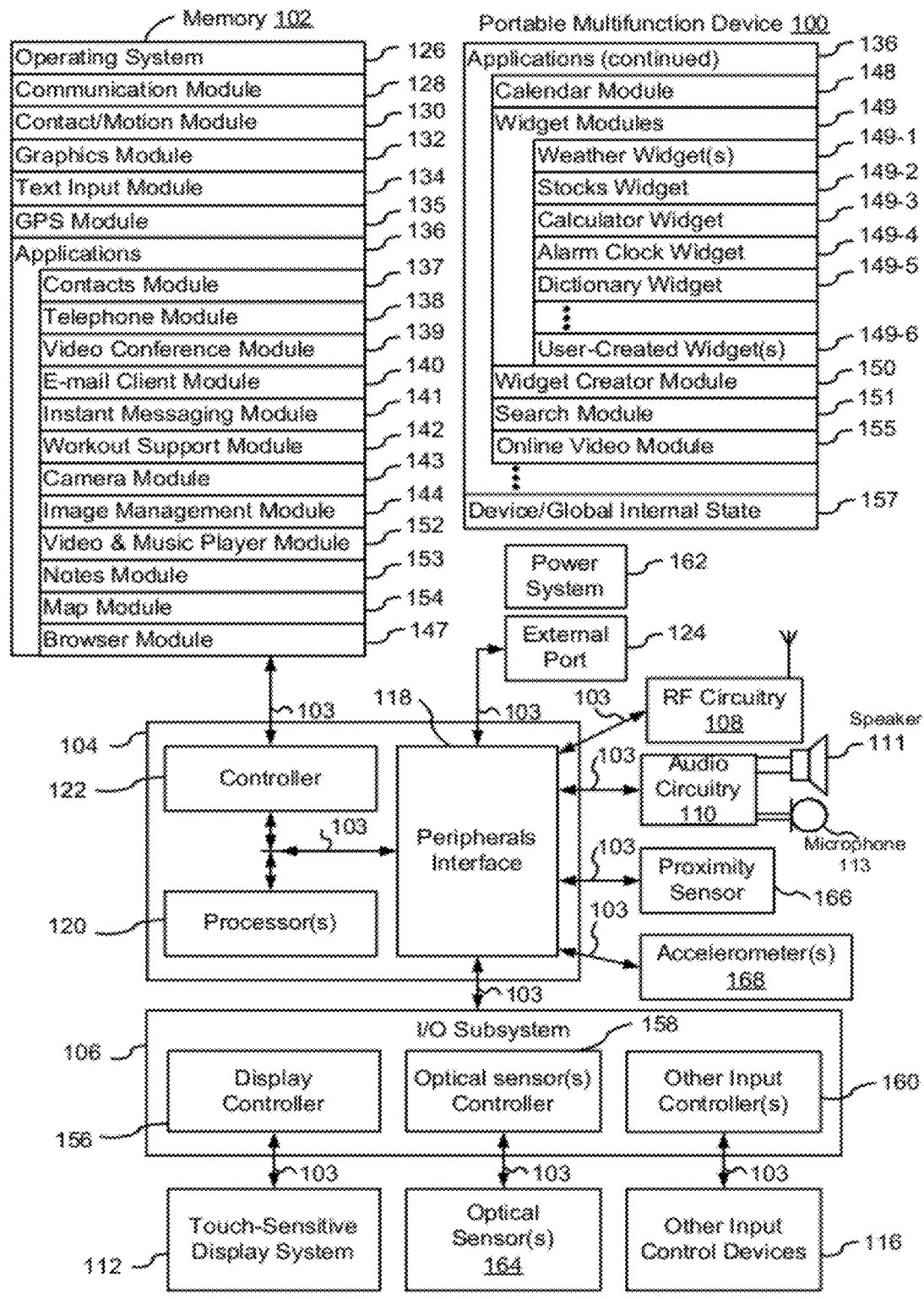

Attention is now directed toward embodiments of portable devices with touch-sensitive displays. FIGS. 1A and 1B are block diagrams illustrating portable multifunction devices 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2). A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touch pads described in the following U.S. Pat. Nos. 6,323,846 (Westerman et al.), 6,570,557 (Westerman et al.), and/or 6,677,932 (Westerman), and/or U.S. Patent Publication 2002/0015024A1, each of which is hereby incorporated by reference in its entirety. However, touch screen 112 displays visual output from portable device 100, whereas touch sensitive touch pads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a resolution in excess of 100 dpi. In some embodiments, the touch screen has a resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

In some embodiments, device 100 may include a physical or virtual wheel (e.g., a click wheel) as input control device 116. A user may navigate among and interact with one or more graphical objects (e.g., icons) displayed in touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by input controller 160 as well as one or more of the modules and/or sets of instructions in memory 102. For a virtual click wheel, the click wheel and click wheel controller may be part of touch screen 112 and display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. Nos. 11/241,839, "Proximity Detector In Handheld Device"; 11/240,788, "Proximity Detector In Handheld Device"; 11/620,702, "Using Ambient Light Sensor To Augment Proximity Sensor Output"; 11/586,862, "Automated Response To And Sensing Of User Activity In Portable Devices"; and 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers. Device 100 typically includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global state information 157, as shown in FIGS. 1A and 1B. Device/global state information 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module 145;
- music player module 146;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player, such as an iPod (trademark of Apple Inc.).

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1C:
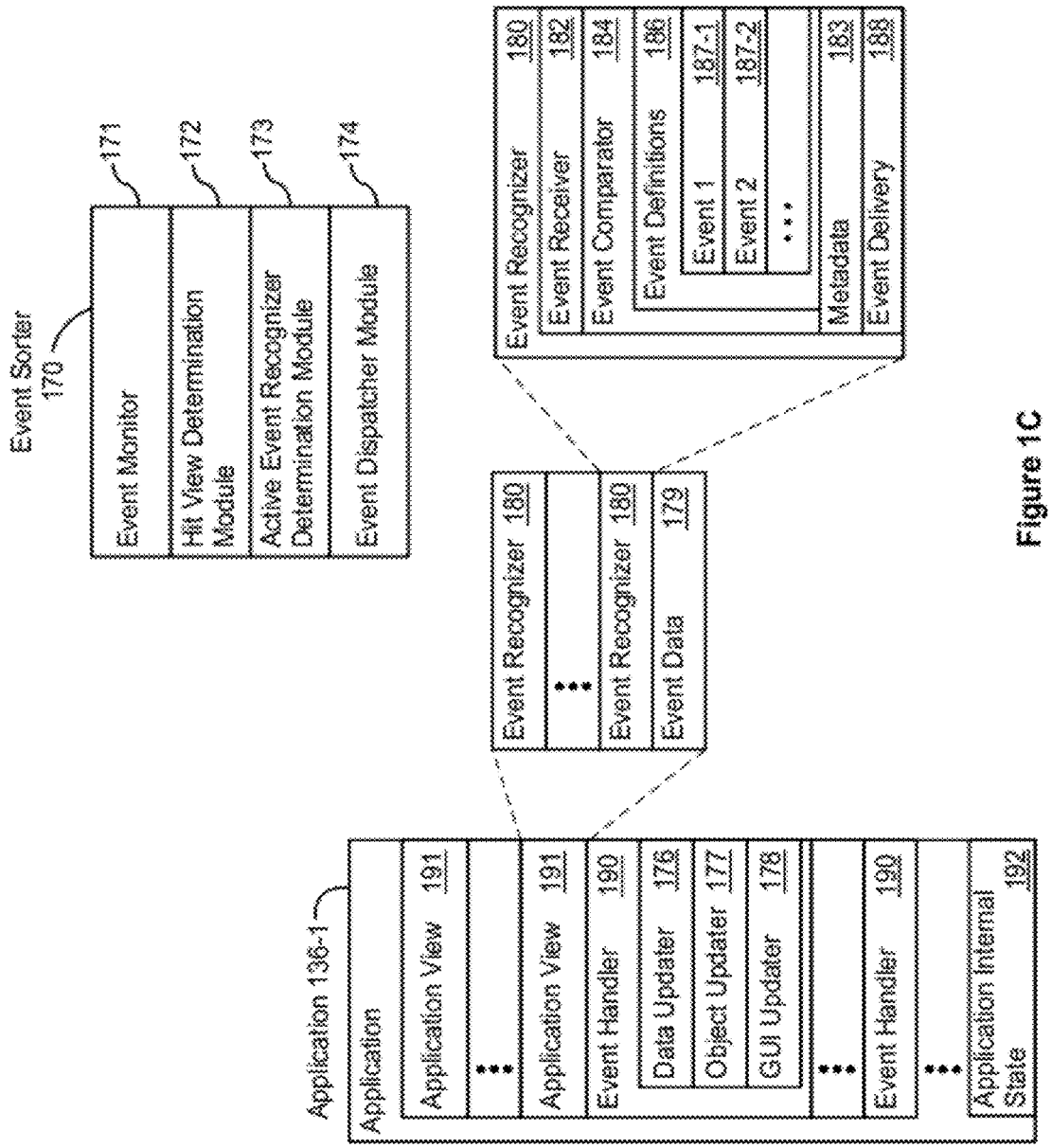
FIG. 1C is a block diagram illustrating exemplary components for event handling in accordance with some embodiments.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
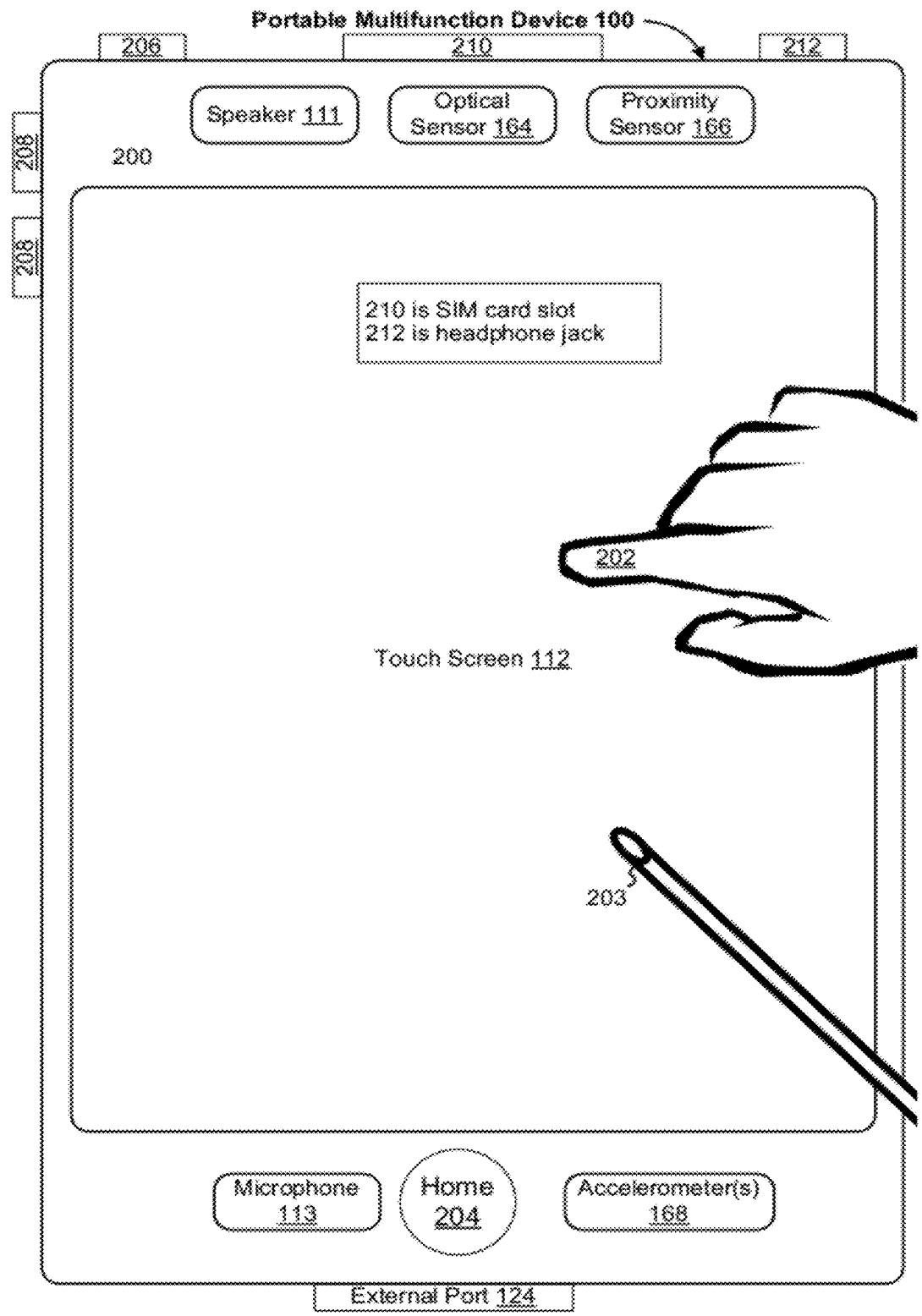
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

Figure 3:
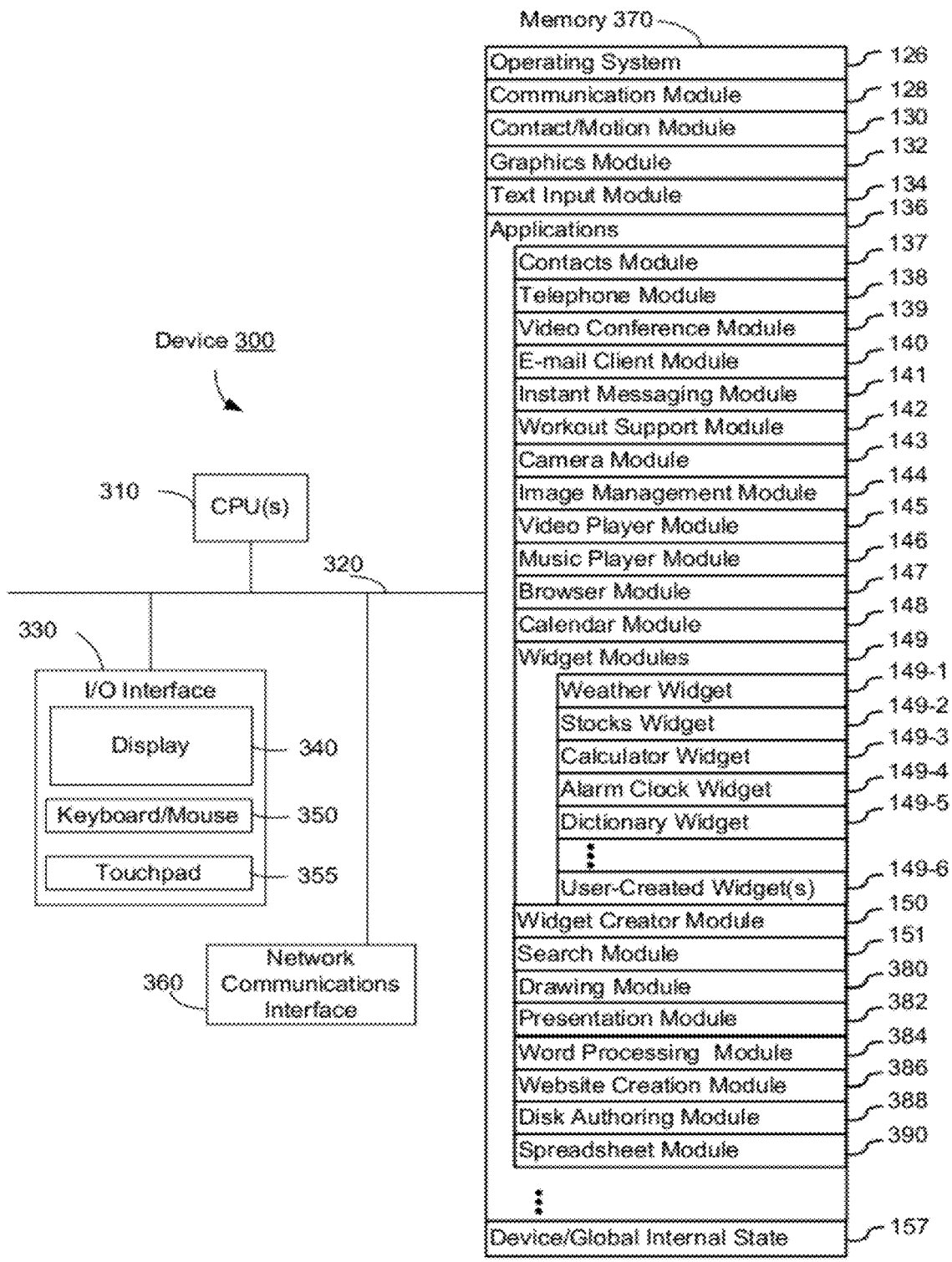
FIG. 3 is a block diagram of an exemplary multifunction device with a display and a touch-sensitive surface in accordance with some embodiments.

FIG. 3 is a block diagram of an exemplary multifunction device with a display and a touch-sensitive surface in accordance with some embodiments. In some embodiments, device 300 is a laptop computer, a tablet computer, a multimedia player device, a navigation device, an educational device (such as a child's learning toy), or a gaming system. Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
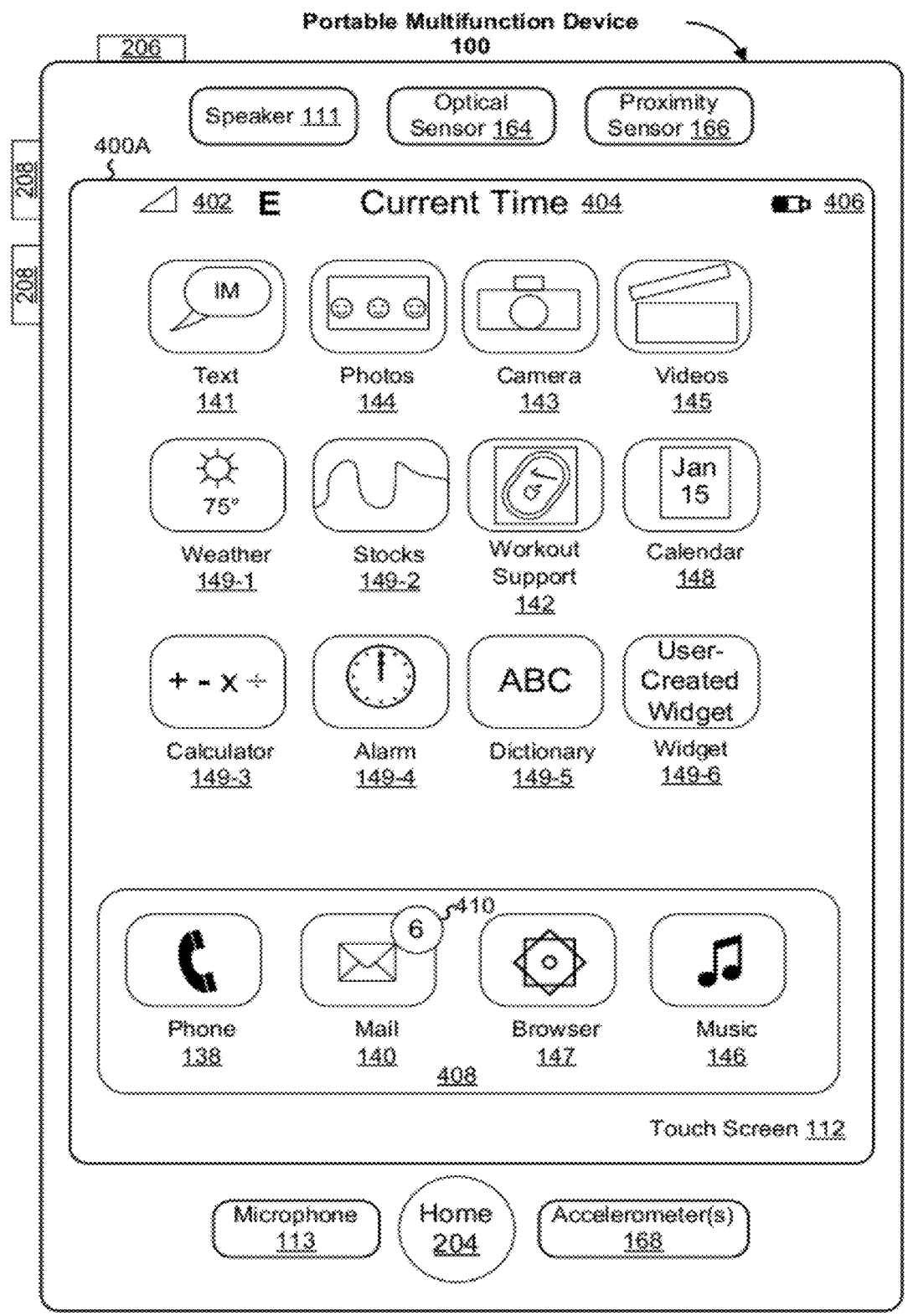
FIGS. 4A and 4B illustrate exemplary user interfaces for a menu of applications on a portable multifunction device in accordance with some embodiments.
Figure 4B:
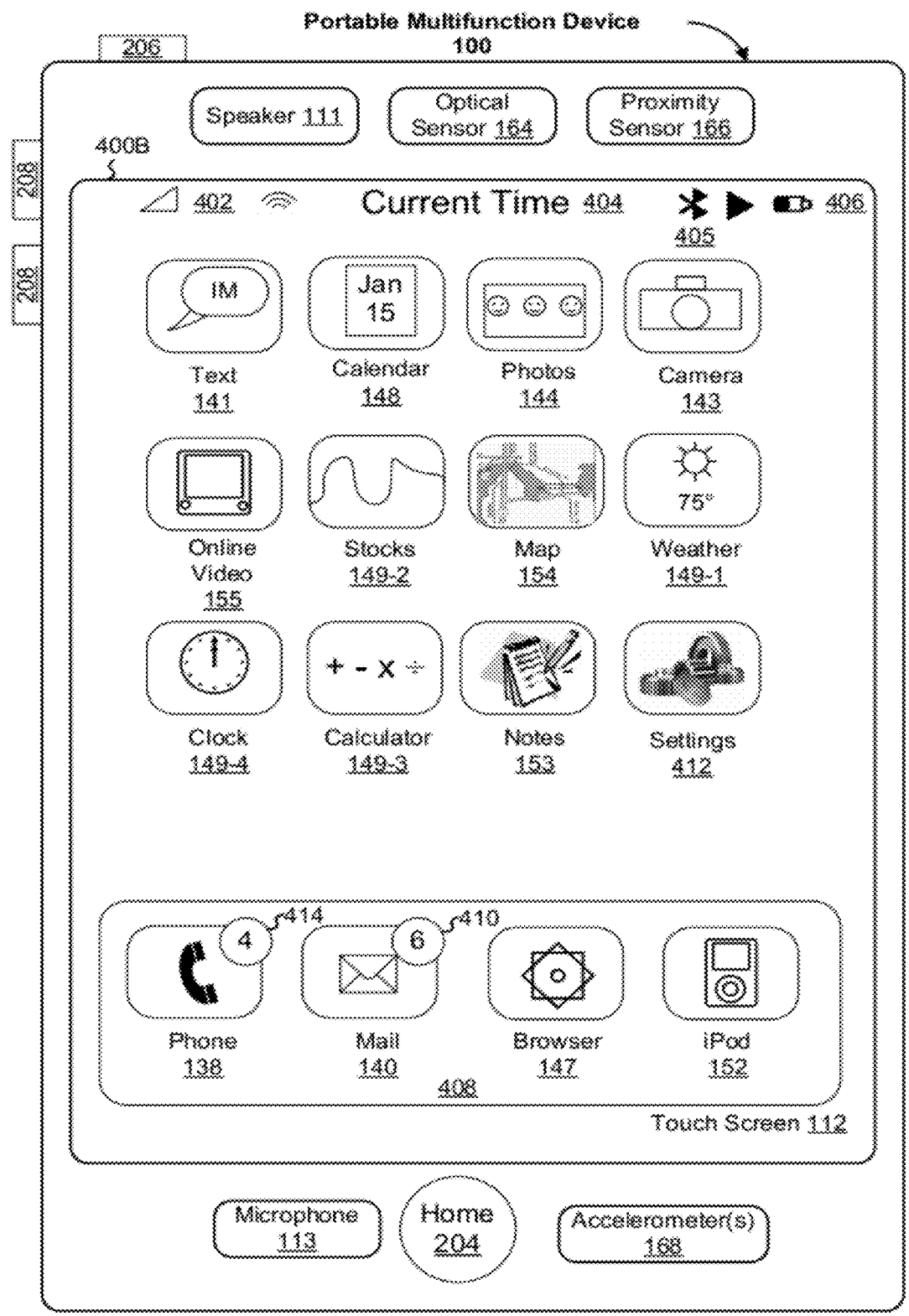

FIGS. 4A and 4B illustrate exemplary user interfaces for a menu of applications on portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;
  Stocks 149-2;
  Workout support 142;
  Calendar 148;
  Calculator 149-3;
  Alarm clock 149-4;
  Dictionary 149-5; and
  User-created widget 149-6.

In some embodiments, user interface 400B includes the following elements, or a subset or superset thereof:
  402, 404, 405, 406, 141, 148, 144, 143, 149-3, 149-2, 149-1, 149-4, 410, 414, 138, 140, and 147, as described above;
  Map icon for map module 154;
  Notes icon for notes module 153;
  Settings 412, which provides access to settings for device 100 and its various applications 136, as described further below;
  iPod icon for video and music player module 152, also referred to as iPod (trademark of Apple Inc.) module 152; and Online video icon for online video module 155, also referred to as YouTube (trademark of Google Inc.) module 155.

Figure 4C:
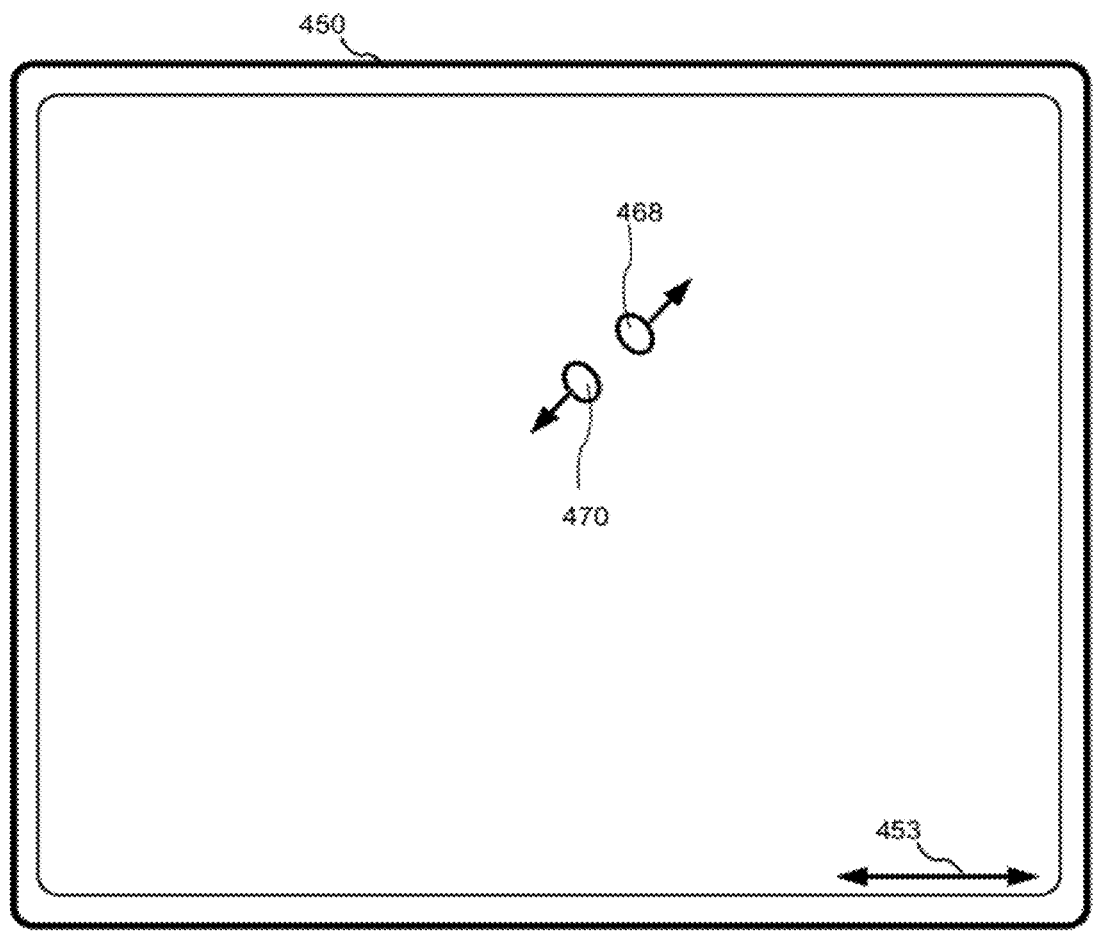
FIG. 4C illustrates an exemplary user interface for a multifunction device with a touch-sensitive surface that is separate from the display in accordance with some embodiments.
Figure 4C:
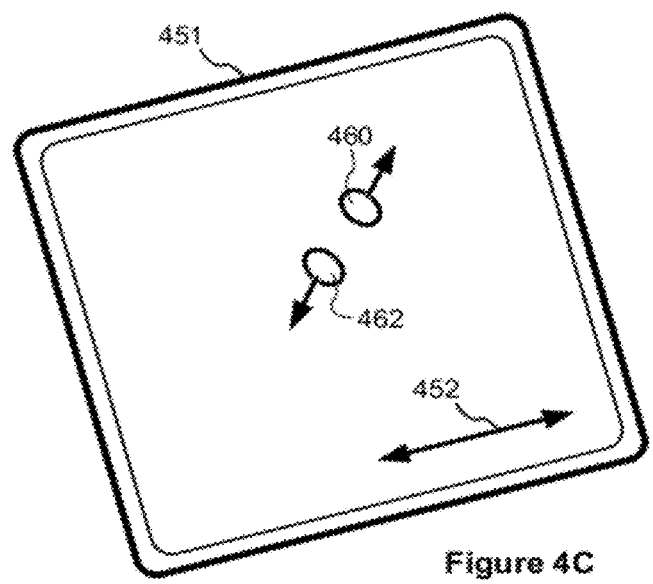

FIG. 4C illustrates an exemplary user interface on a device (e.g., device 300, FIG. 3) with touch-sensitive surface 451 (e.g., a tablet or touchpad 355, FIG. 3) that is separate from display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with touch-sensitive surface 451 at locations that correspond to respective locations on the display (e.g., in FIG. 4C 460 corresponds to 468 and 462 corresponds to 470). In this way, user inputs (e.g., contacts 460 and 462, and movements thereof) detected by the device on the touch-sensitive surface (e.g., 451 in FIG. 4C) are used by the device to manipulate the user interface on the display (e.g., 450 in FIG. 4C) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a tap gesture may be replaced with a mouse click while the cursor is located over the location of the tap gesture (e.g., instead of detection of the contact followed by ceasing to detect the contact). As another example, a voice input may be used to activate objects on a display (e.g., a voice command "next" may activate a "next" or "next step" icon on the display). Similarly, when multiple user inputs are simultaneously detected, it should be understood that multiple computer mice may be used simultaneously, or a mouse and finger contacts may be used simultaneously. Furthermore, each "finger tap" mentioned or described below may be replaced with any suitable touch gesture.

In addition, in some embodiments "touch gestures" include not only gestures, made by one or more fingers or one or more styluses, that make physical contact a touch-sensitive screen 112 or other touch-sensitive surface, but also gestures that occur, in whole or in part, sufficiently close to touch-sensitive screen 112 or other touch-sensitive surface that the one or more sensors of touch-sensitive screen 112 or other touch-sensitive surface are able to detect those gestures.

Attention is now directed towards embodiments of user interfaces ("UI") and associated processes that may be implemented on a multifunction device with a display and a touch-sensitive surface, such as device 300 or portable multifunction device 100.

Figure 5A:
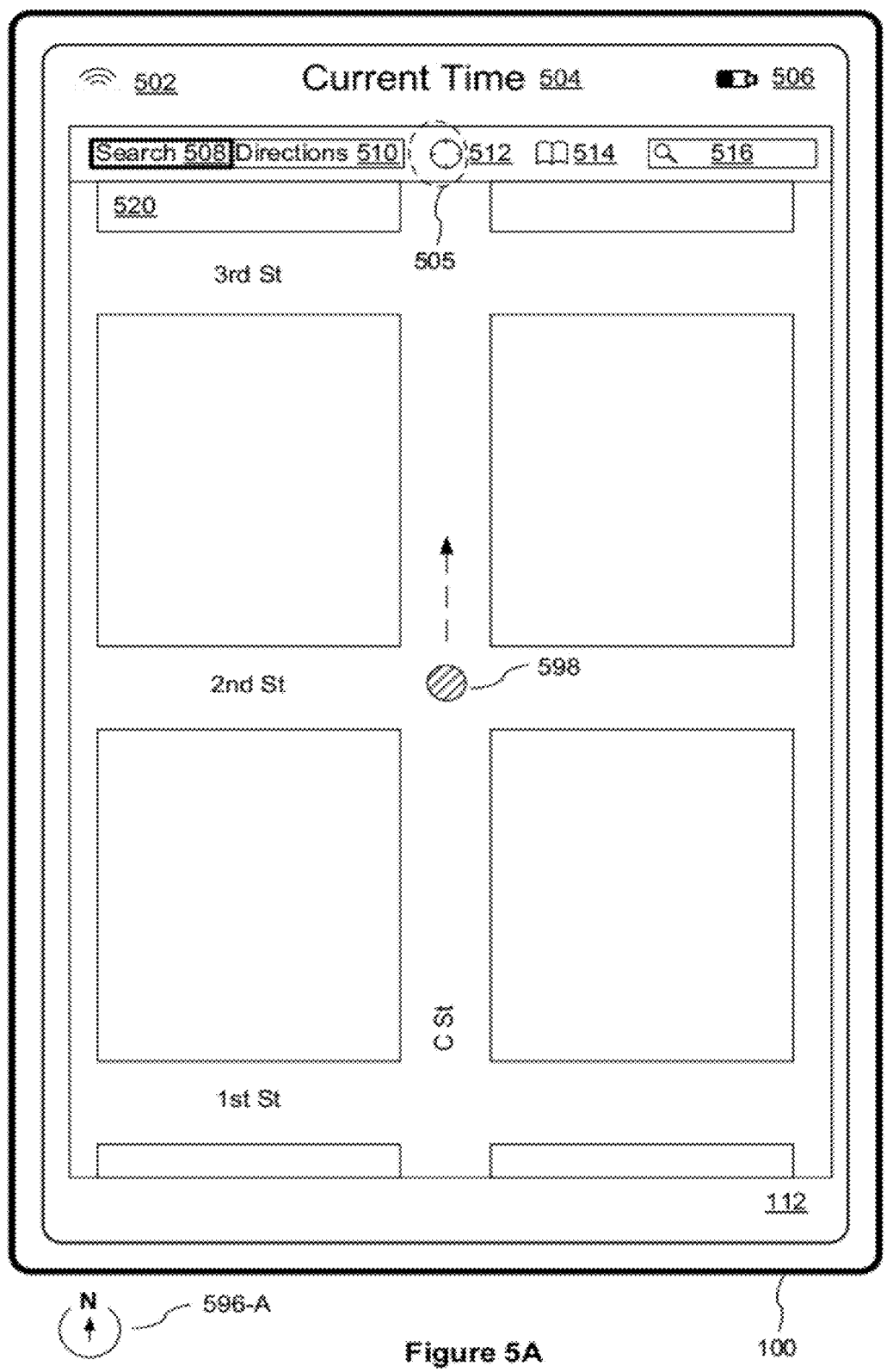
FIGS. 5A-5VV illustrate exemplary user interfaces for tracking movement on a map in accordance with some embodiments.
Figure 5B:
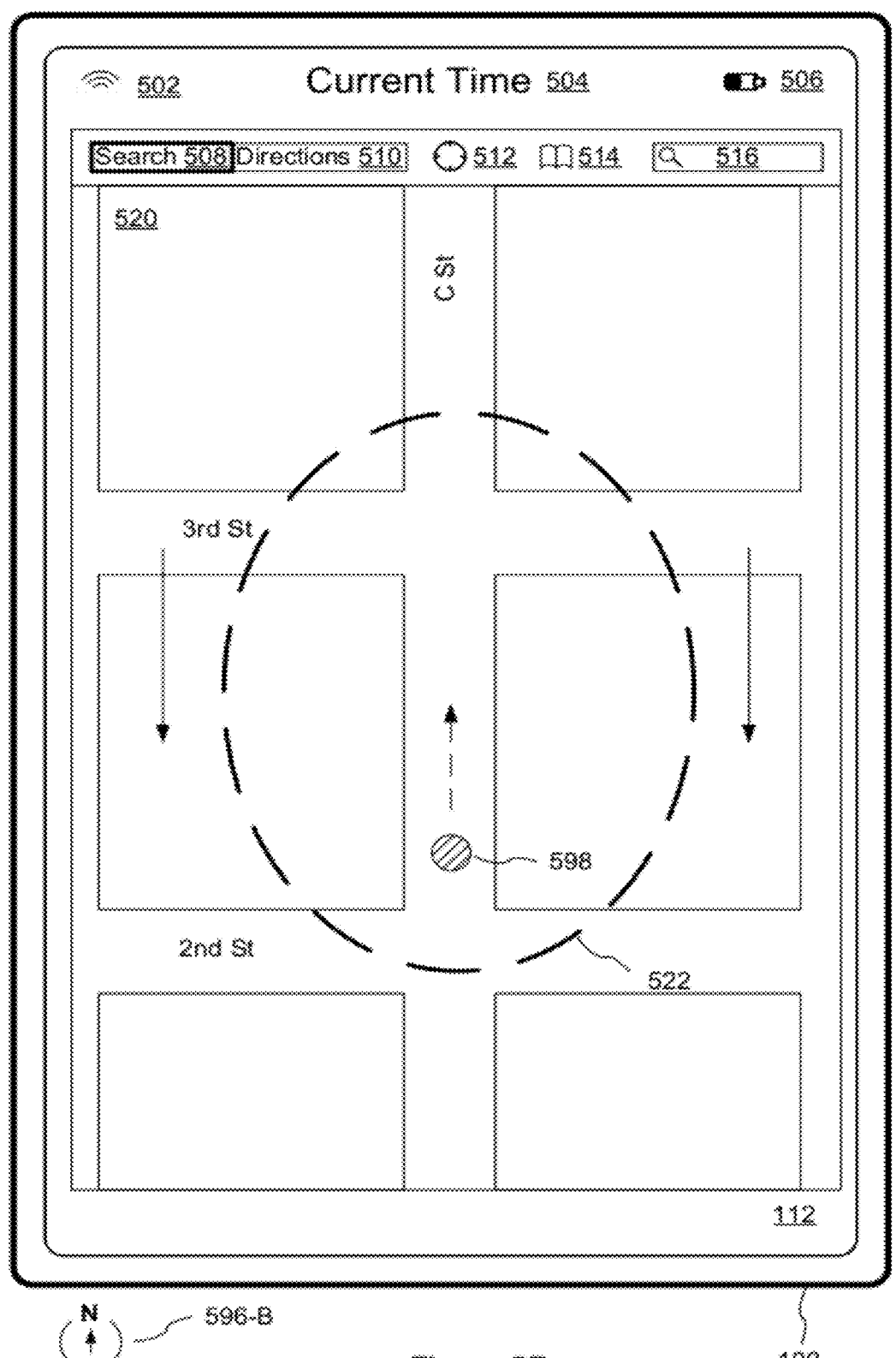
Figure 5C:
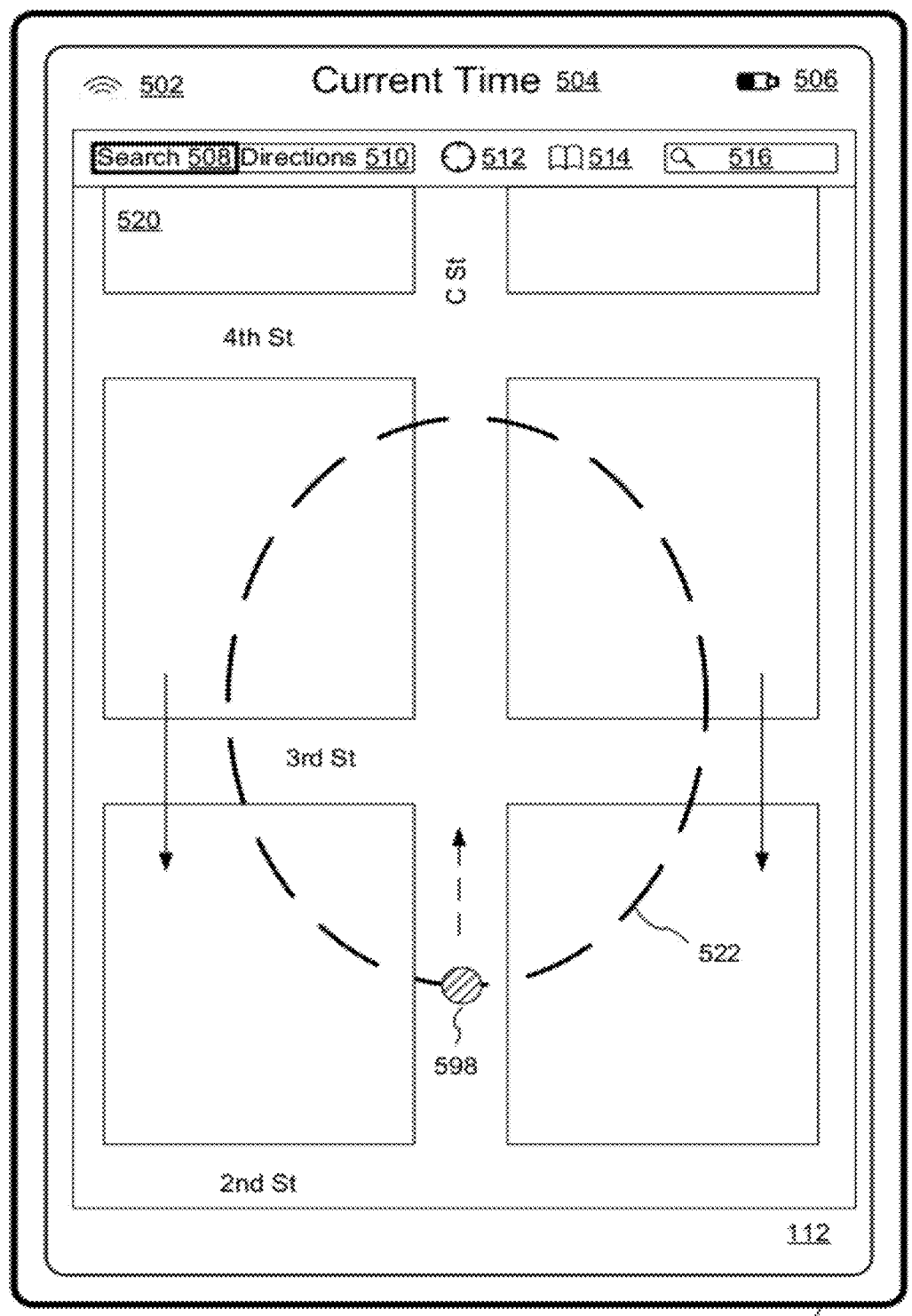
Figure 5D:
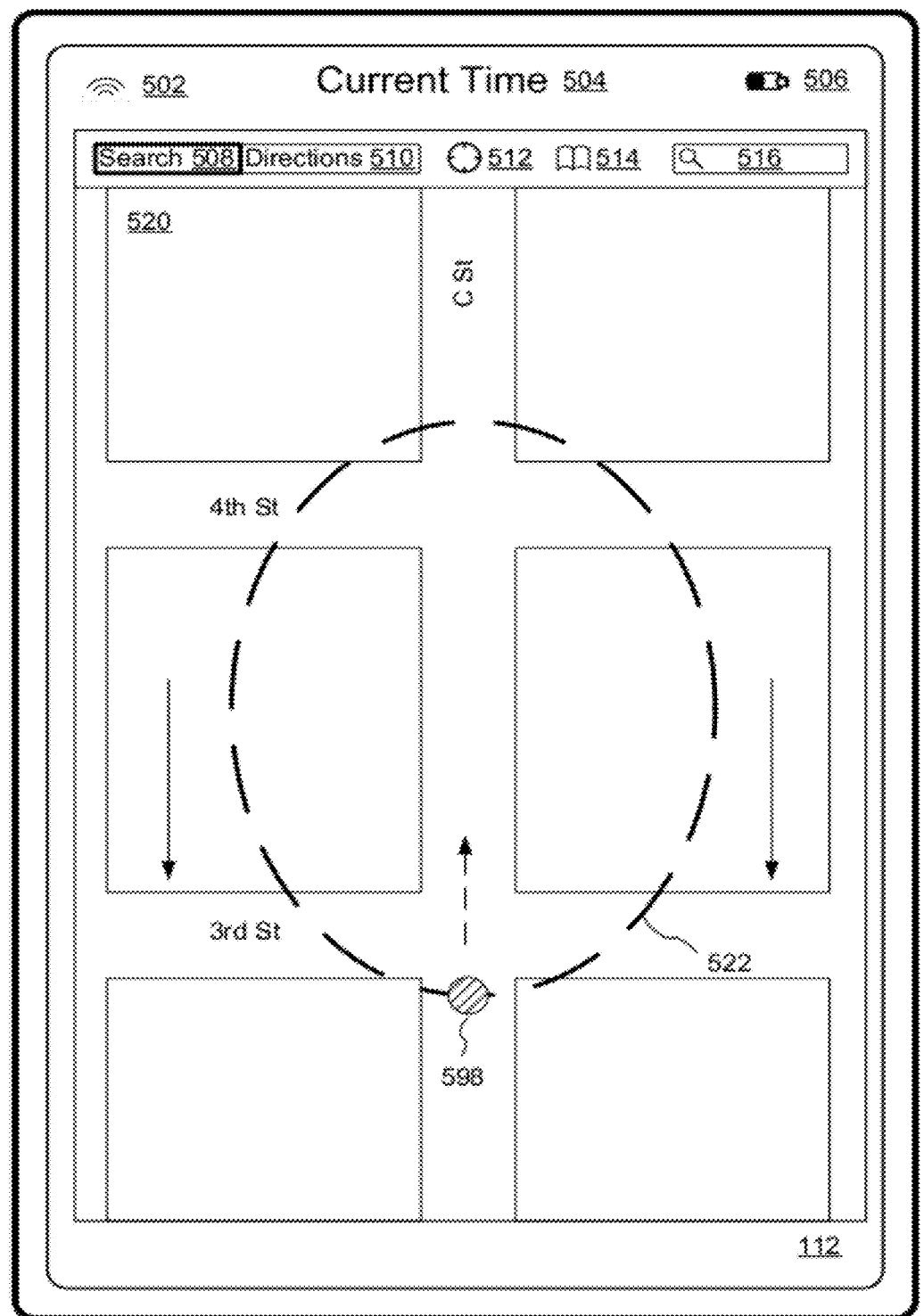
Figure 5E:
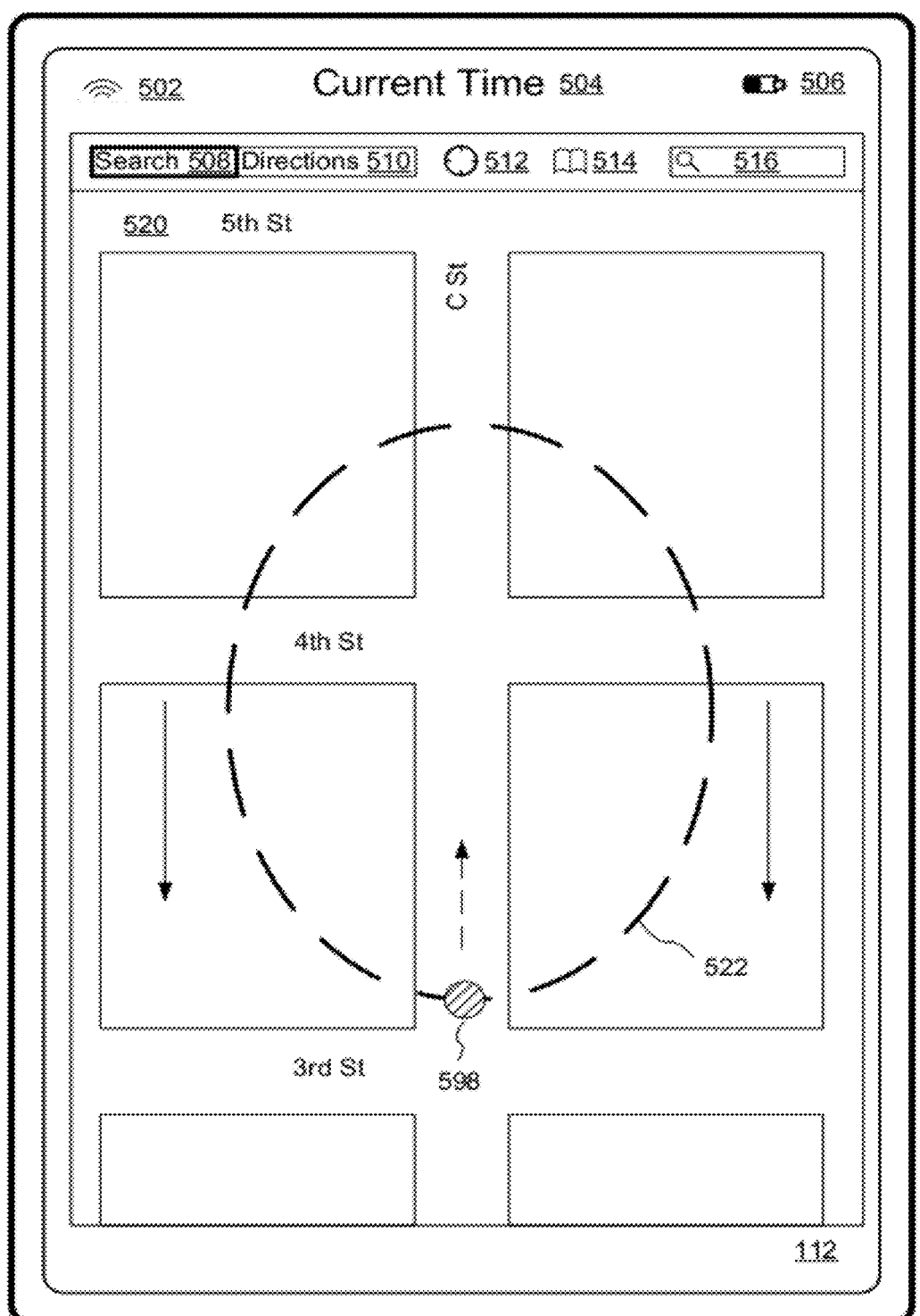
Figure 5F:
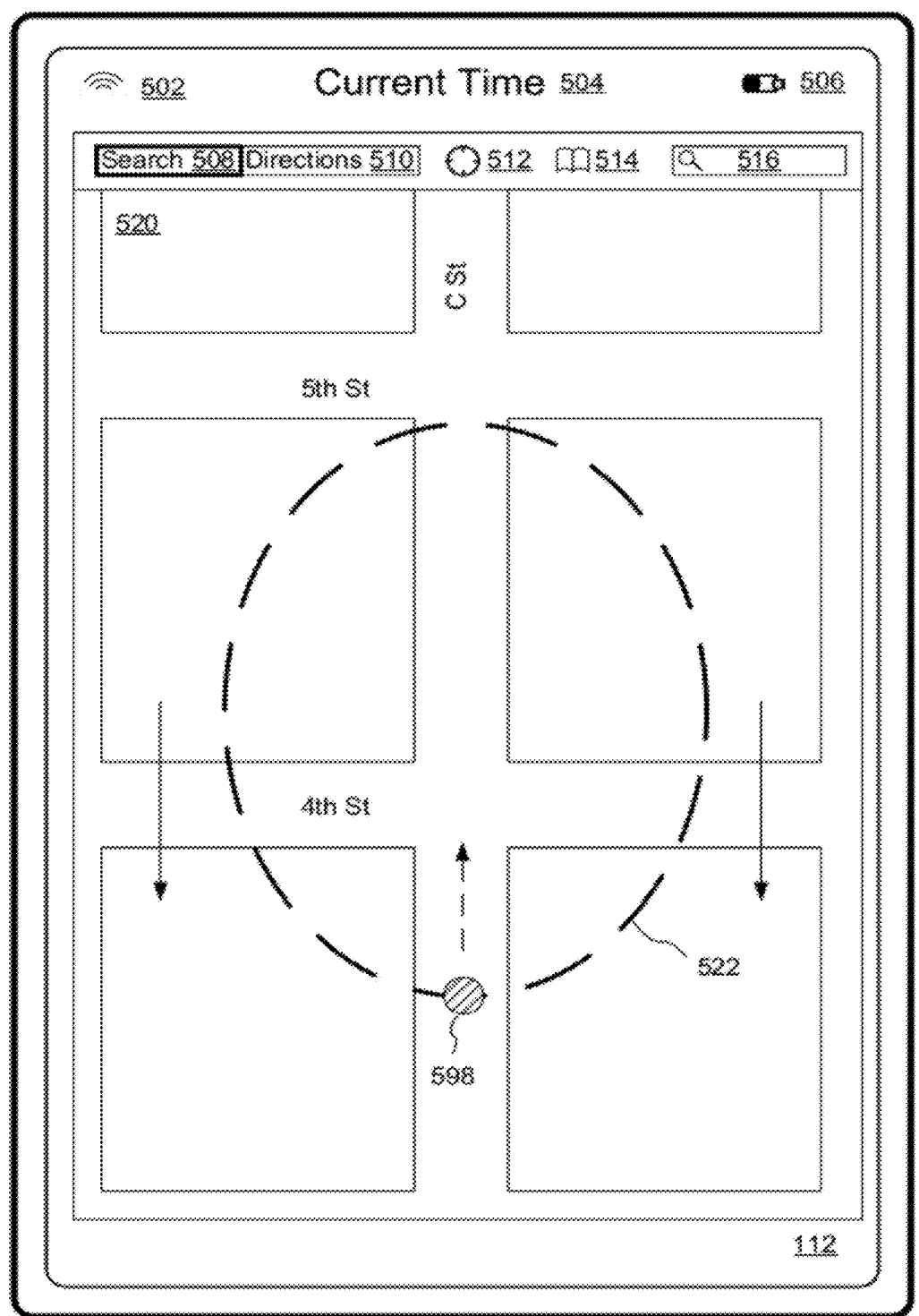
Figure 5G:
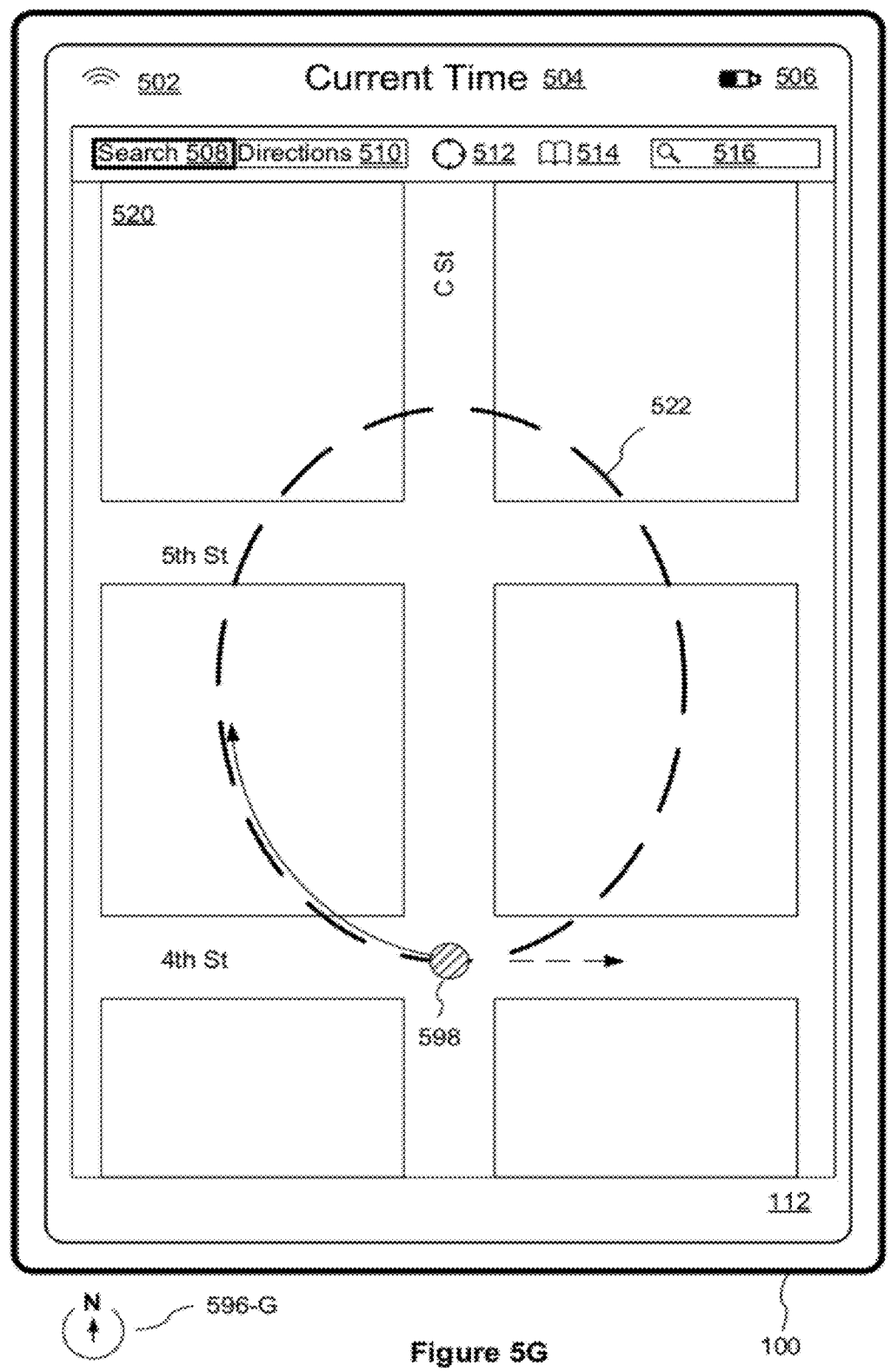
Figure 5H:
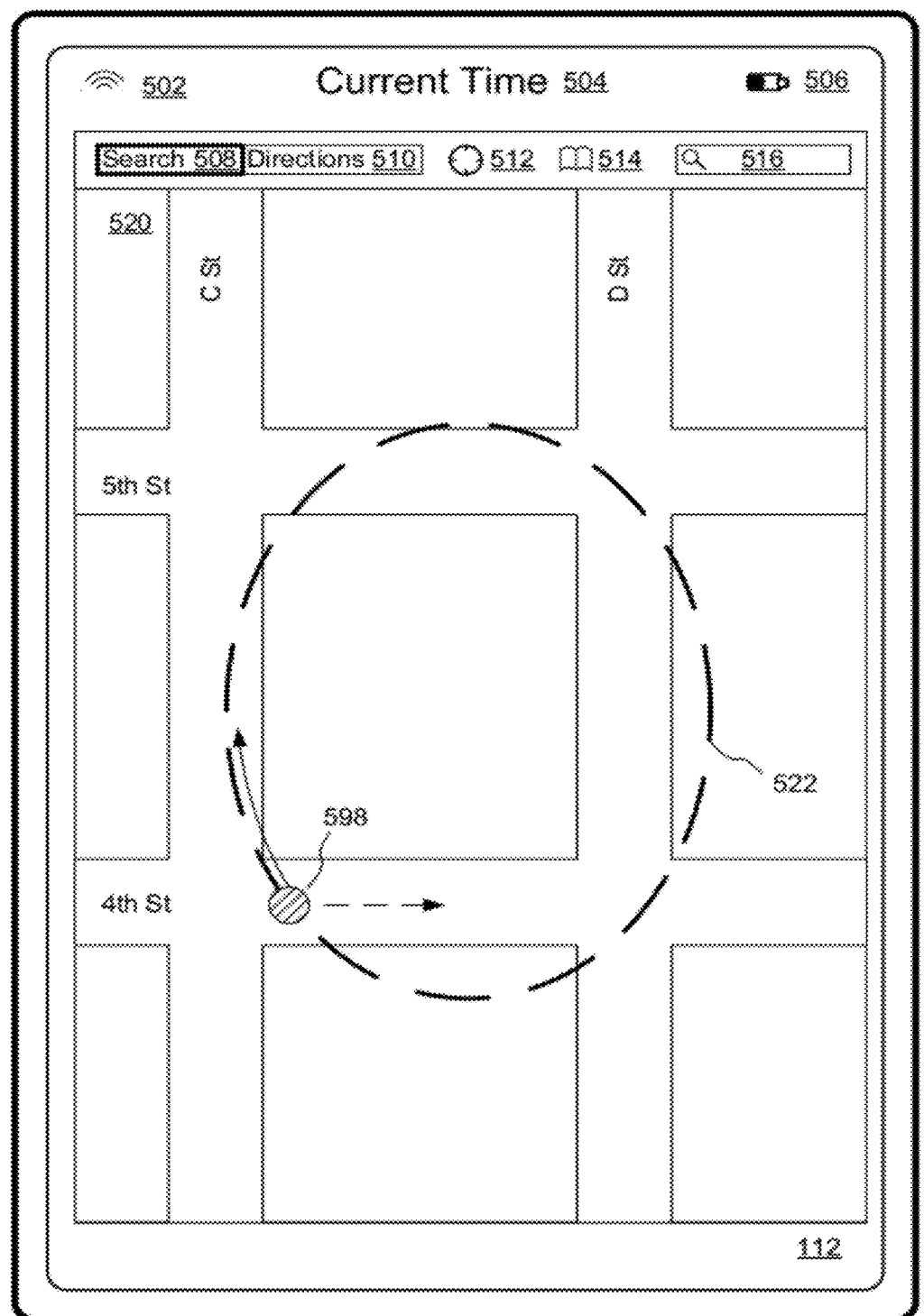
Figure 5I:
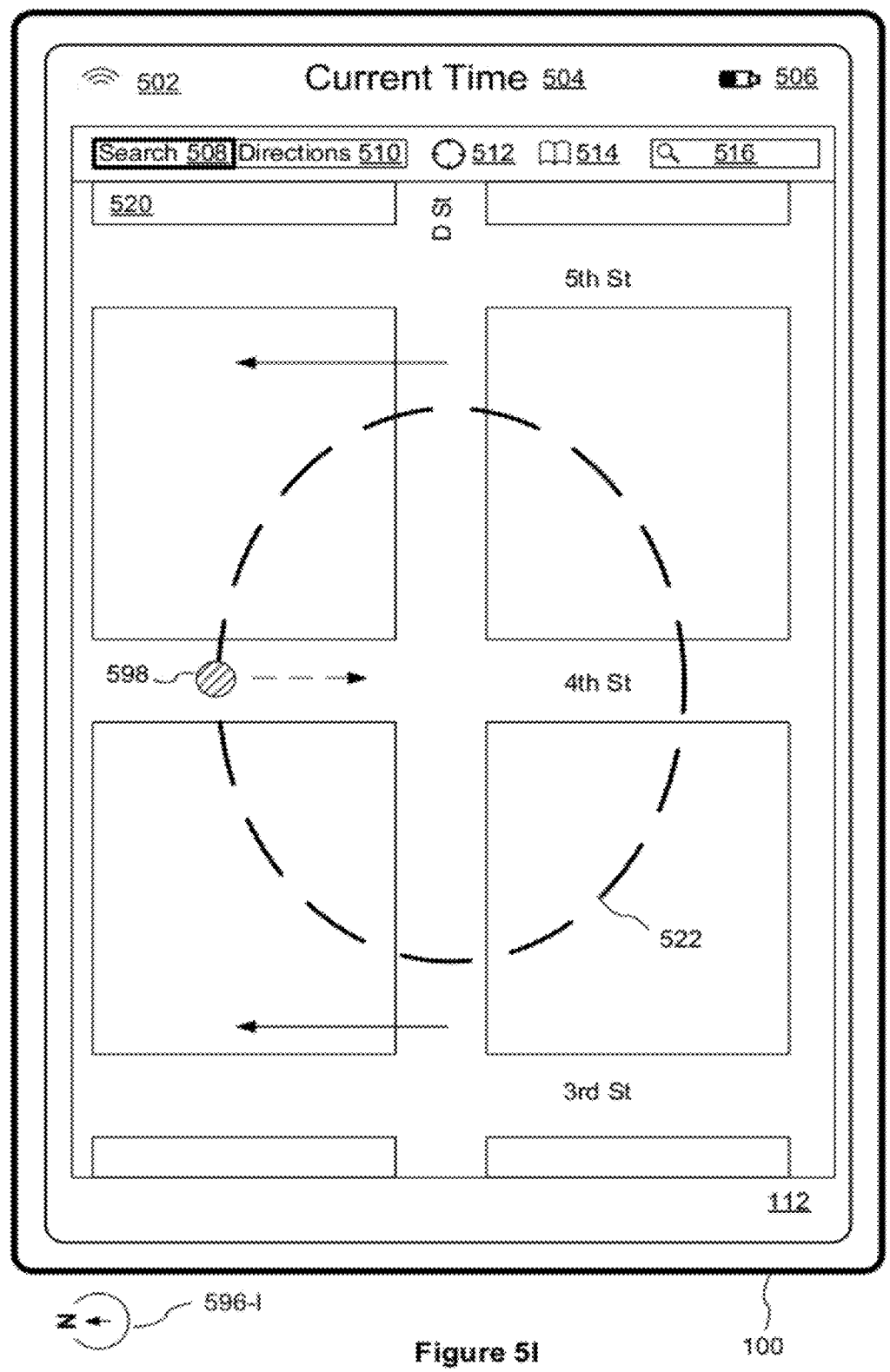
Figure 5J:
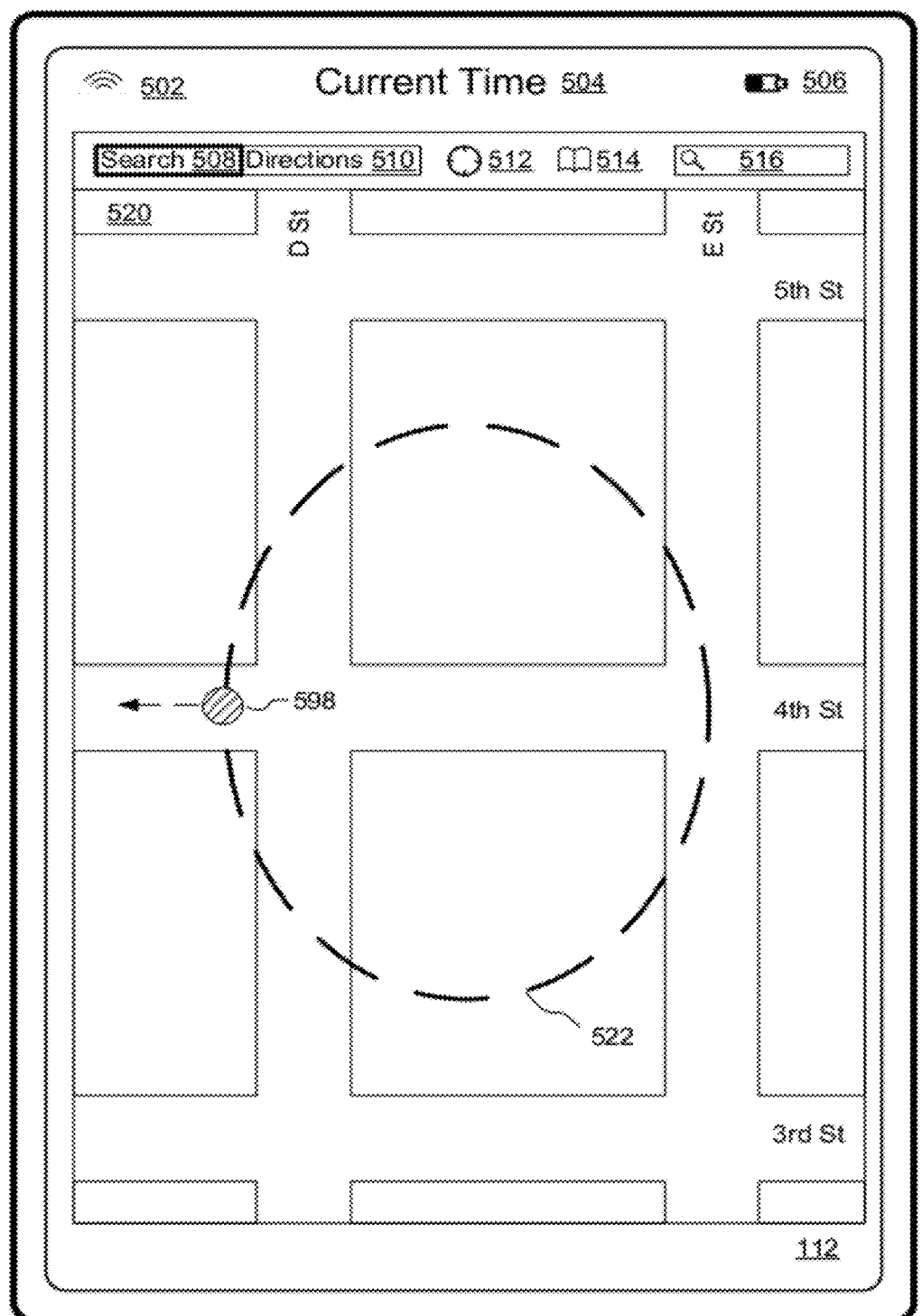
Figure 5K:
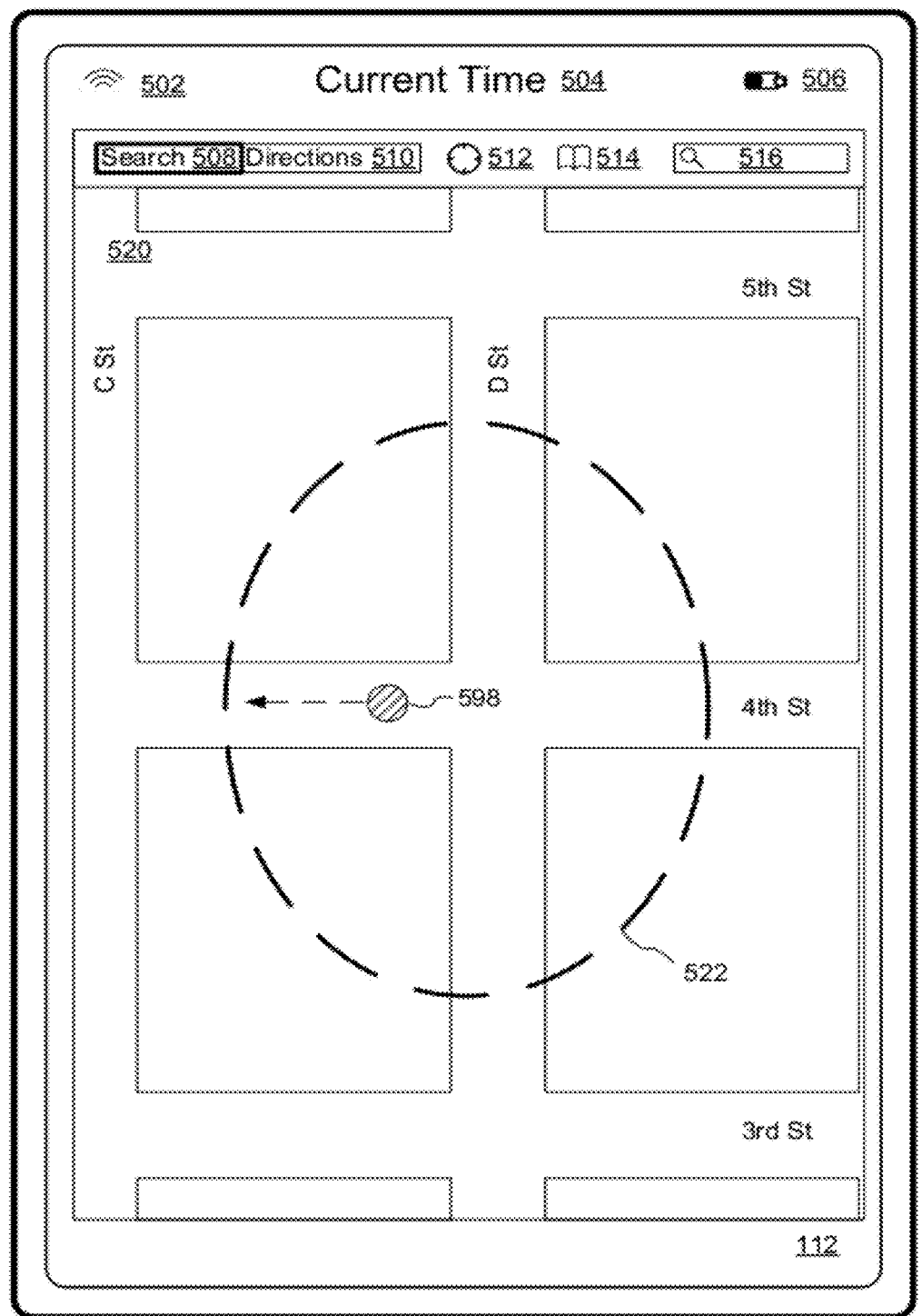
Figure 5L:
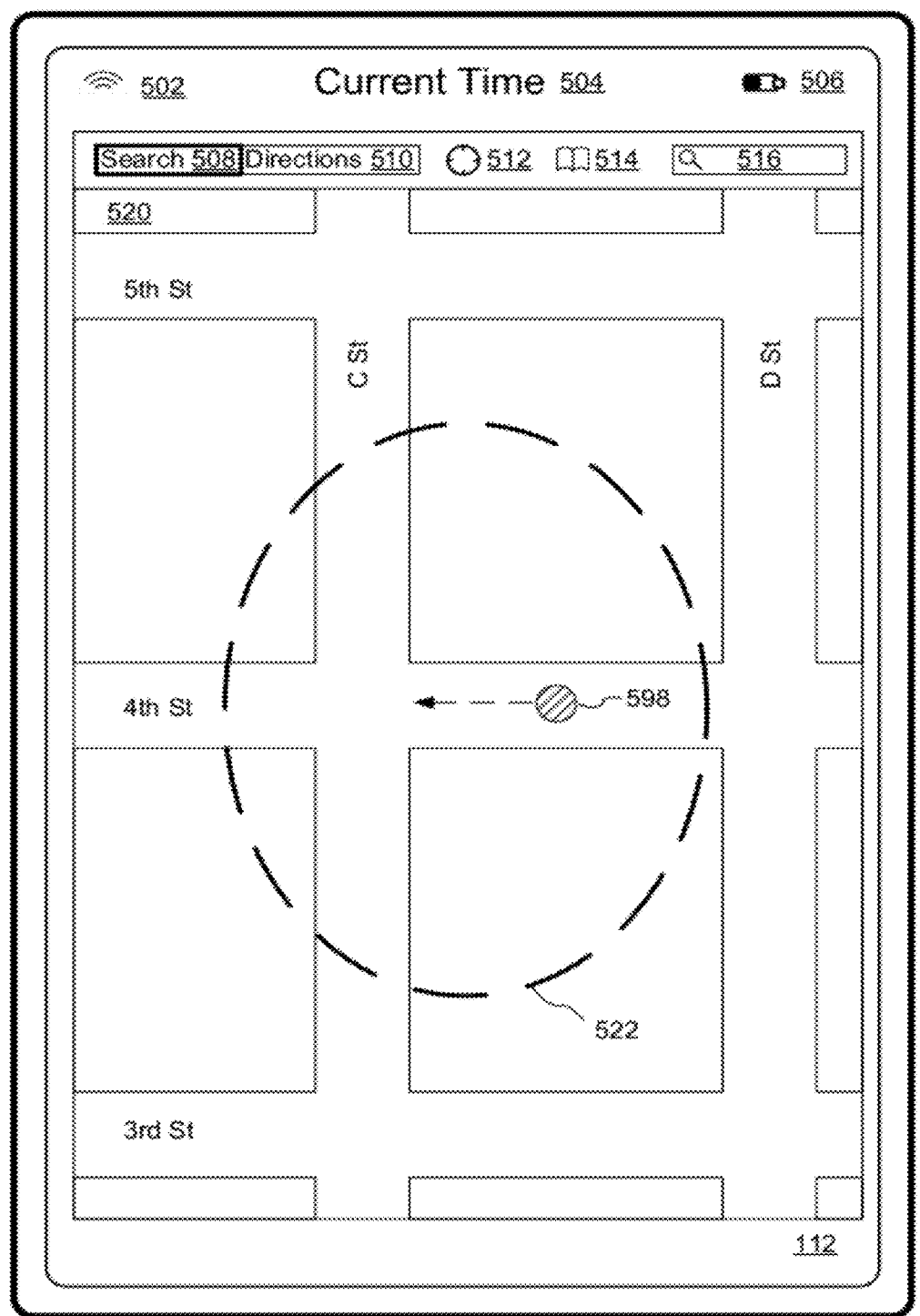
Figure 5M:
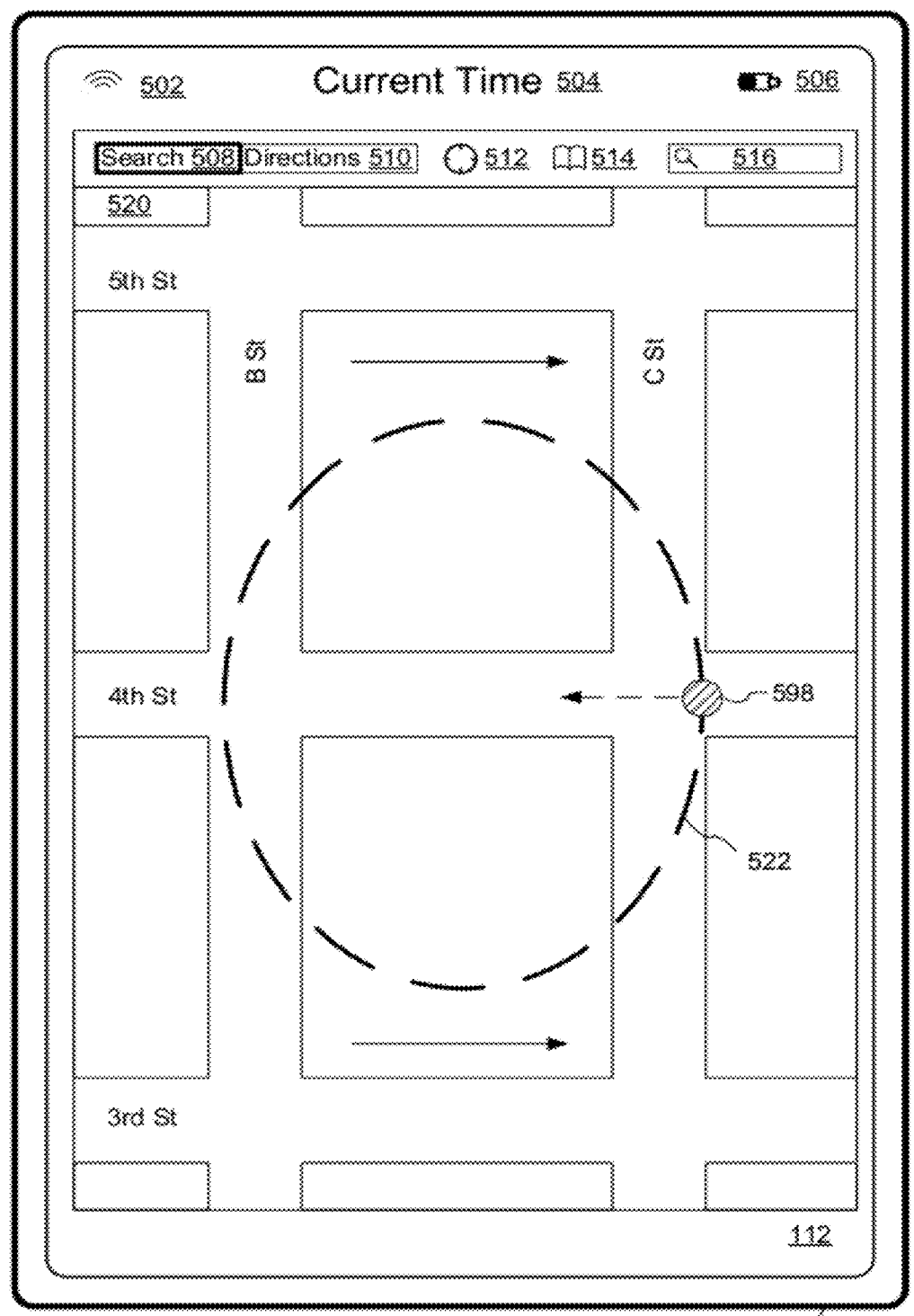
Figure 5M:
Figure 5N:
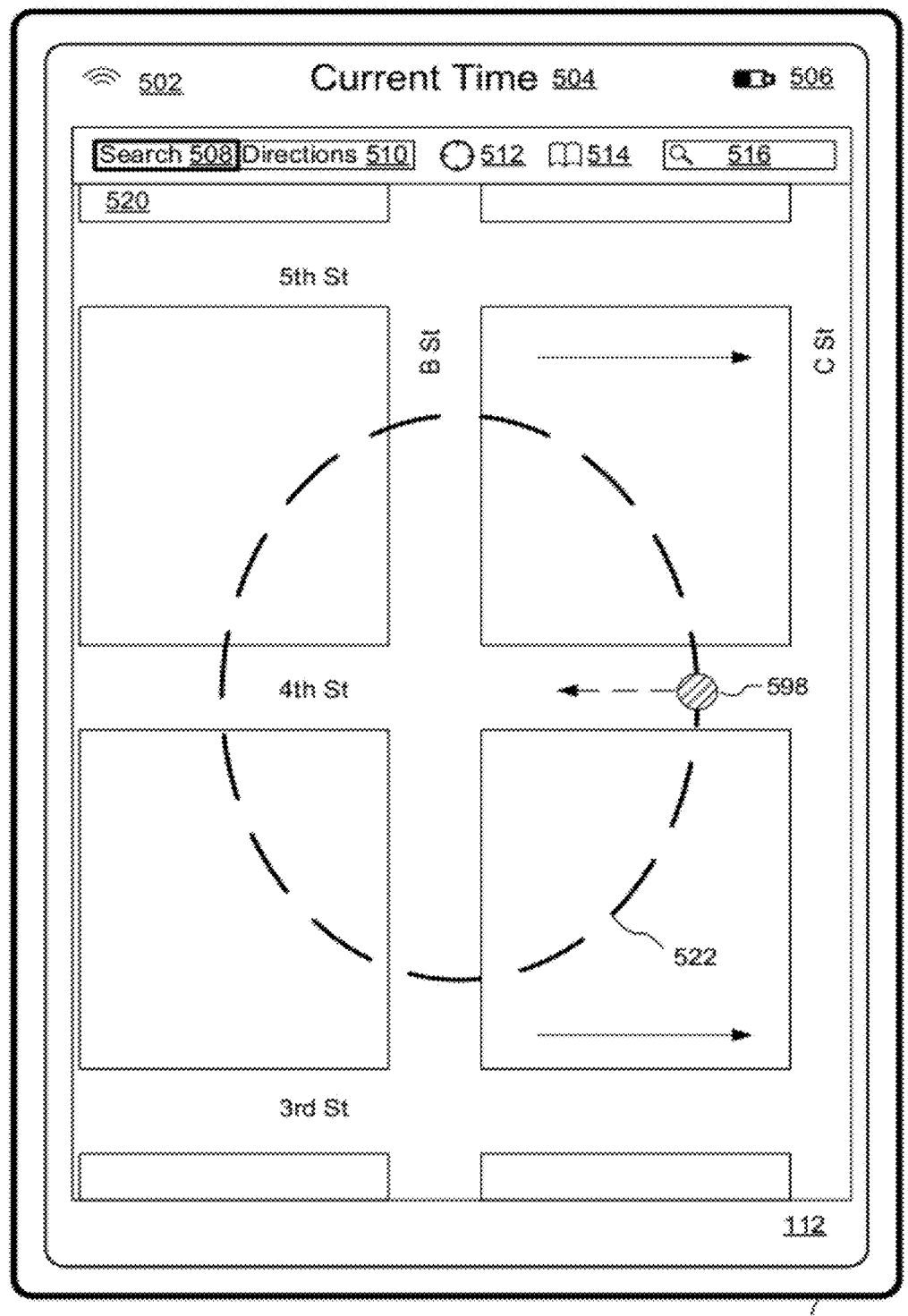
Figure 5O:
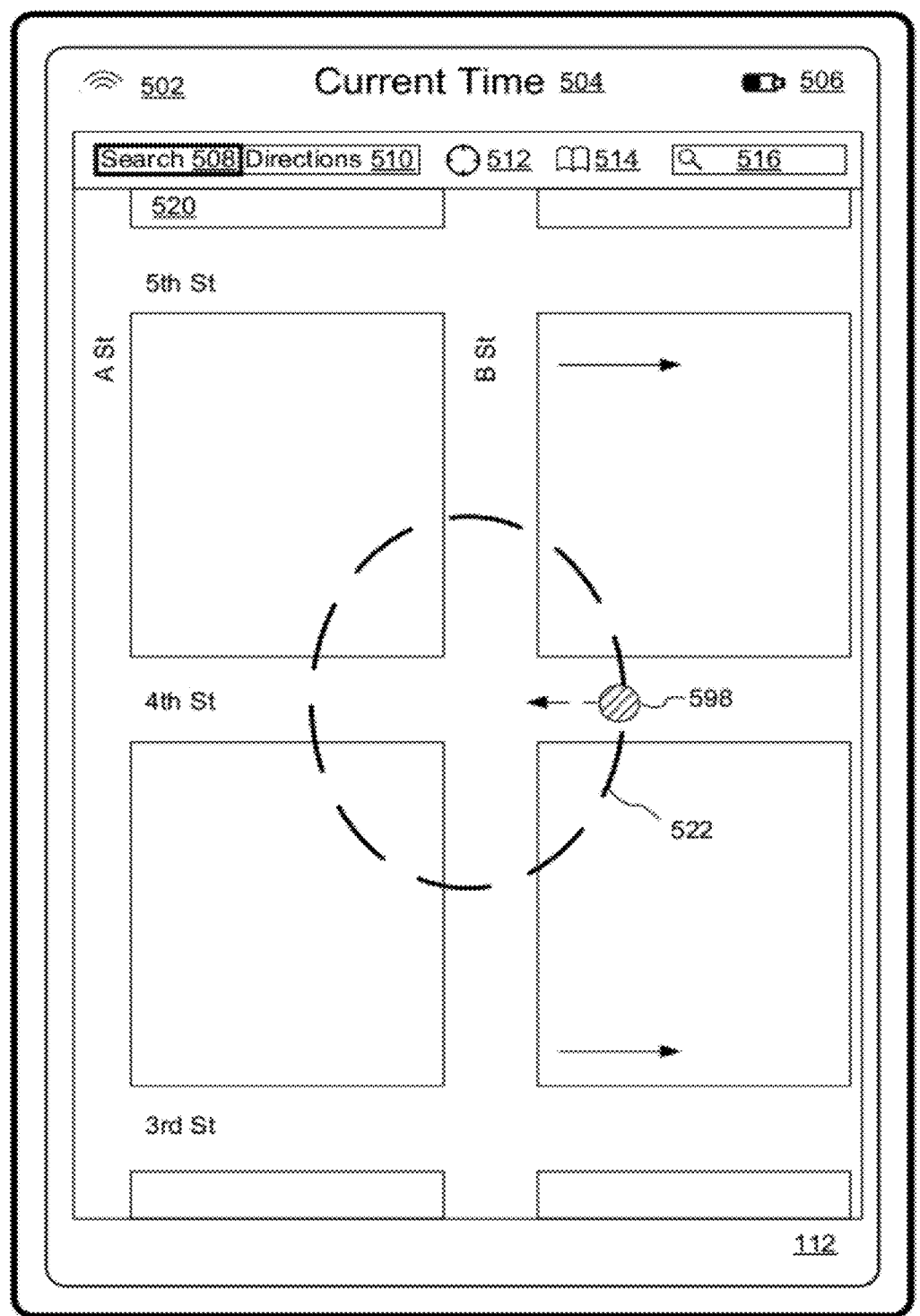
Figure 5P:
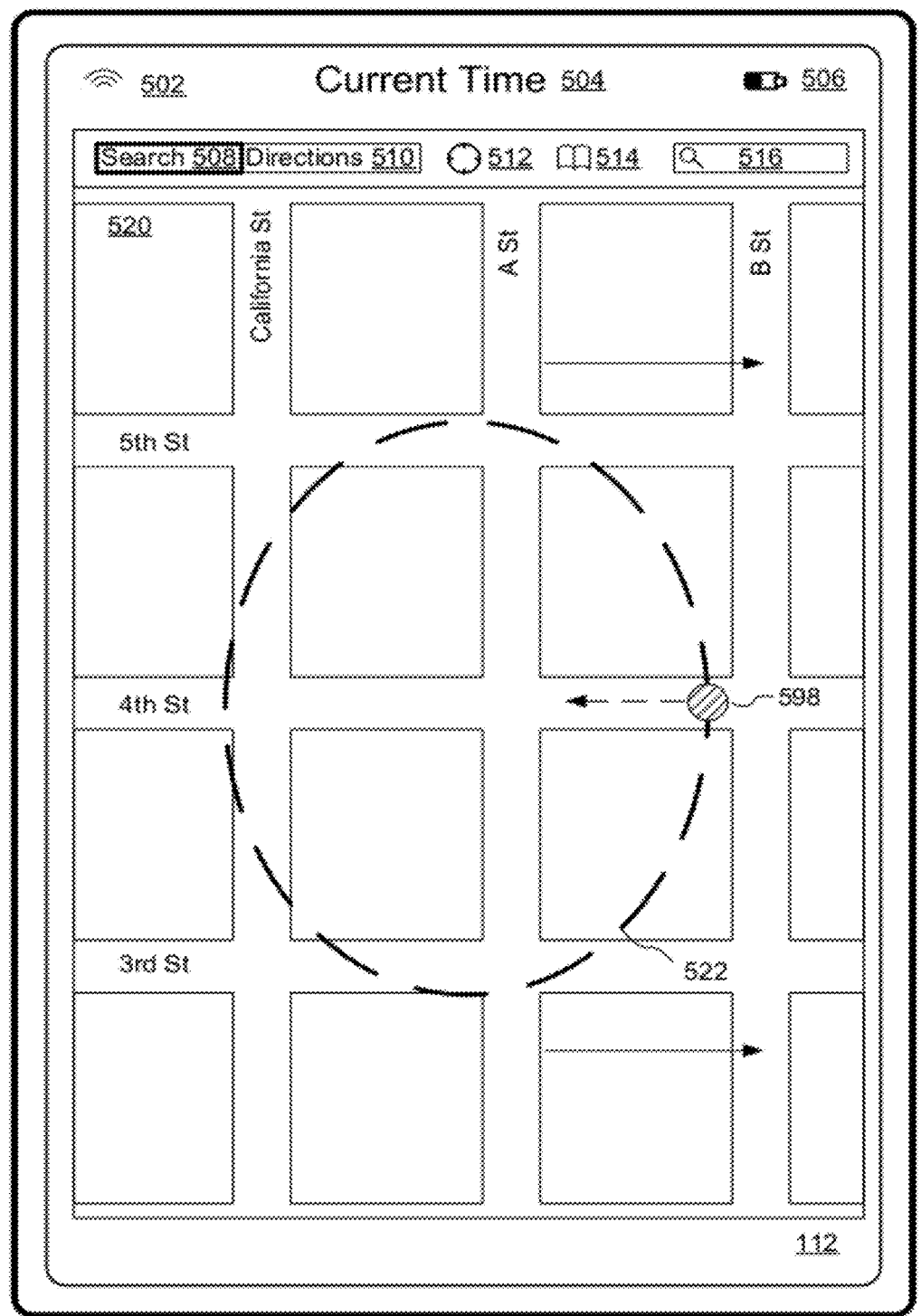
Figure 5Q:
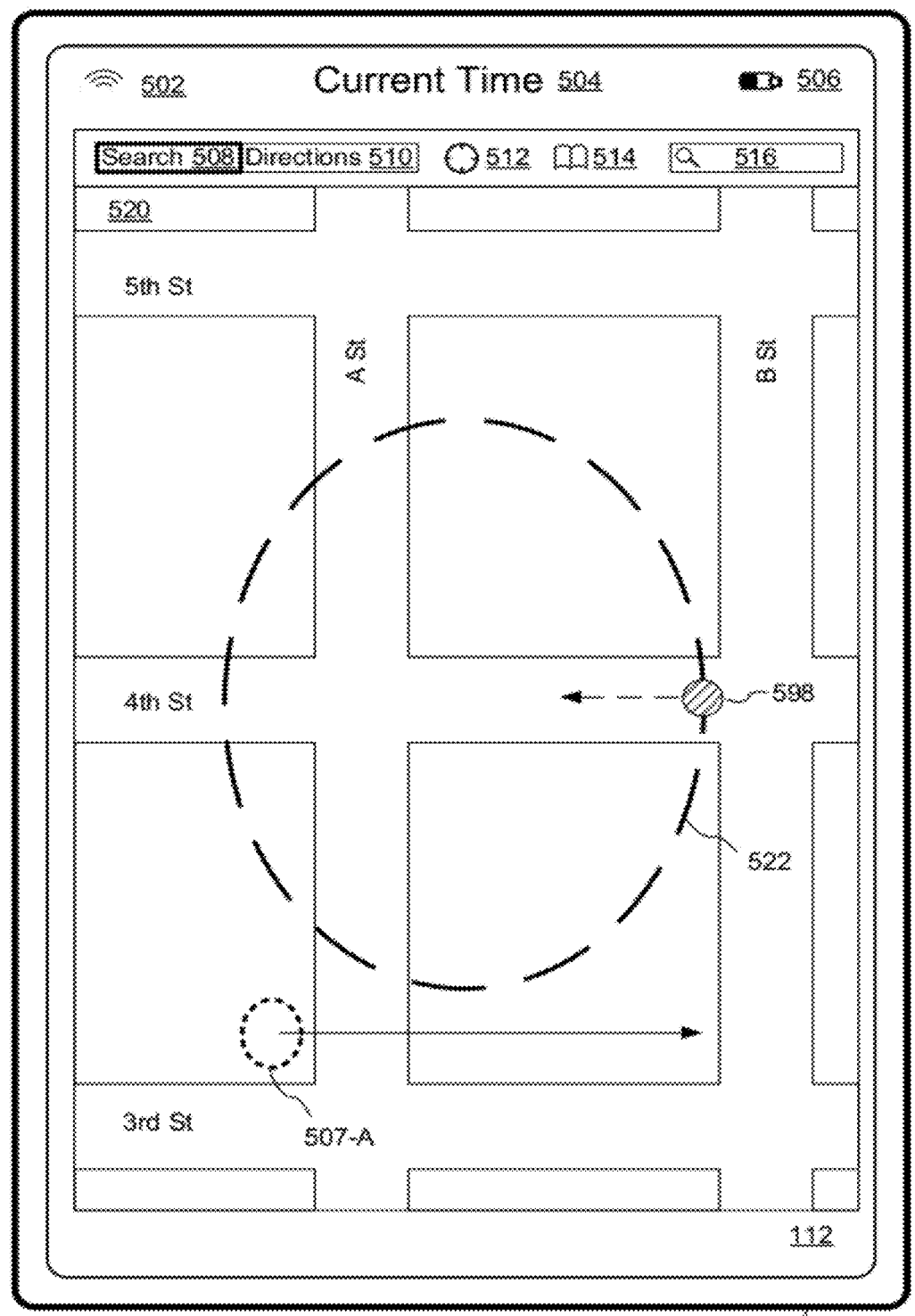
Figure 5R:
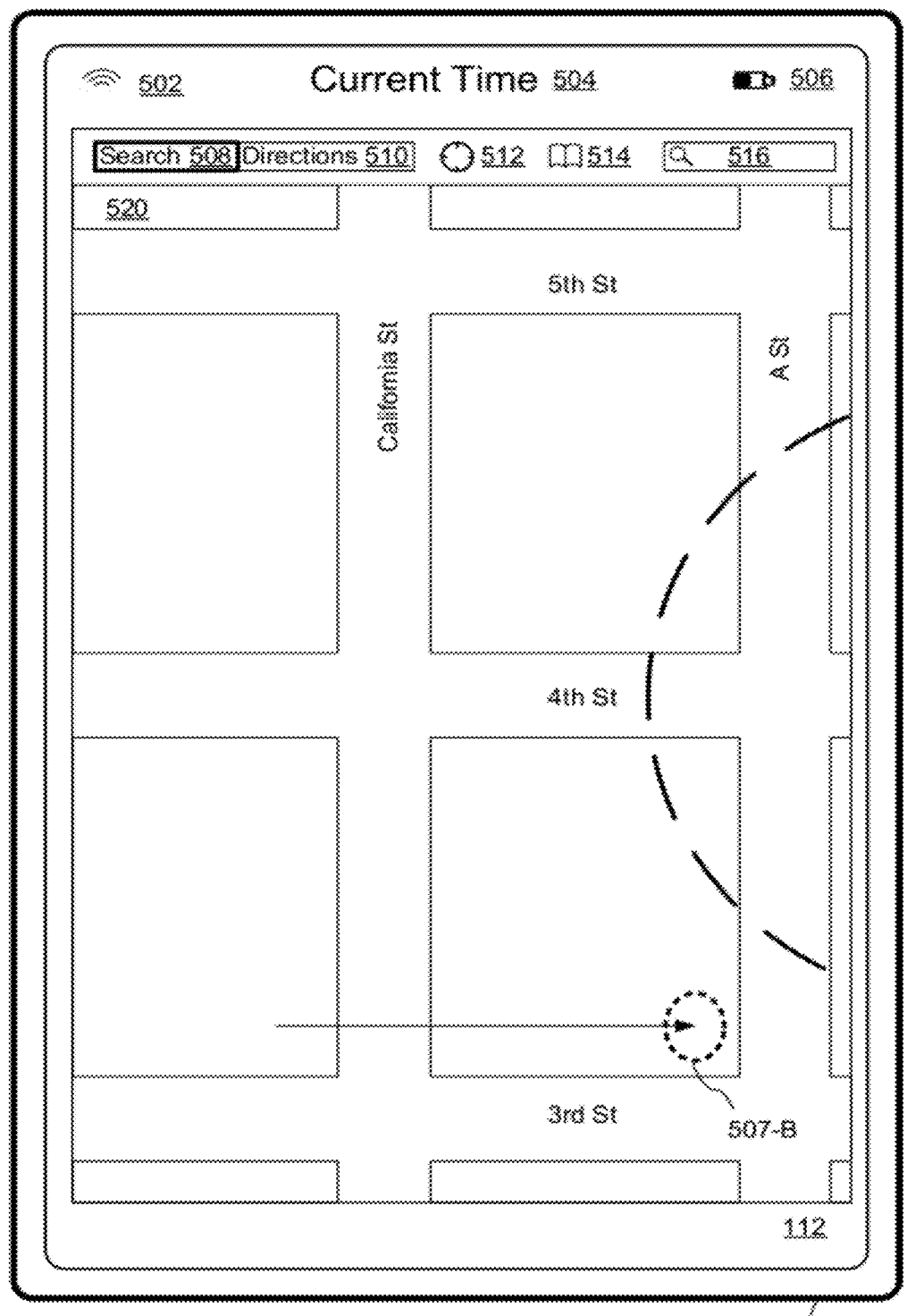
Figure 5S:
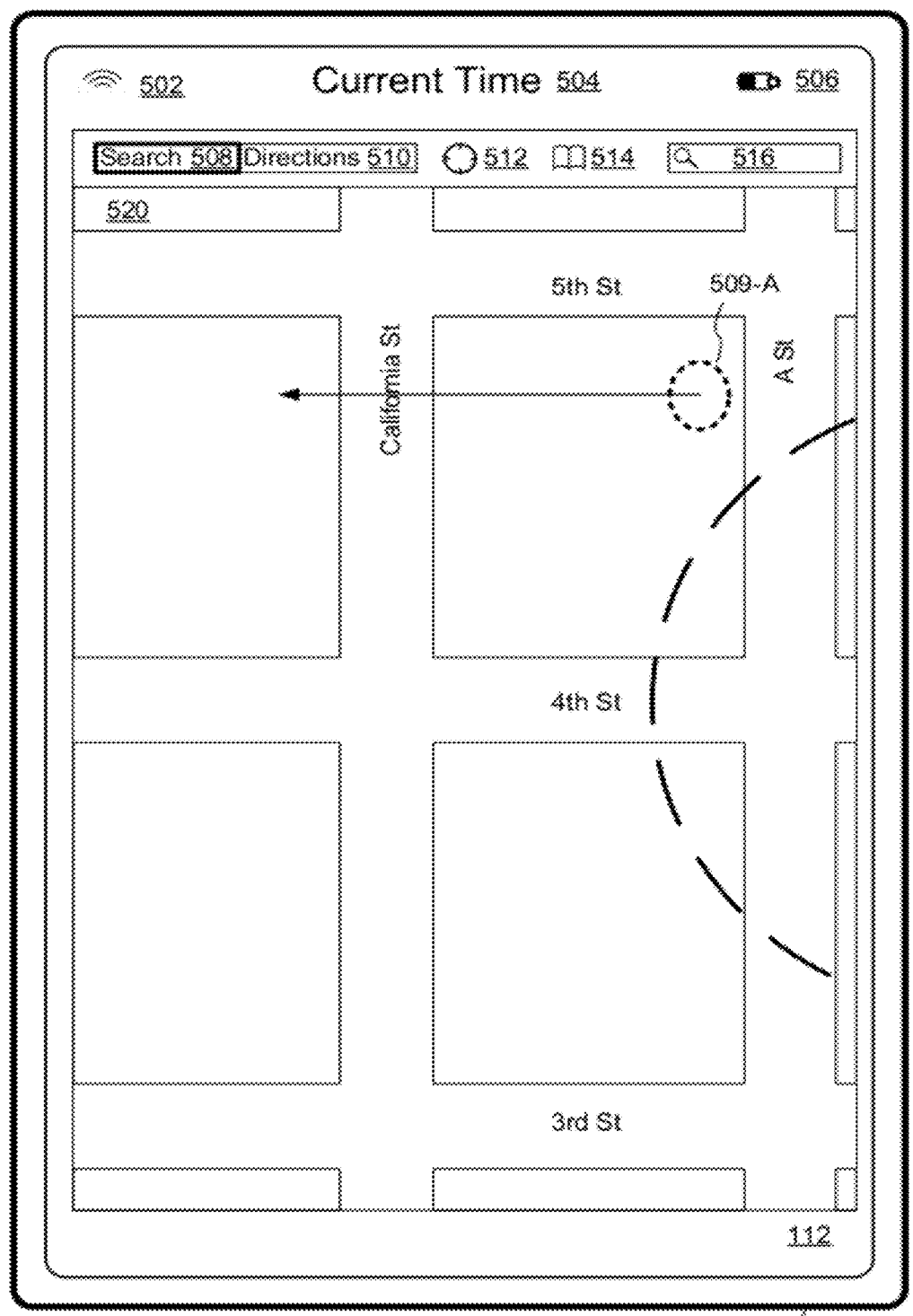
Figure 5T:
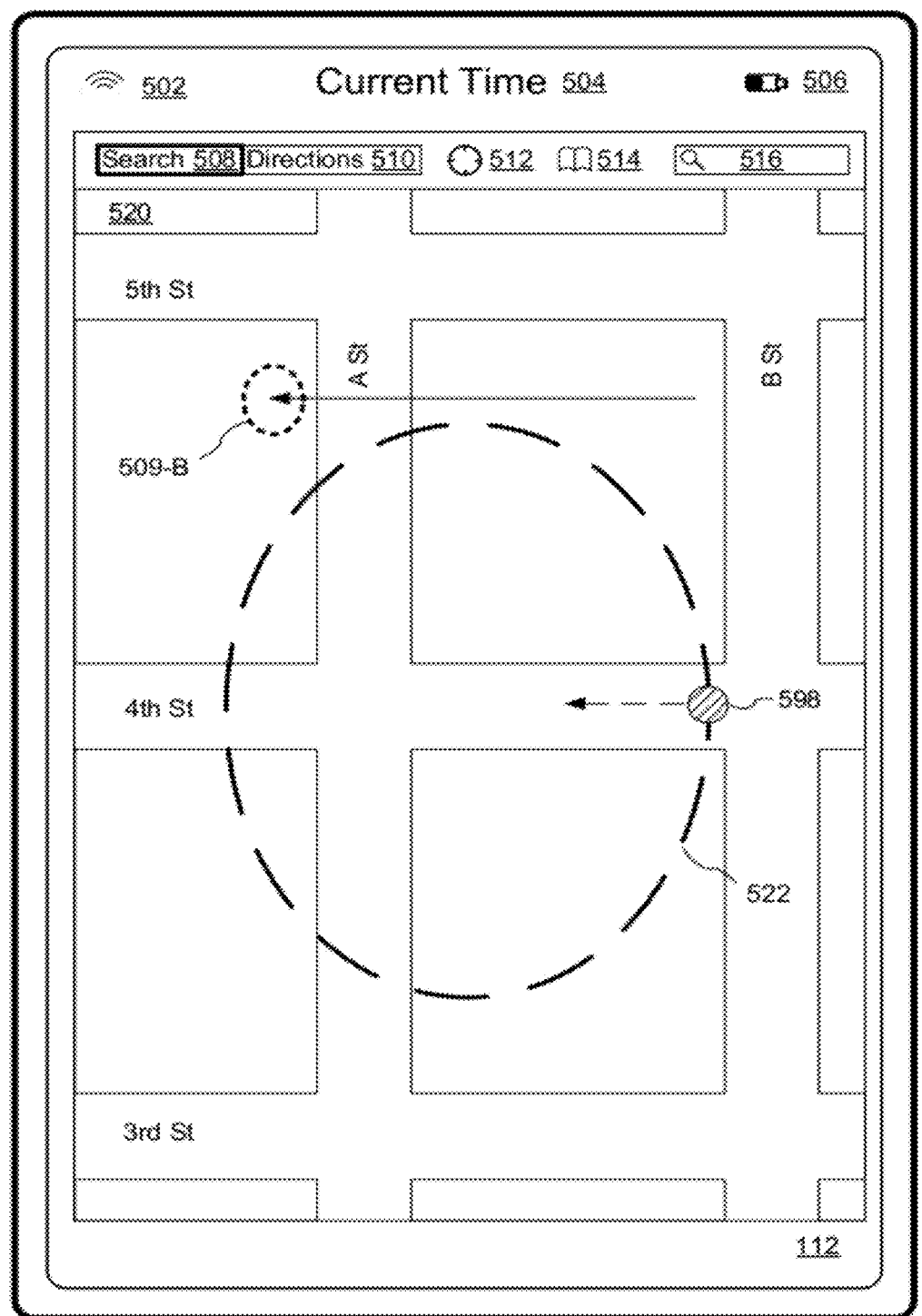
Figure 5U:
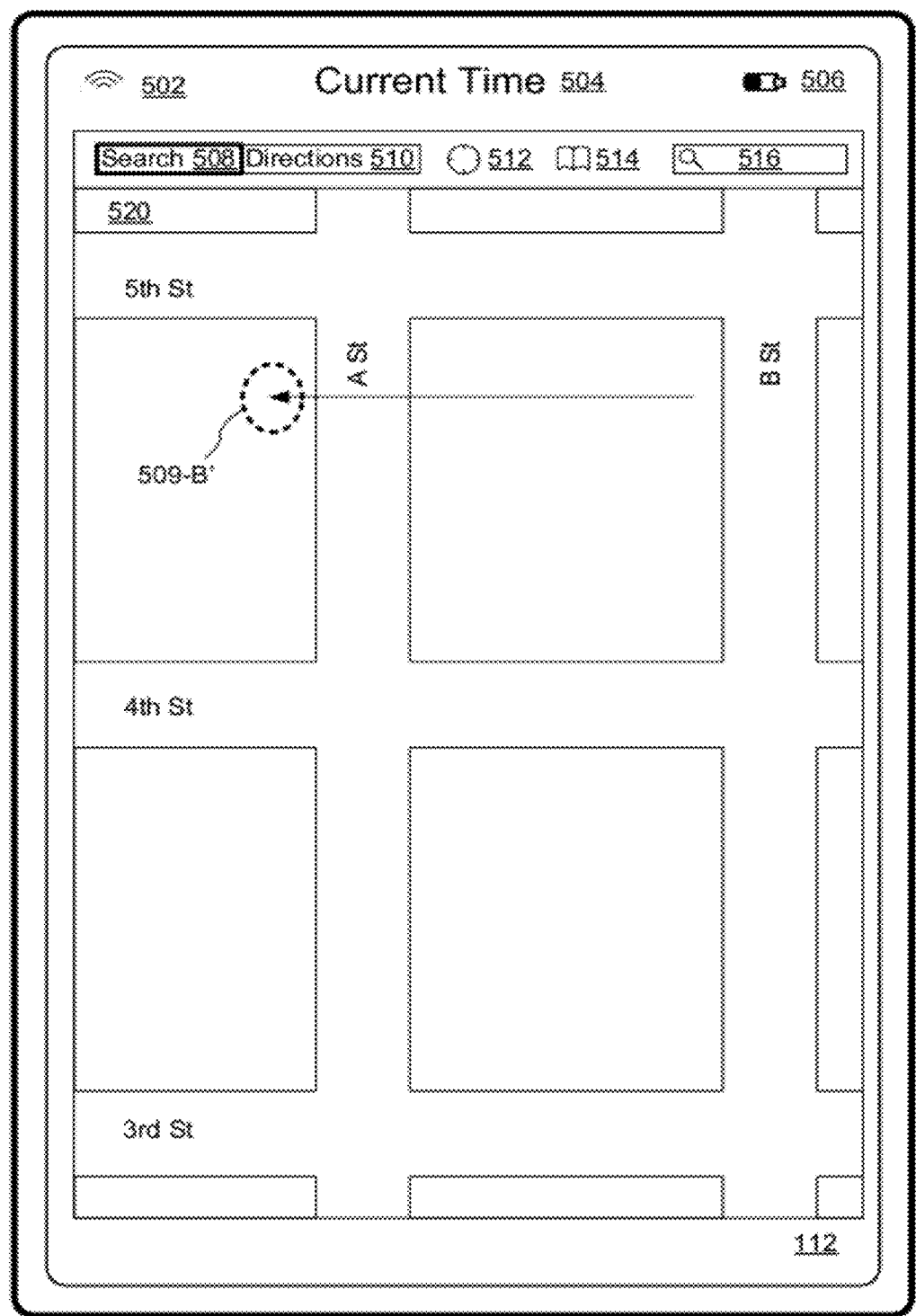
Figure 5V:
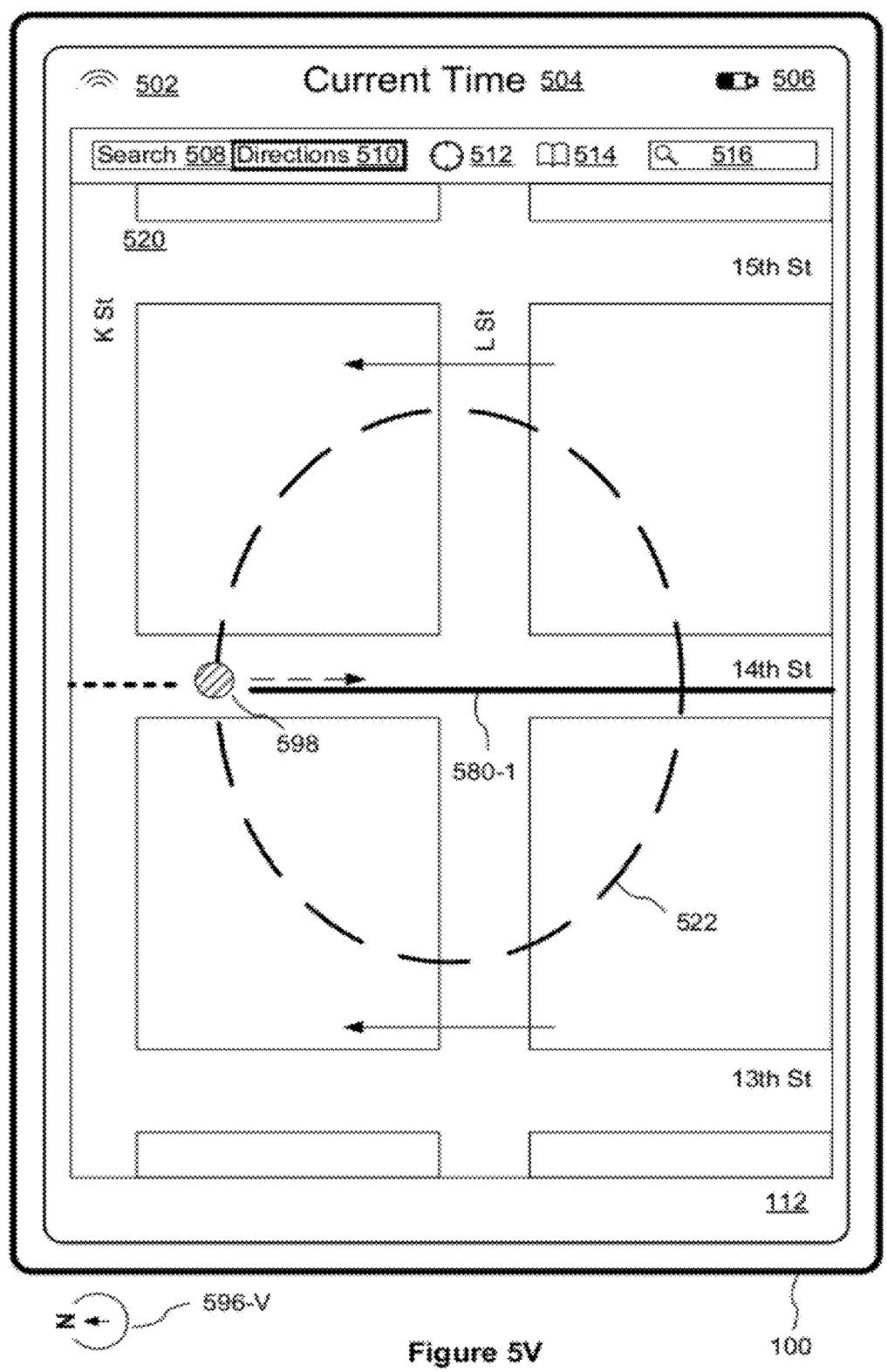
Figure 5W:
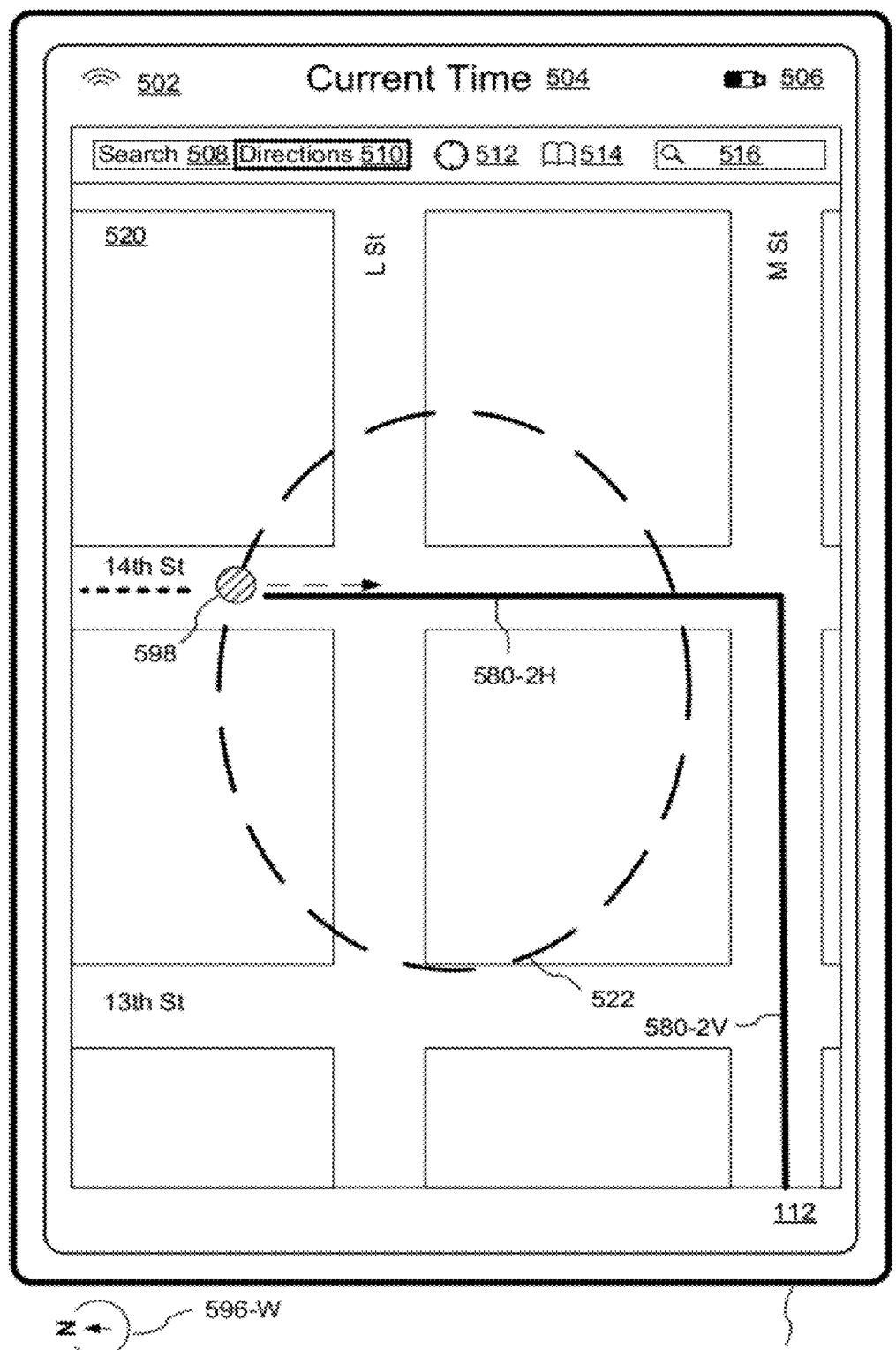
Figure 5X:
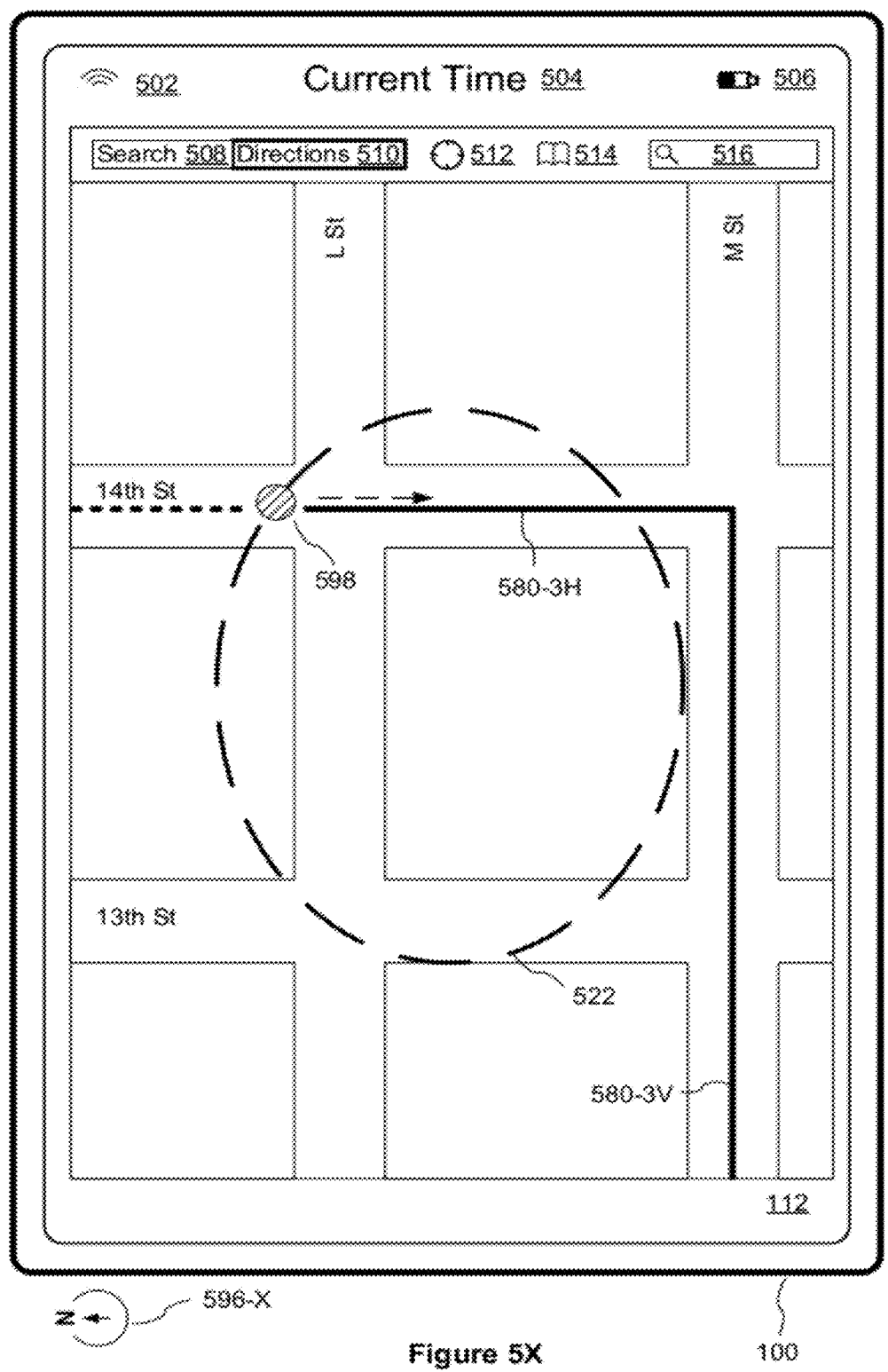
Figure 5Y:
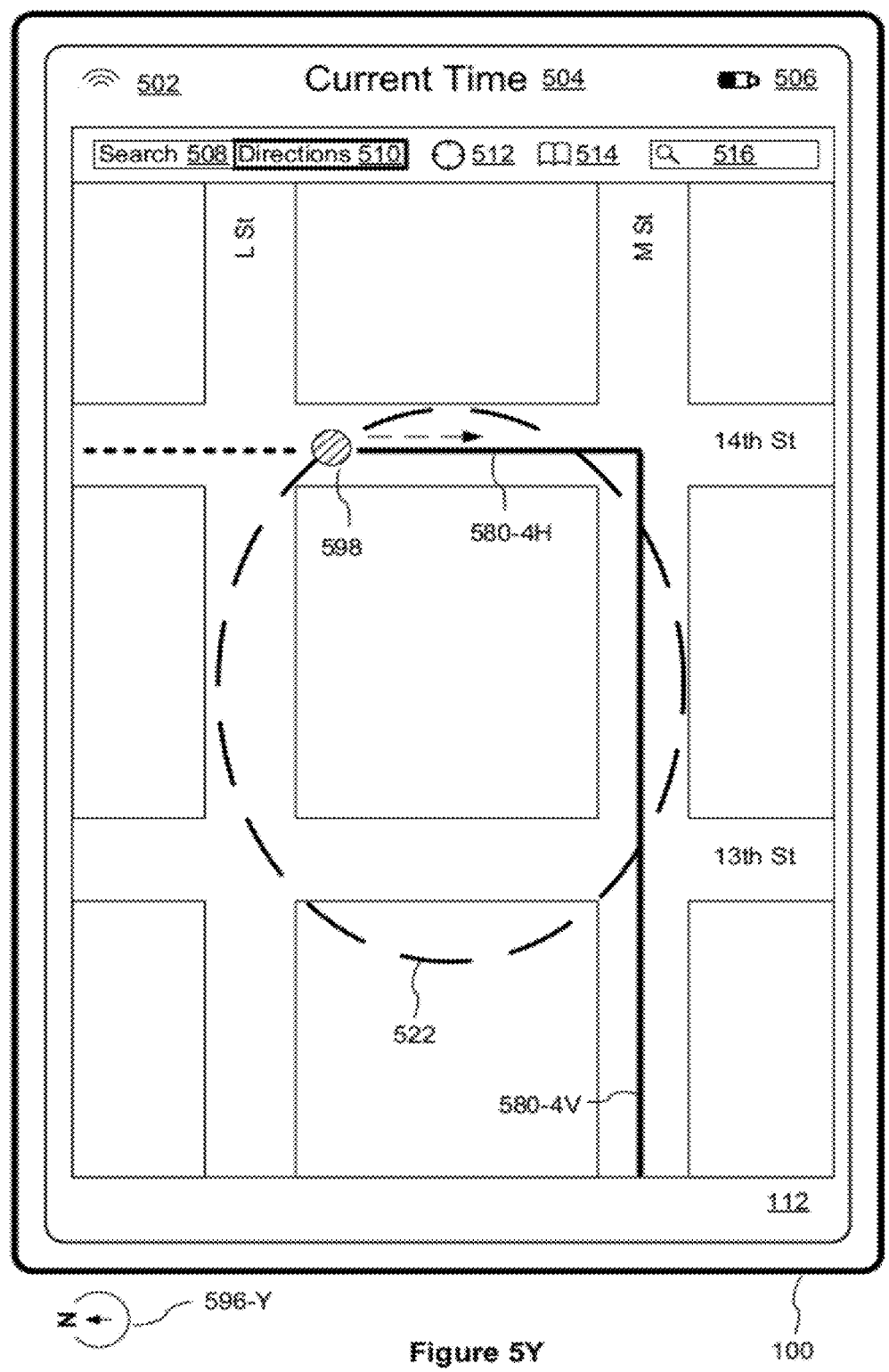
Figure 5Z:
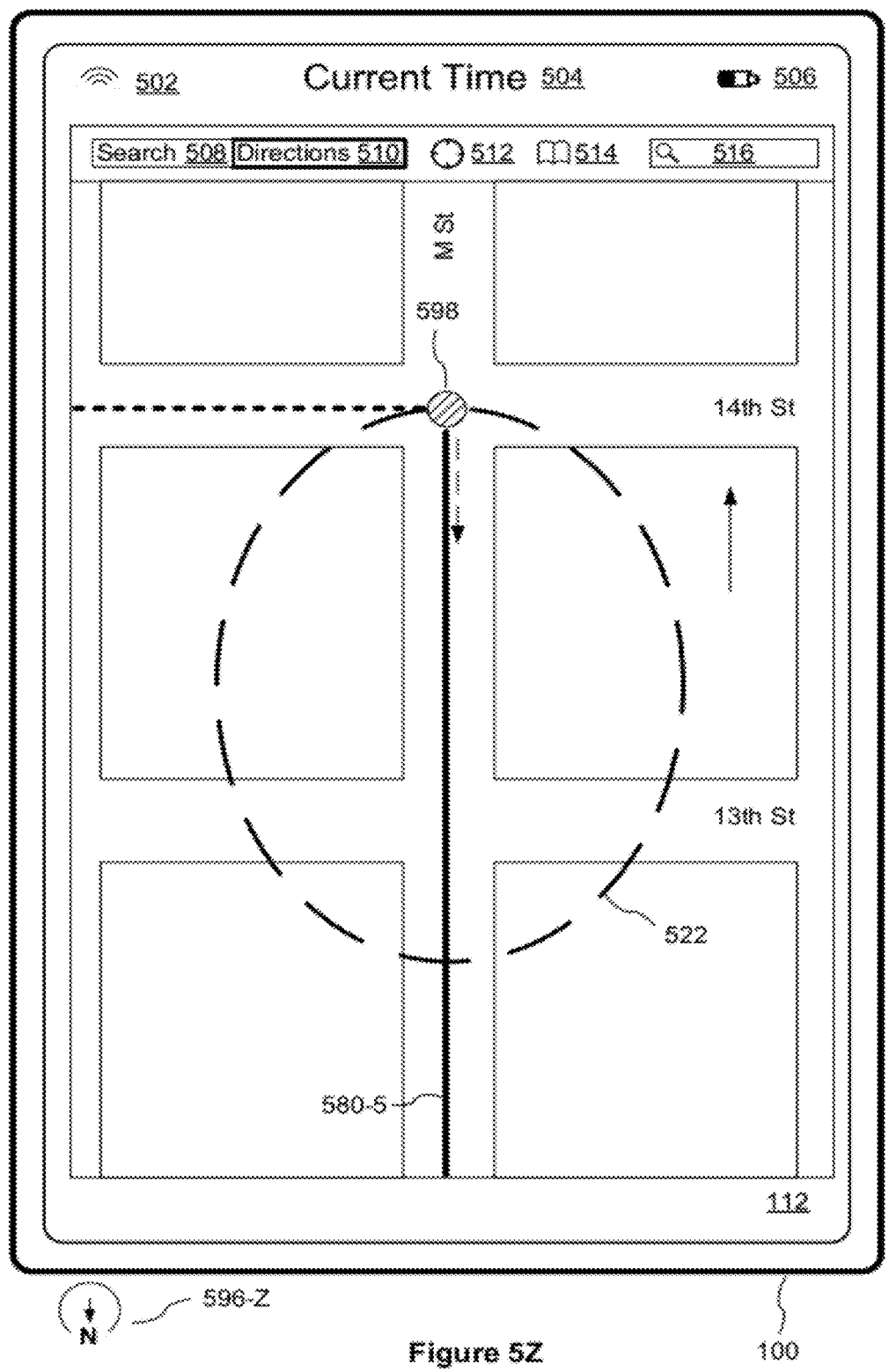
Figure 5A:
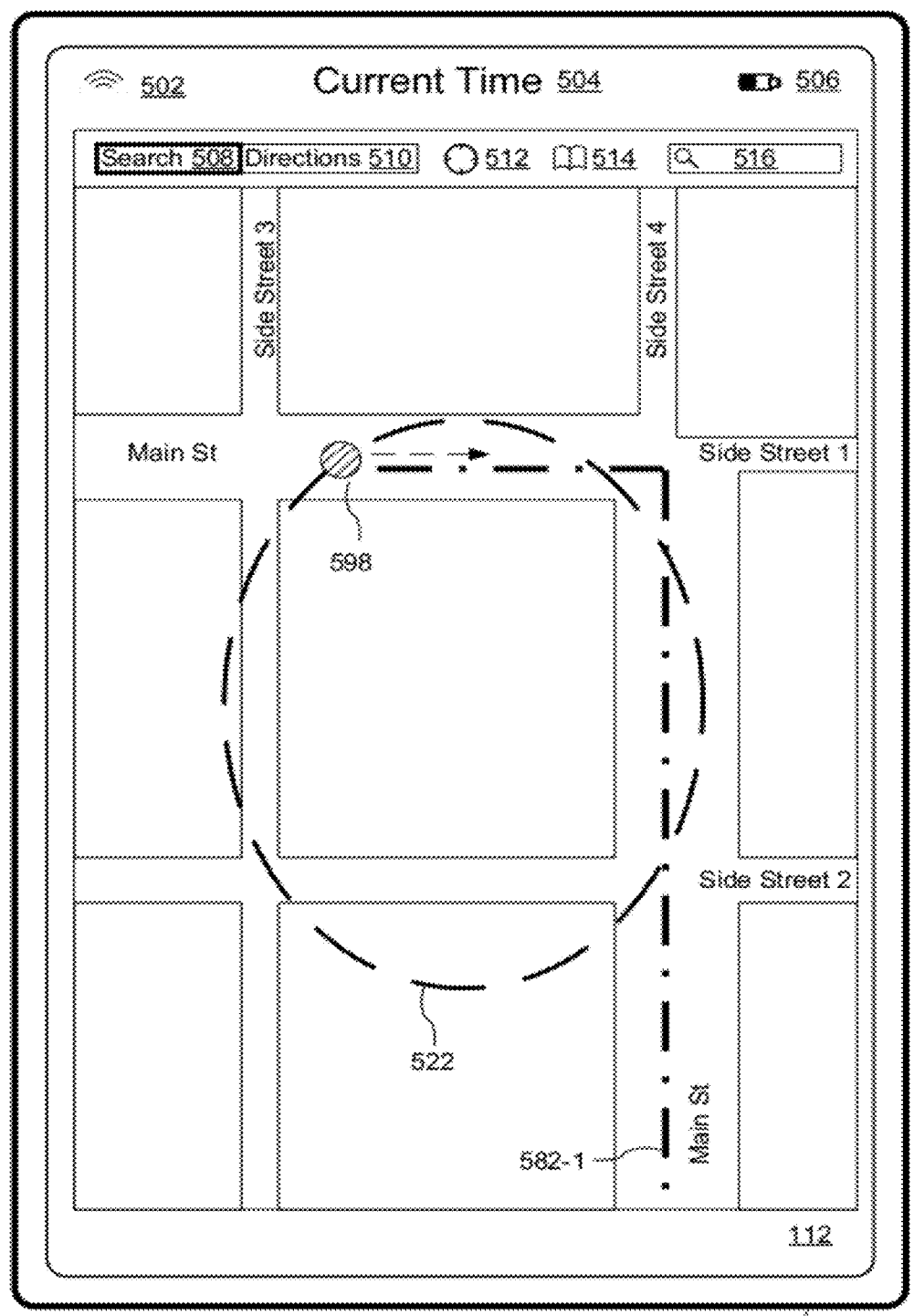
Figure 5B:
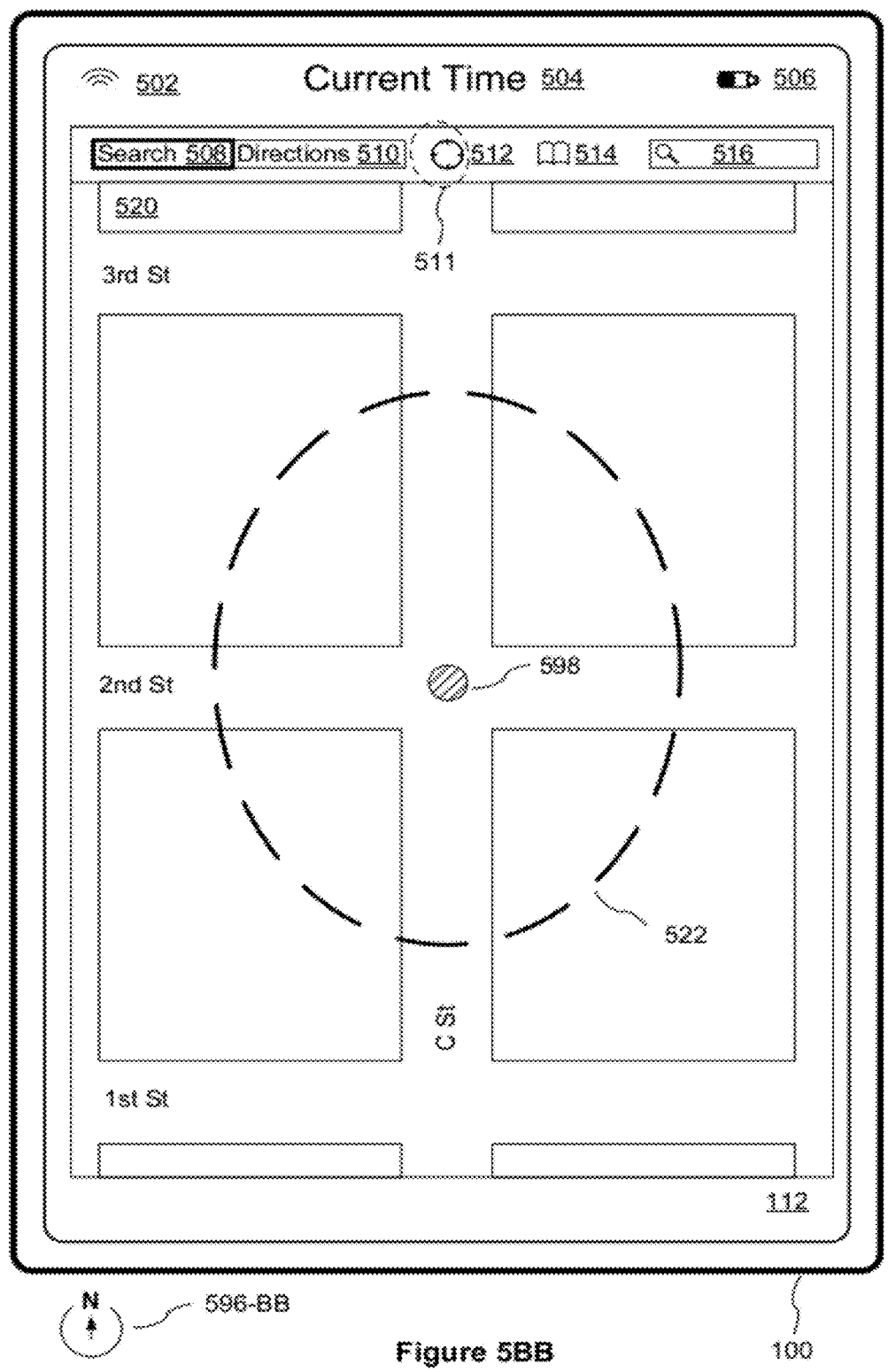
Figure 5C:
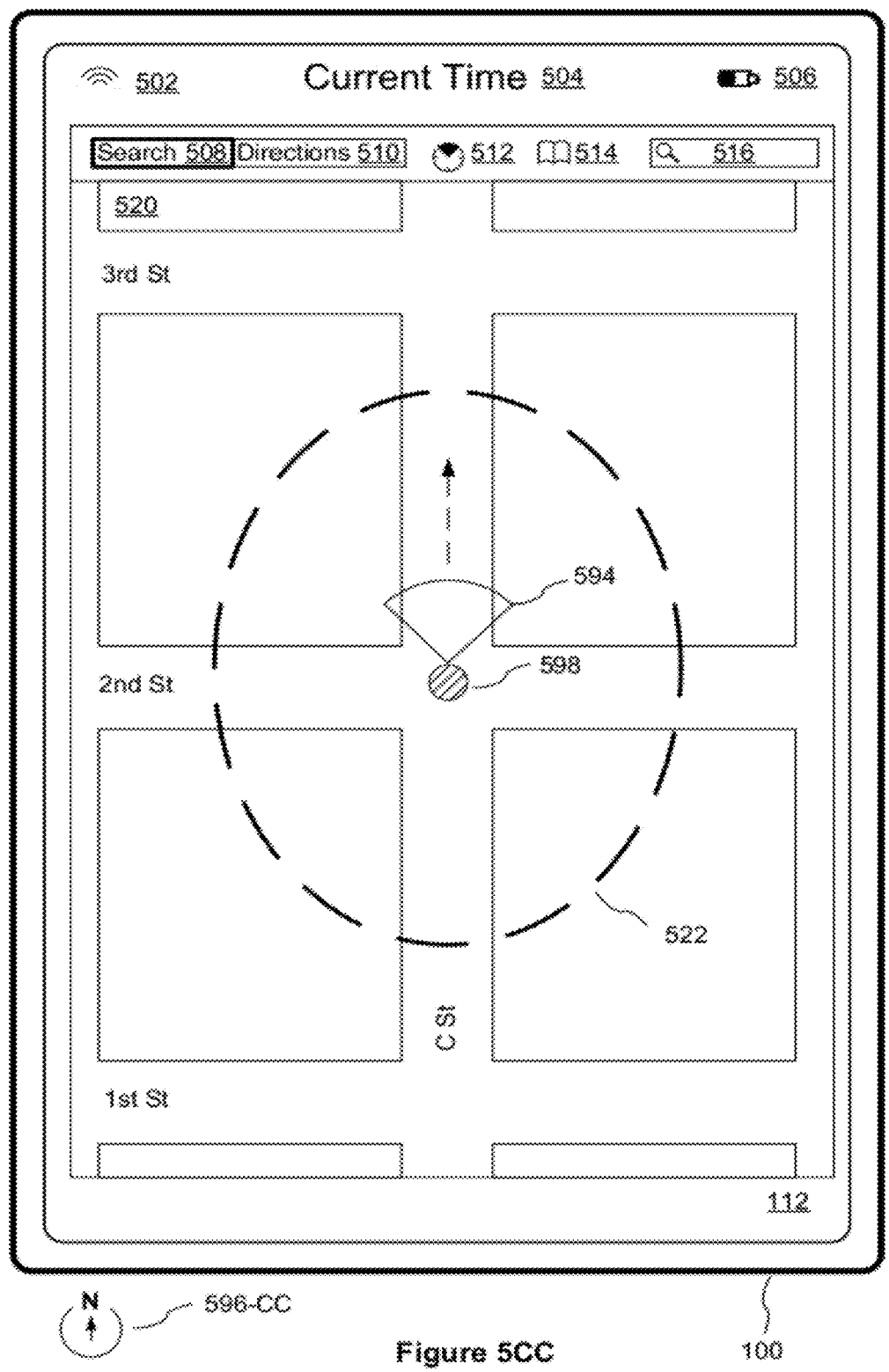
Figure 5D:
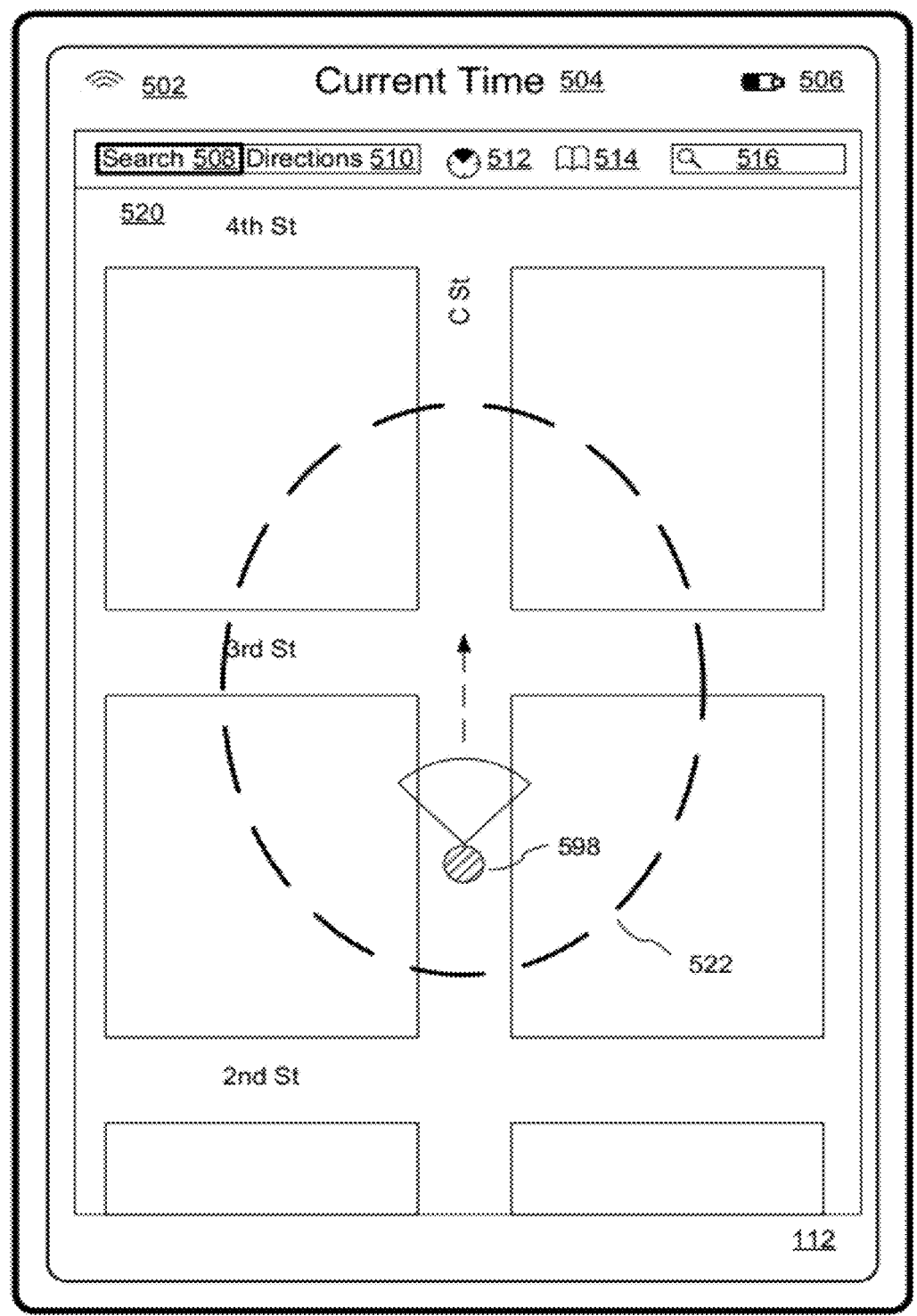
Figure 5D:
Figure 5E:
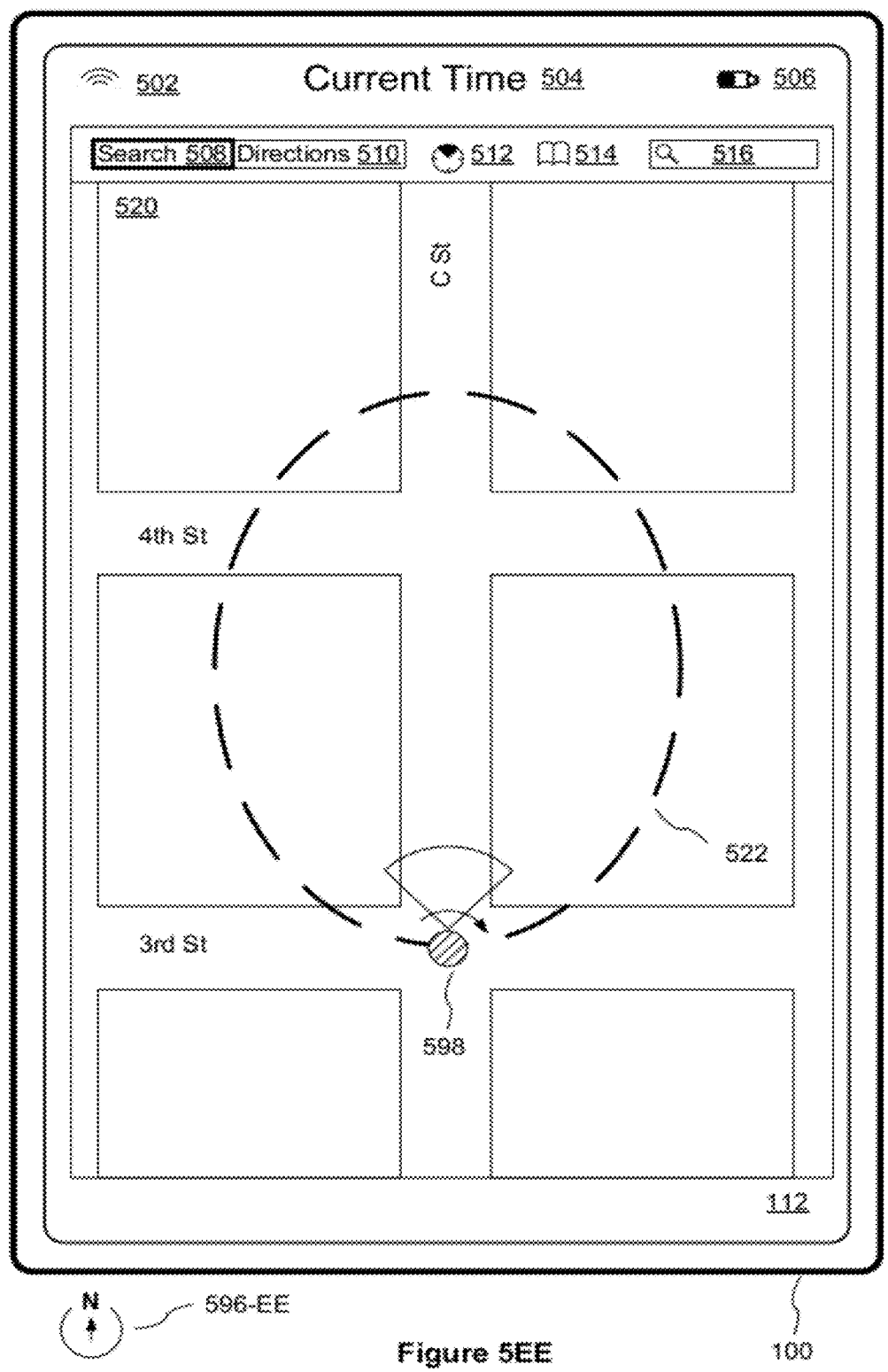
Figure 5F:
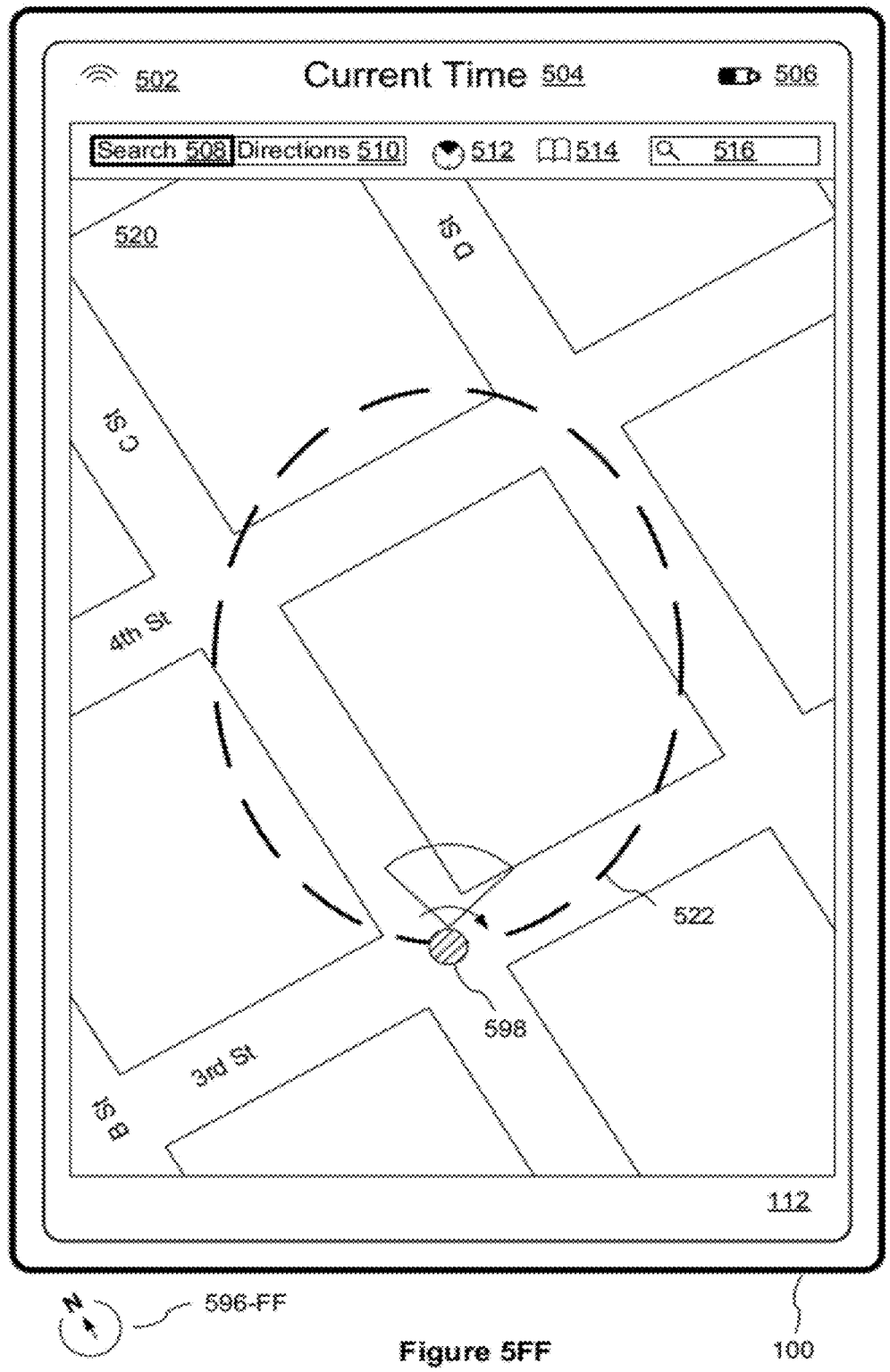
Figure 5G:
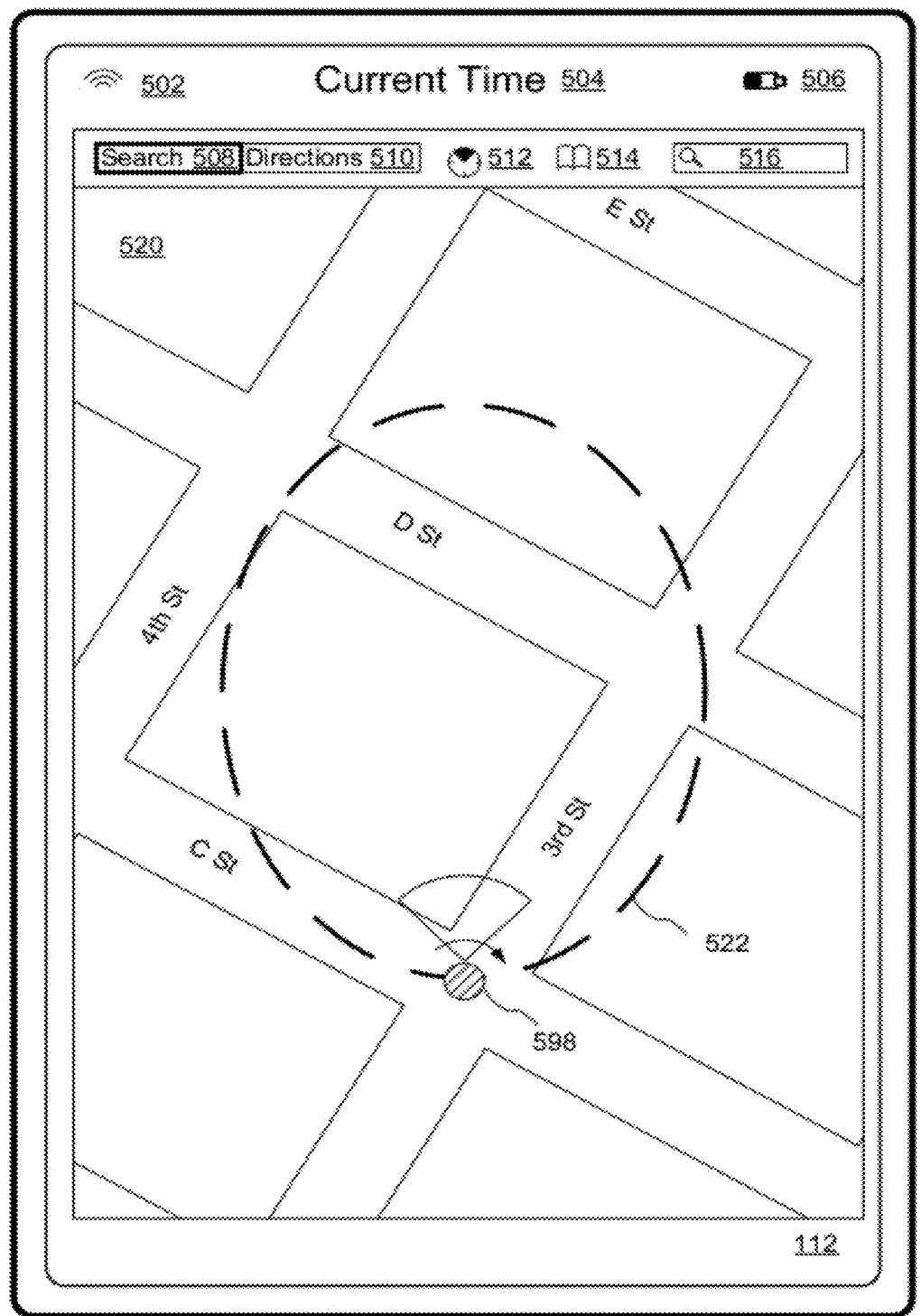
Figure 5H:
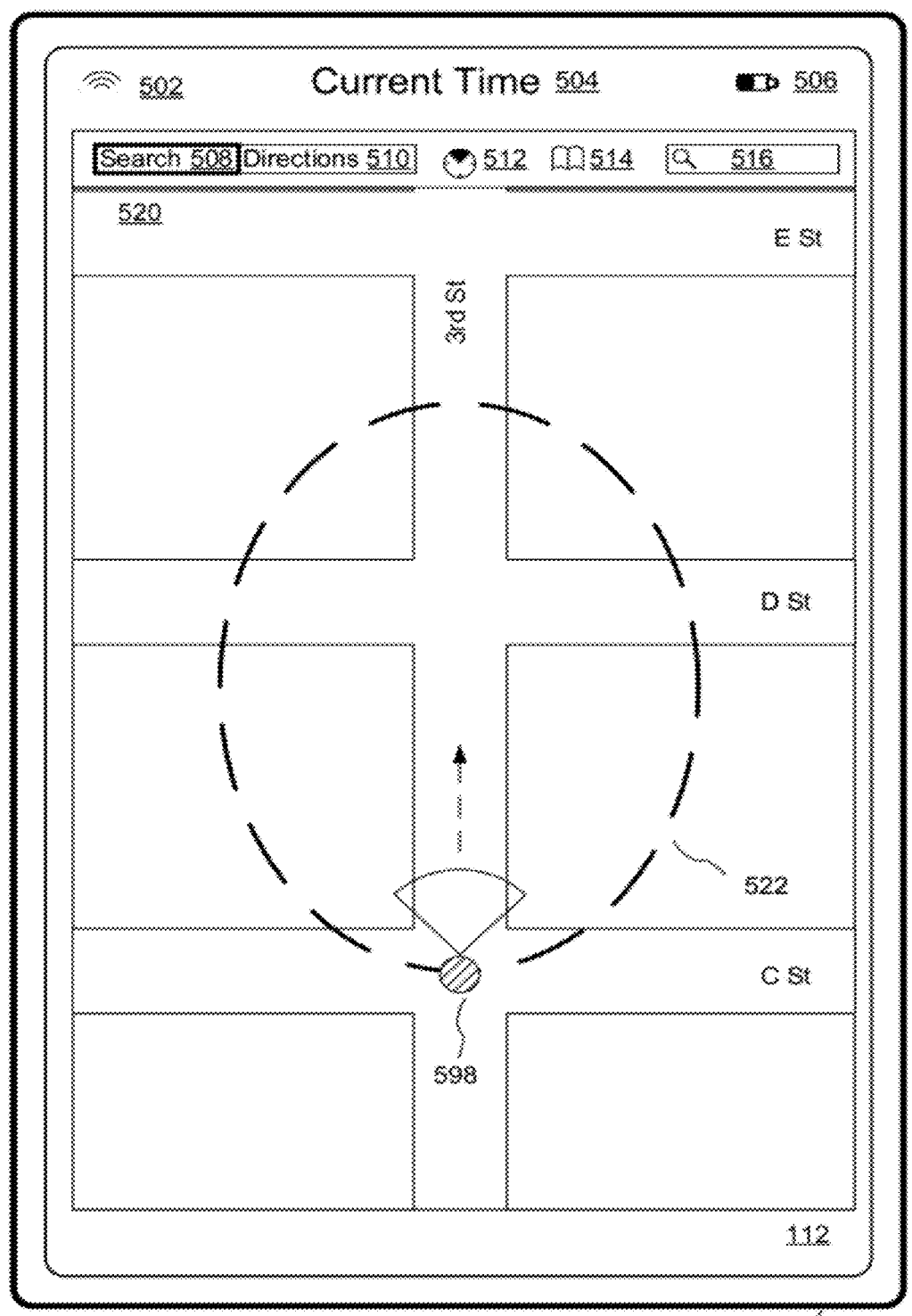
Figure 5H:
Figure 5H:
Figure 5I:
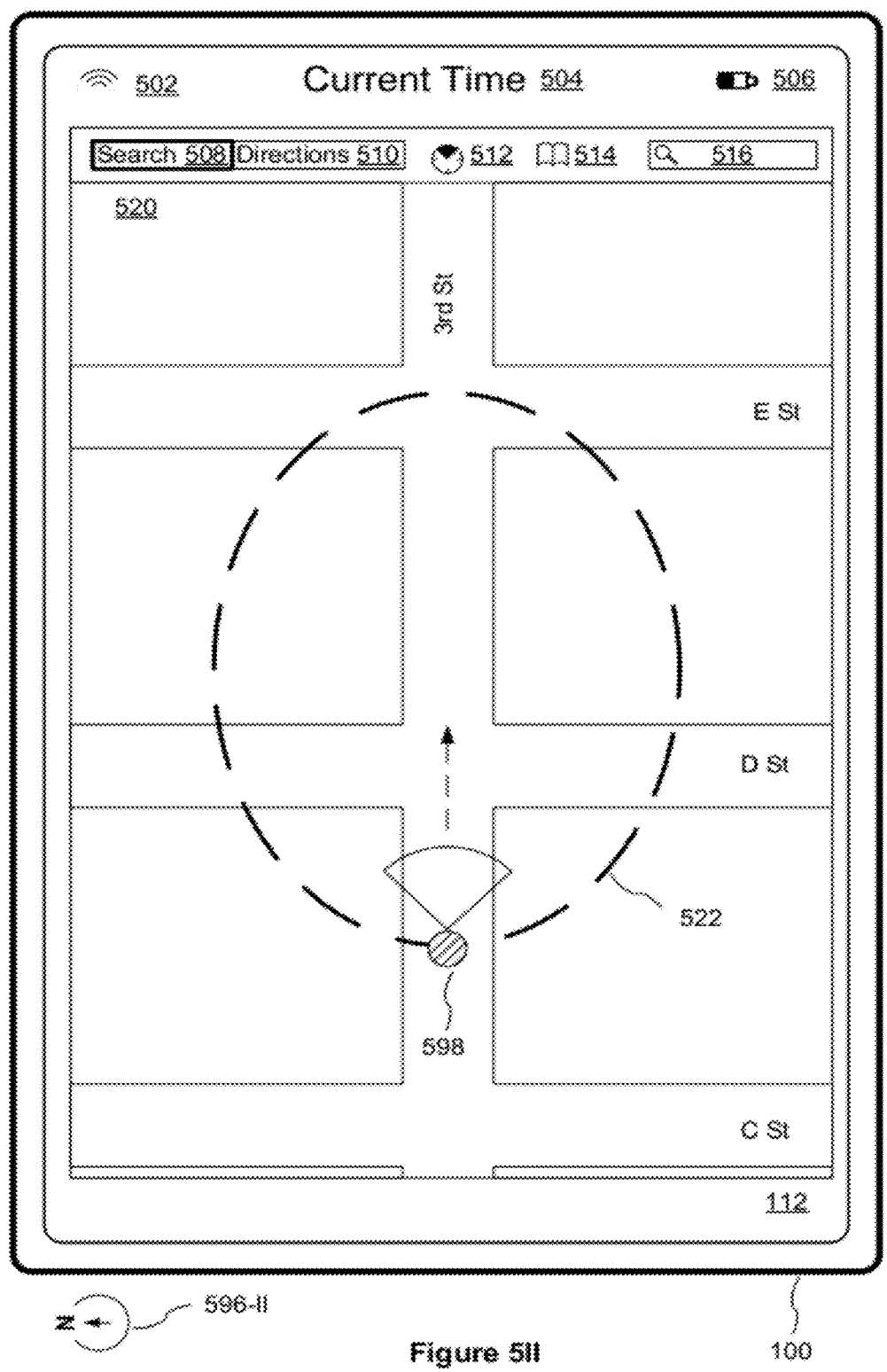
Figure 5J:
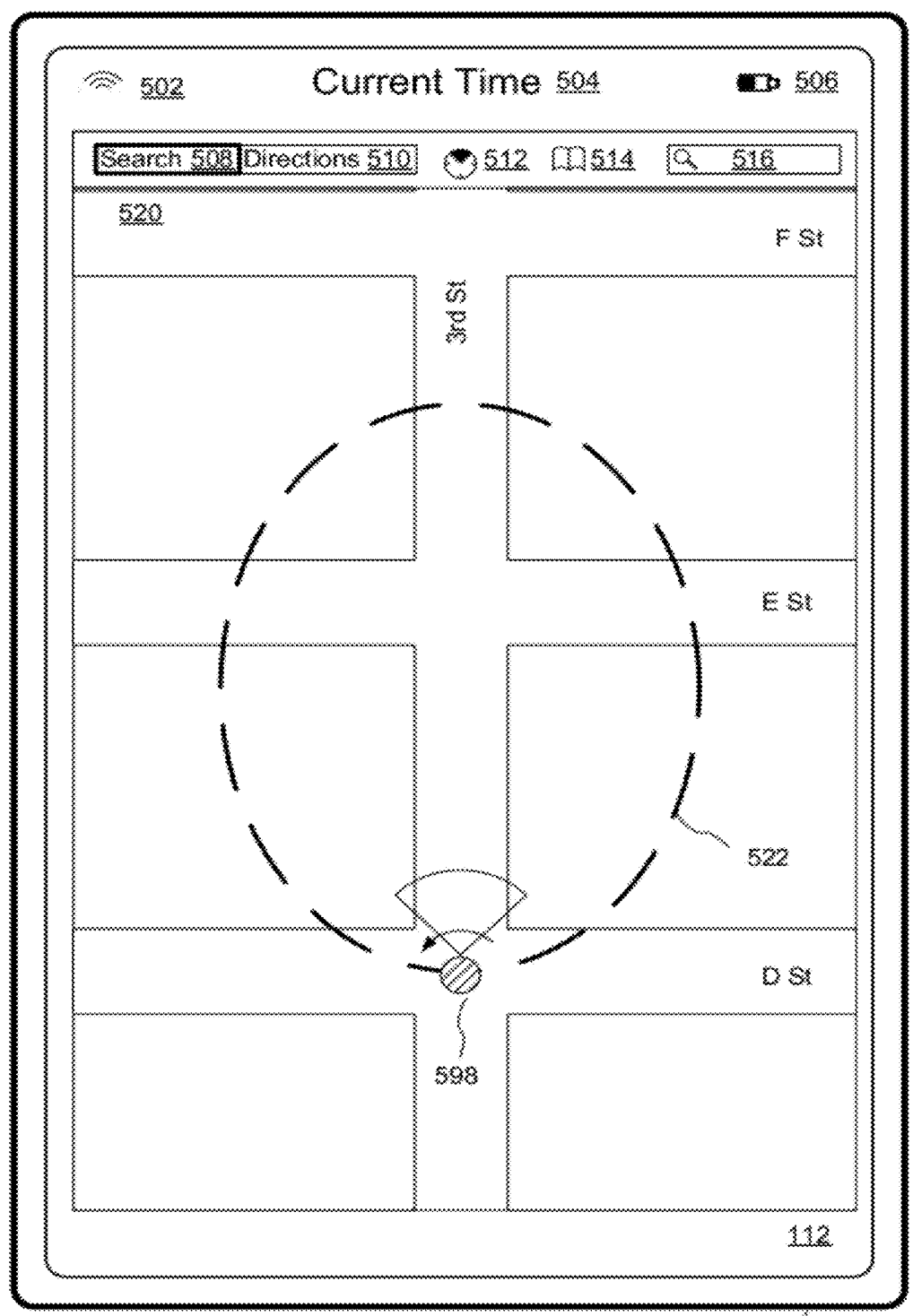
Figure 5K:
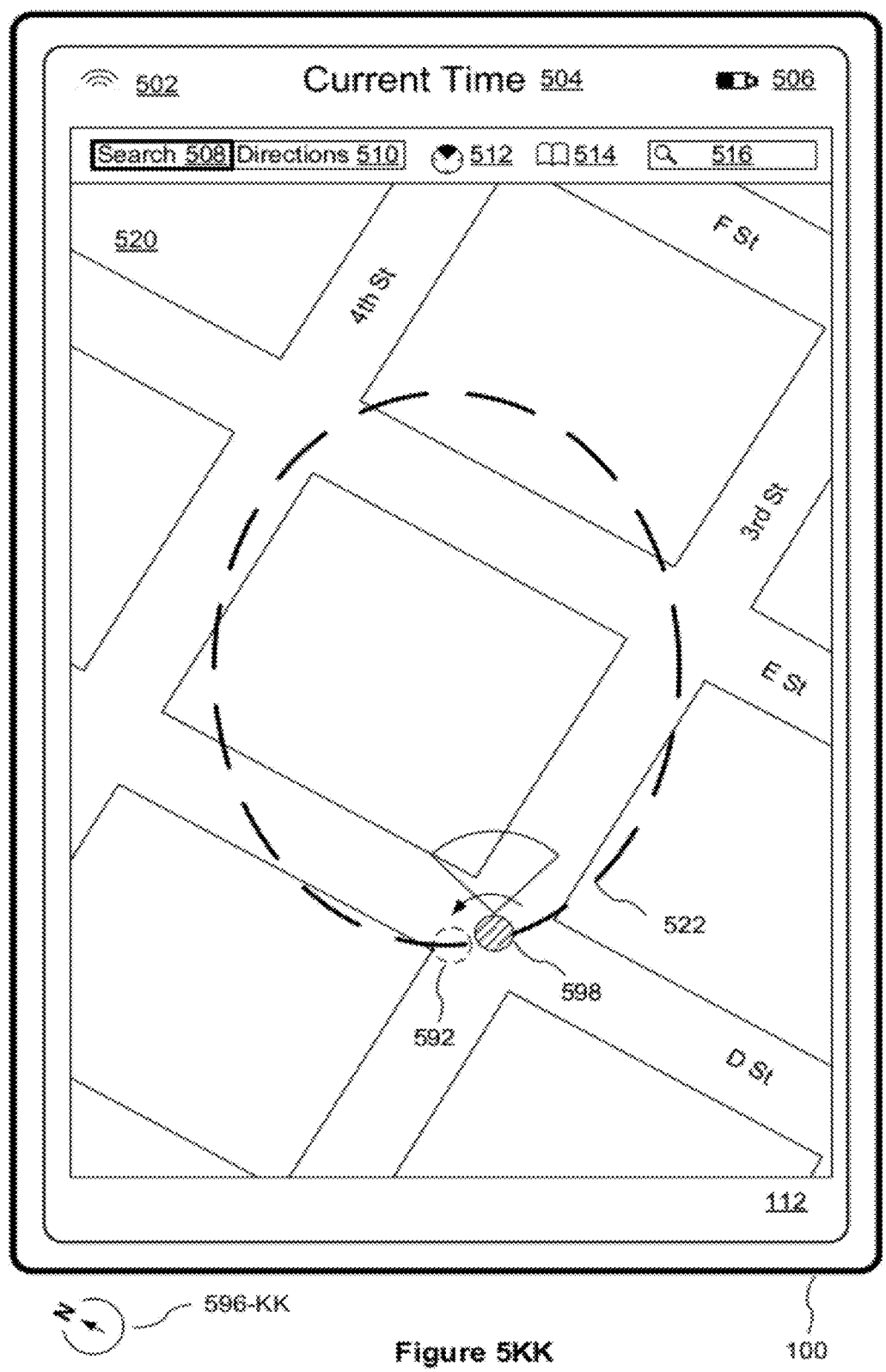
Figure 5L:
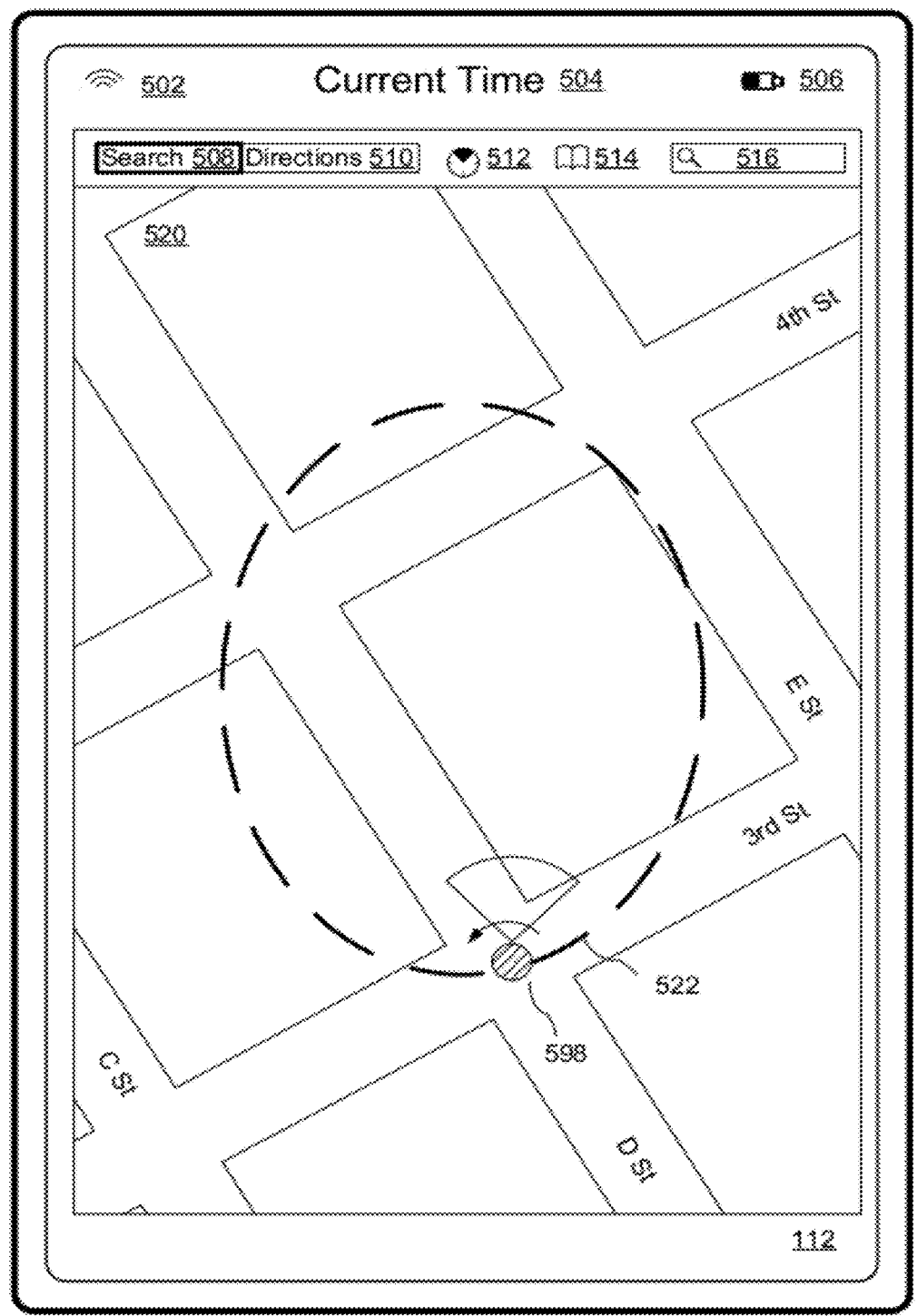
Figure 5L:
Figure 5M:
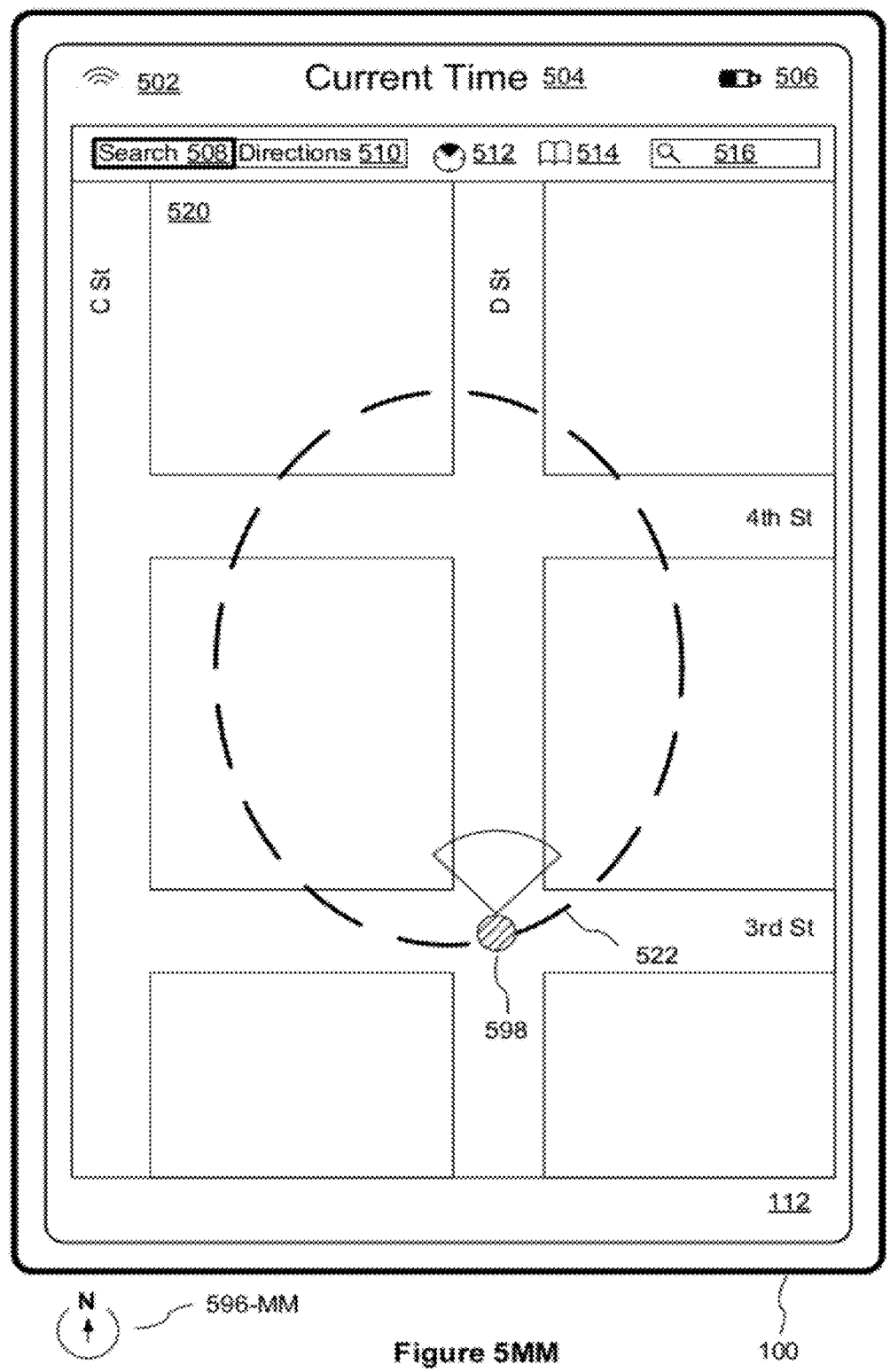
Figure 5N:
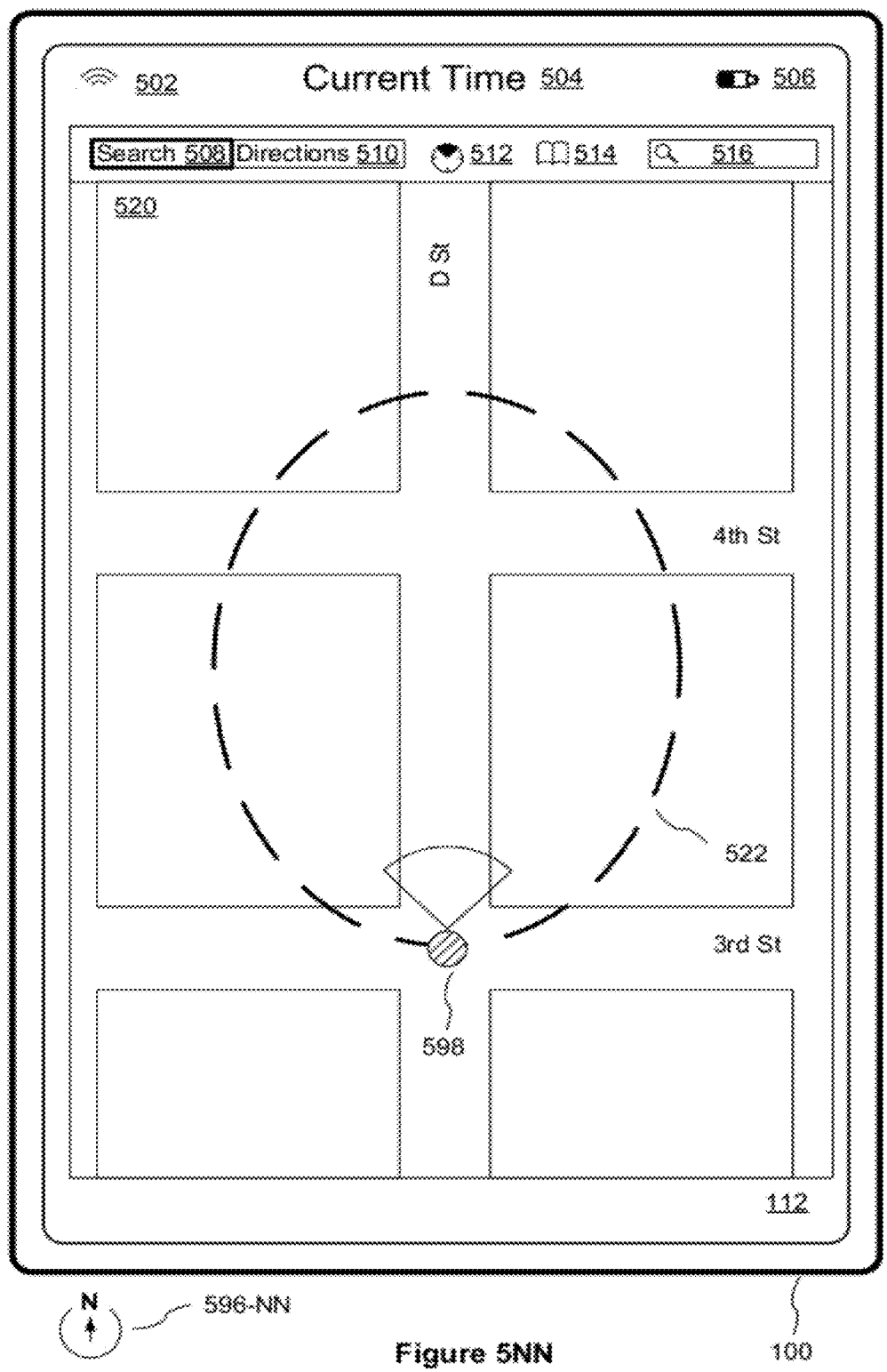
Figure 5O:
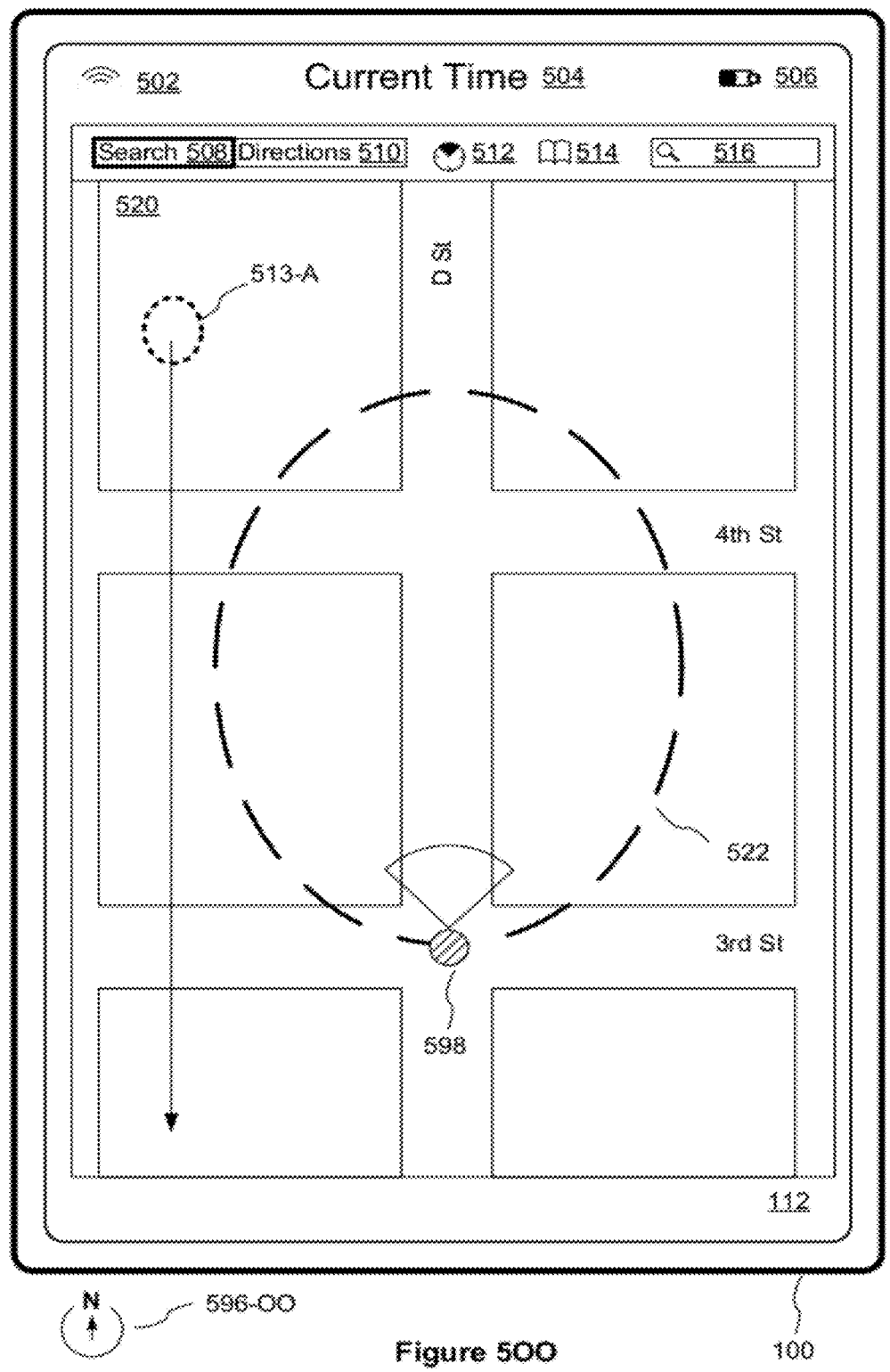
Figure 5P:
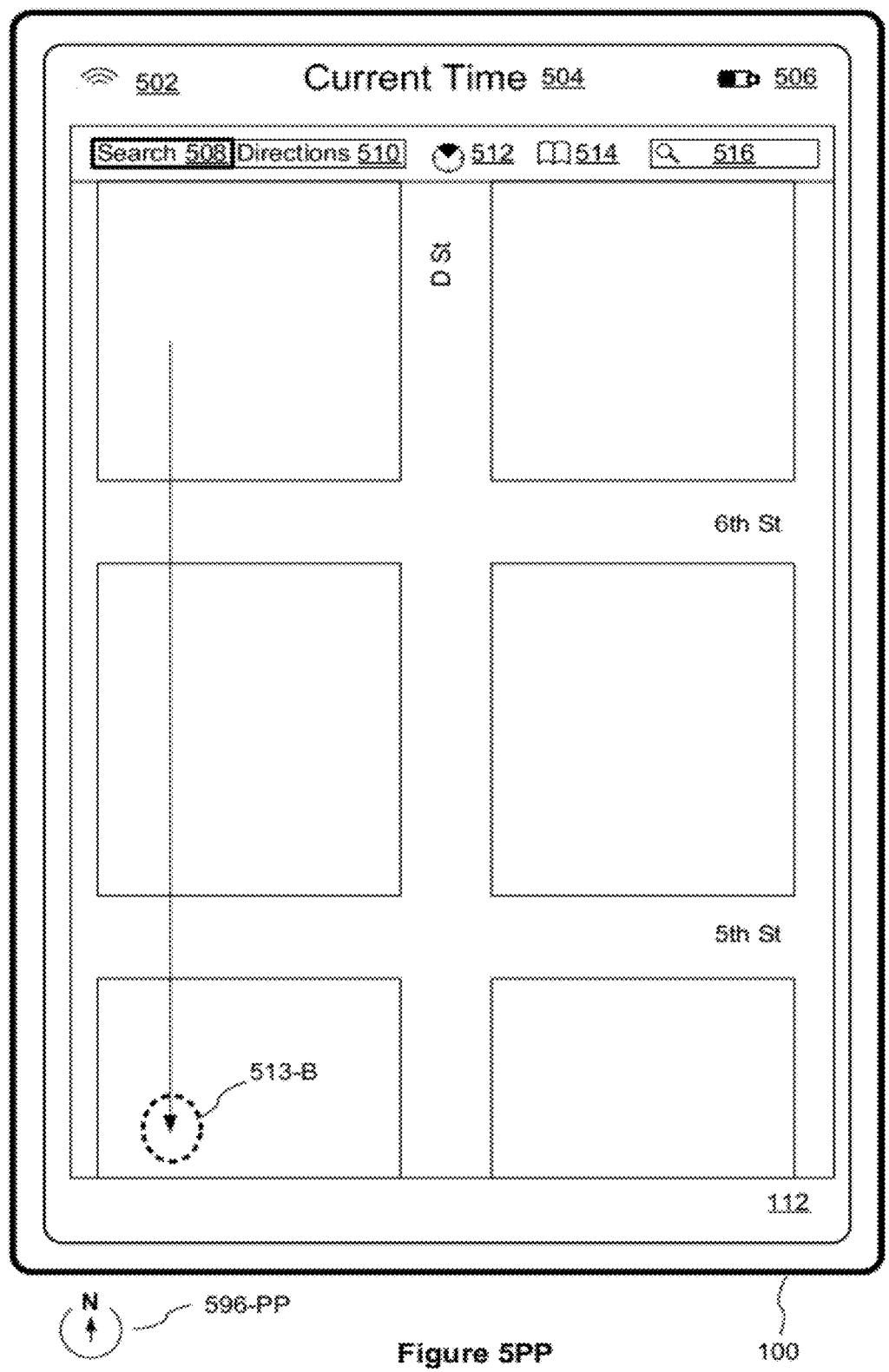
Figure 5Q:
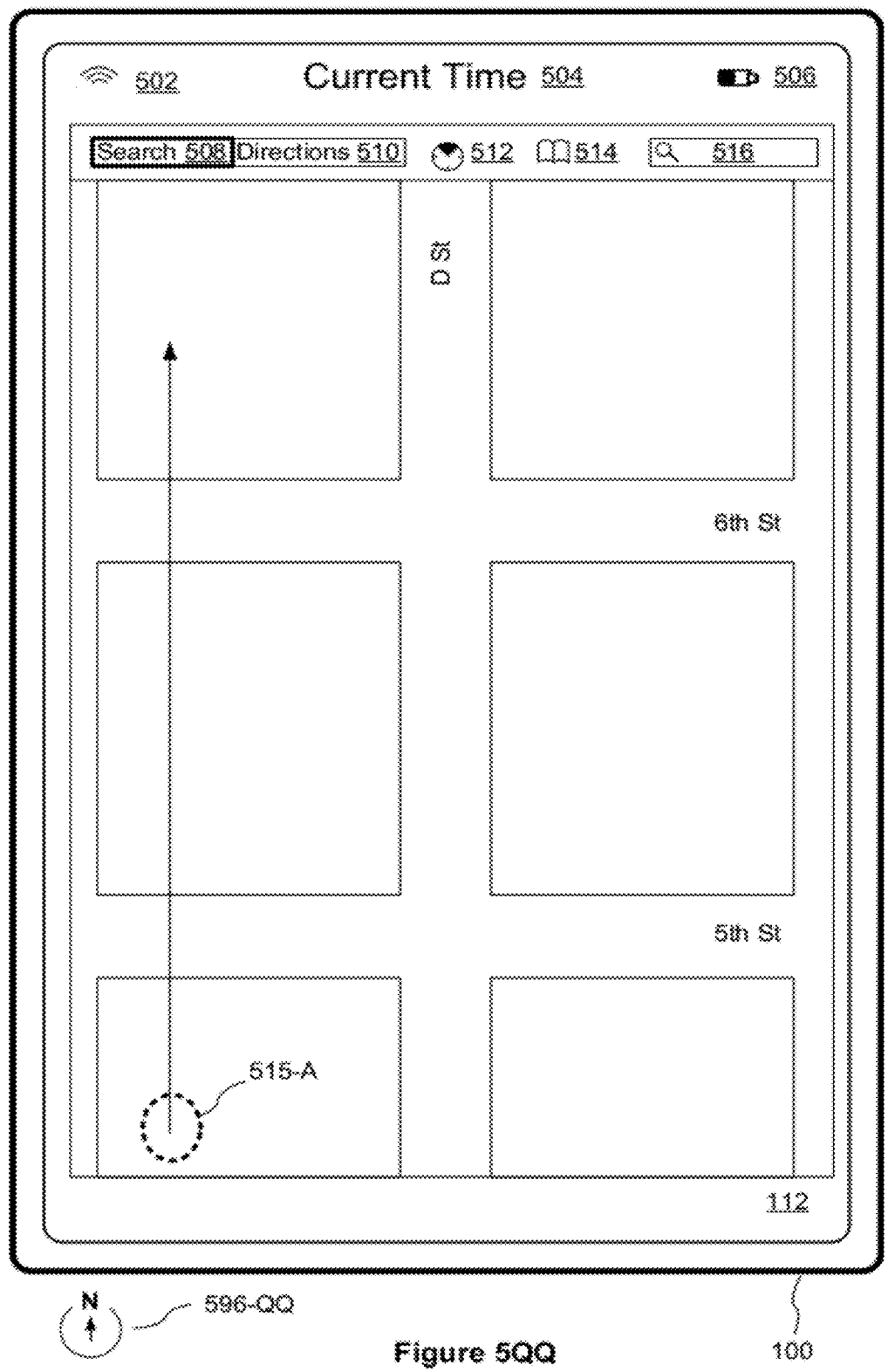
Figure 5R:
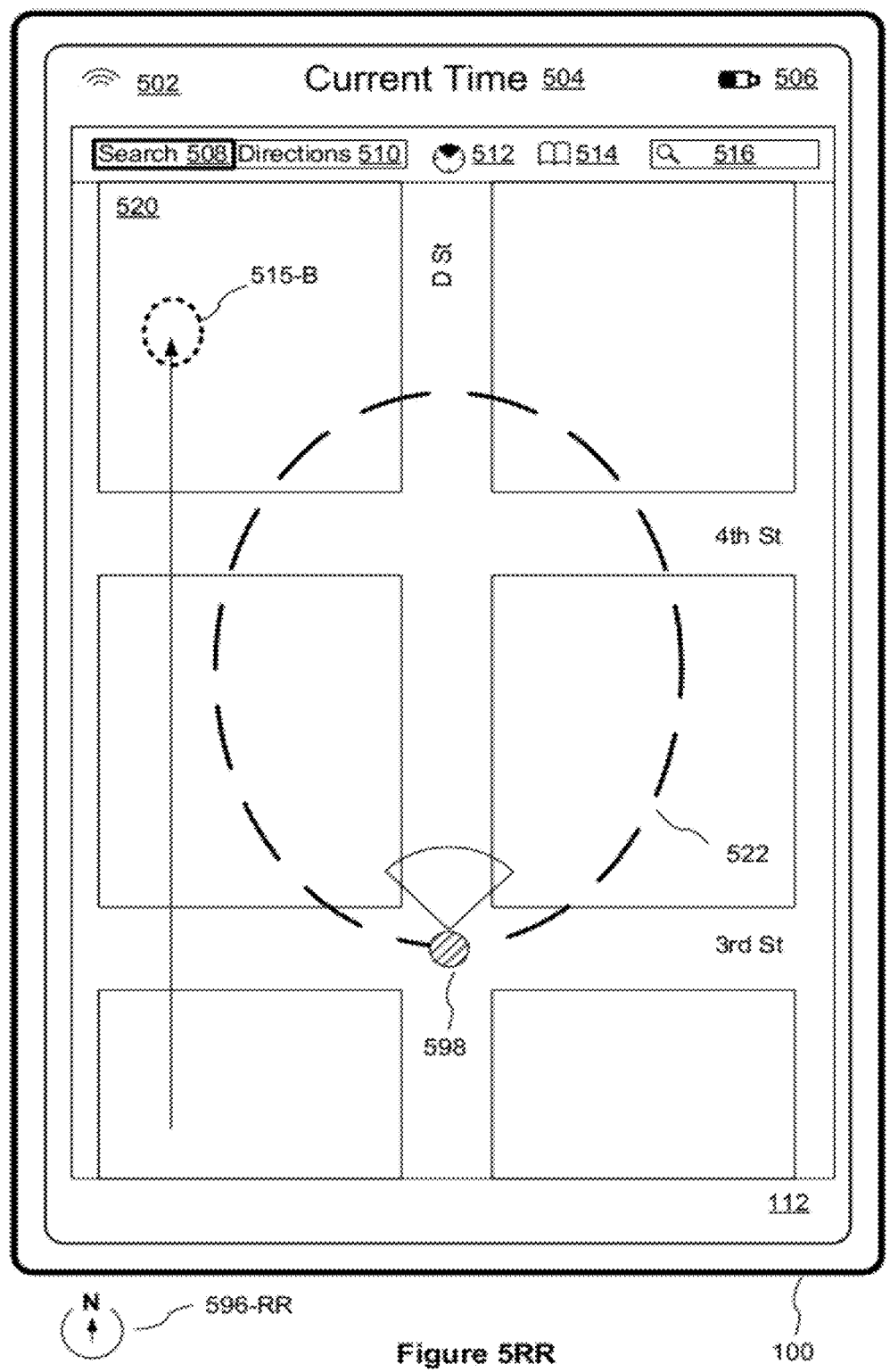
Figure 5S:
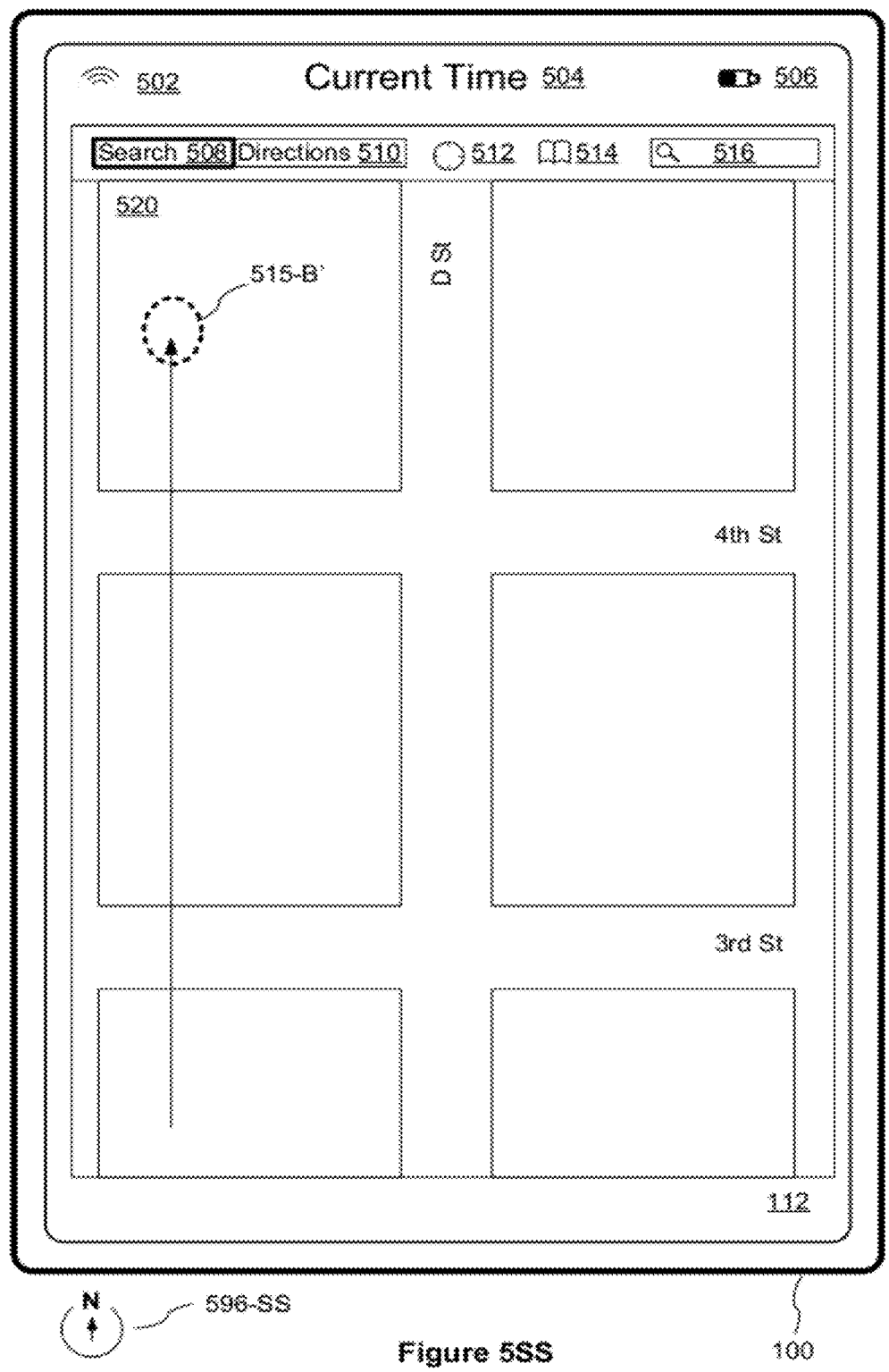
Figure 5T:
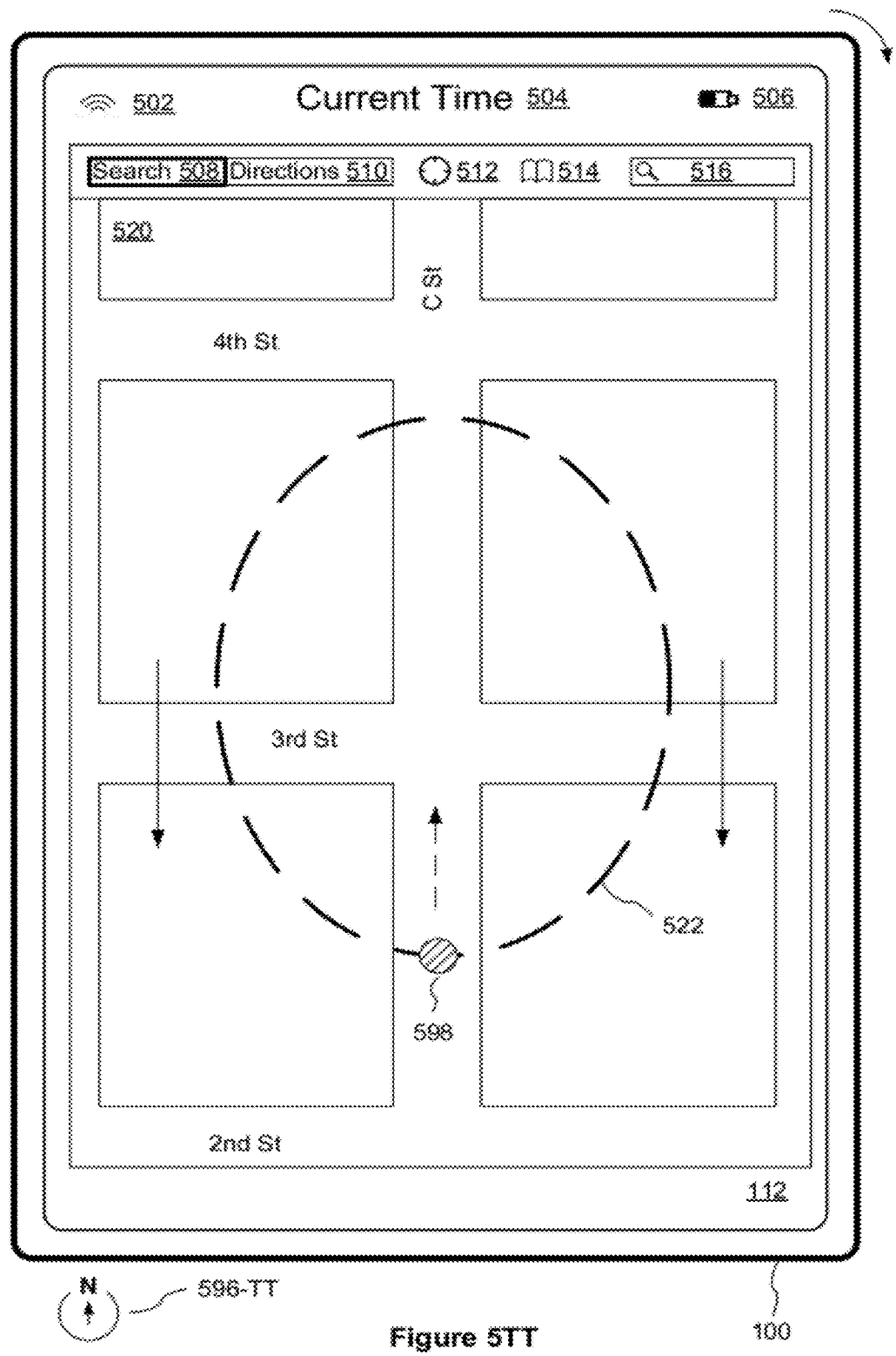
Figure 5U:
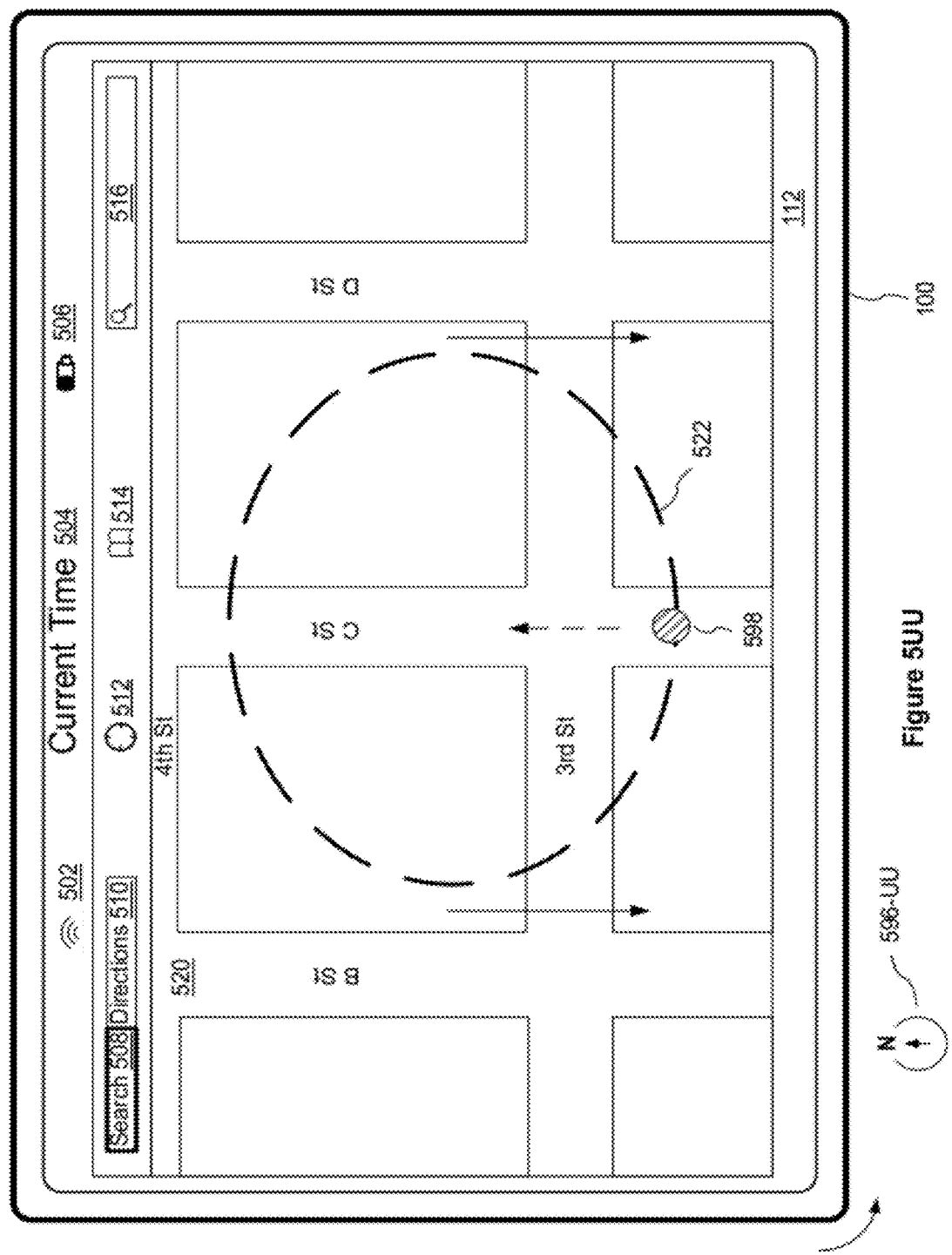
Figure 5V:
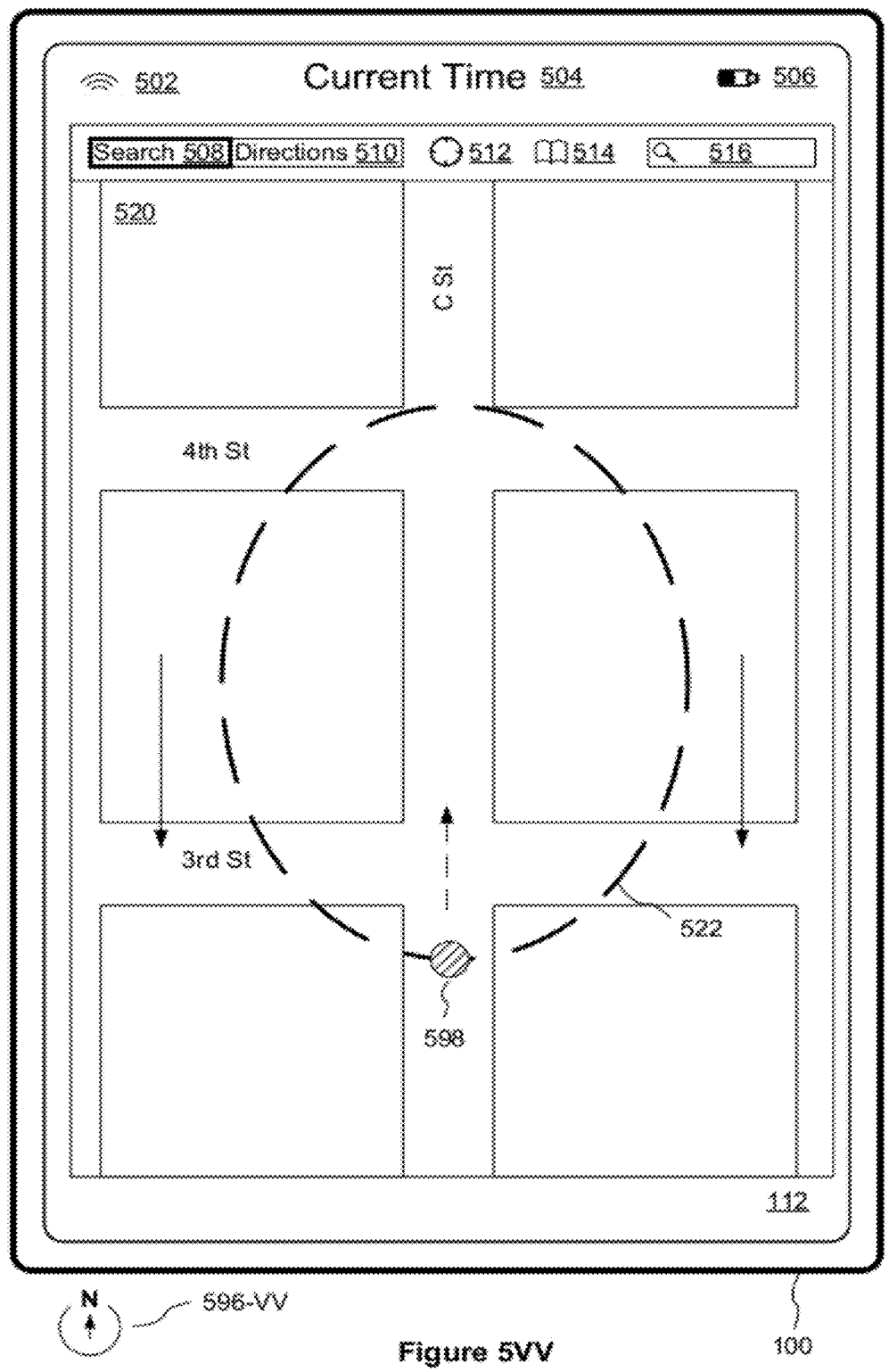

FIGS. 5A-5VV illustrate exemplary user interfaces for tracking movement on a map in accordance with some embodiments. The user interfaces in these figures are used to illustrate the processes described below, including the processes in FIGS. 6A-6B and 7A-7B.

In FIGS. 5A-5VV, some finger contact movement sizes may be exaggerated for illustrative purposes. No depiction in the figures bearing on finger contact movements should be taken as a requirement or limitation for the purpose of understanding sizes and scale associated with the method and devices disclosed herein.

In FIGS. 5A-5VV, compass 596 is depicted to indicate the orientation of device 100. As depicted herein, the top of the illustrated device is the orientation of the device (e.g., if the north of a compass in a respective figure points toward the top of the figure, a respective device in the respective figure is oriented toward north; if the north of a compass in a respective figure points toward the left side of the figure, a respective device in the respective figure is oriented toward east; if the north of a compass in a respective figure points toward the right side of the figure, a respective device in the respective is oriented toward west). The device typically travels in the direction it is oriented to. Note that compass 596 is included for illustration purposes only in FIGS. 5A-5VV. However, in some embodiments, user interfaces include compass 596 or an orientation indicator on touch screen 112.

FIG. 5A depicts an exemplary user interface displaying map 520 in a mapping application (e.g., a dedicated mapping application or a web browser displaying a map) on touch screen 112 of device 100. The mapping application may include the following elements, or a subset or superset thereof:

search mode icon 508 that when activated (e.g., by a finger tap on the icon) initiates the display of a map in a search mode; in the search mode, the map is configured to overlay search results; in this example, the search mode icon is activated, and as a result, the search mode icon is highlighted with a bold outline;

directions mode icon 510 that when activated (e.g., by a finger tap on the icon) initiates the display of a map in a directions mode; in the directions mode, the map is configured to overlay directions;

view location icon 512 that when activated (e.g., by a finger tap on the icon) initiates various modes, such as a tracked mode or a heading mode;

bookmark icon 514 that when activated (e.g., by a finger tap on the icon) initiates the display of bookmarks and/or contacts; and search term input area 516 that when activated (e.g., by a finger tap on the icon) initiates receiving search terms for a location search (e.g., search terms can be a full or partial address, or a name of a business or a person).

The exemplary user interface depicted in FIG. 5A also includes signal intensity 502 (which indicates the intensity of the radio communication signal, such as signal for Wi-Fi, EDGE, or 3G), current time 504, and battery power indicator 506.

FIG. 5A also illustrates the display of current location icon 598 on map 520. The location of current location icon 598 on map 520 corresponds to the location of device 100. In FIG. 5A, compass 596-A indicates that device 100 is oriented north (i.e., a predetermined side (e.g., the top, or a first side) of a device faces north).

FIG. 5A also illustrates a detection of gesture 505 (e.g., a tap gesture) at a location on touch screen 112 corresponding to view location icon 512. In response to detection of gesture 505 at the location on touch screen 112 corresponding to the view location icon 512, device 100 enters a tracked mode. In FIGS. 5B-5BB, view location icon 512 is highlighted to indicate that device 100 is in a tracked mode. In the tracked mode, current location icon 598 is maintained in a predefined area on the display. In this example, predefined area 522 is an oval-shaped area.

In FIGS. 5B-5G, the location of device 100 changes. As the current location of device 100 changes, current location icon 598 moves toward a boundary of predefined area 522, and current location icon 598 is maintained in predefined area 522. Also as the current location of device 100 changes, map 520 is updated. Compass 596 indicates that device 100 is heading north in FIGS. 5B-5G.

In FIGS. 5G-5H, the orientation of device 100 changes, and compass 596 rotates counterclockwise to indicate that the orientation of device 100 has changed from heading north to heading east. FIGS. 5G-5I also illustrate that current location icon 598 is moved along the boundary of predefined area 522. In FIGS. 5G-5I, map 520 is updated as the current location of device 100 changes.

In FIGS. 5I-5N, the direction of travel changes for device 100. In FIGS. 5I-5J, device 100 changes the direction of travel (e.g., a U-turn), and compass 596 reverses its direction to indicate that the orientation of device 100 has changed from heading east to heading west. In FIGS. 5J-5N, map 520 is updated as the current location of device 100 changes.

FIGS. 5I-5M also illustrate that, as the location of device 100 changes, current location icon 598 is moved from one side of predefined area 522 to the opposite side of predefined area 522. In this example, current location icon 598 moves from one side of predefined area 522 to the opposite side of predefined area 522 through a center region of predefined area 522. In some embodiments, current location icon 598 is moved from one side of predefined area 522 to the opposite side of predefined 522 along the boundary of predefined area 522.

In FIG. 5O, the size (e.g., diameter, or width and/or height) of predefined area 522 is modified in accordance with a speed of the movement of device 100. In this example, the speed of the movement of device 100 has decreased, and the size of predefined area 522 has decreased accordingly. In some embodiments, the size of predefined area is proportional to the speed of the movement of device 100 (e.g., if the speed doubles, the size of predefined area 522 doubles). In some embodiments, the size of predefined area is at least a first predetermined size (e.g., 20 pixels wide and 20 pixels high). In some embodiments, the size of predefined area is less than a second predetermined size (e.g., full-screen size of touch screen 112, and/or a fixed size, such as 300 pixels wide and 300 pixels high).

In FIG. 5P, the scale of map 520 is modified in accordance with a speed of the movement of device 100. As used herein, the term, "scale" refers to a ratio of a distance on the map to a corresponding physical distance, as expressed as a ratio (e.g., when one centimeter on a map corresponds to one hundred meters of physical distance, the scale is 1:10,000). A map with a larger (or increased) scale displays a larger area than a map with a smaller (or decreased) scale. In this example, the speed of the movement of device 100 has increased, and the scale of map 520 has increased accordingly. In some embodiments, the scale increases linearly with the speed of the movement of device 100. In some embodiments, the scale is at least a first predetermined scale (e.g., 1:100). In some embodiments, the scale is less than a second predetermined scale (e.g., 1:1,000,000,000).

FIGS. 5Q-5U illustrate exemplary user interfaces associated with translating (or panning) of a map. In FIG. 5Q, contact 507 is detected at location 507-A on touch screen 112. In FIG. 5R, contact 507 is moved to location 507-B on touch screen 112. During the movement from location 507-A to location 507-B, contact 507 remains in contact with touch screen 112. In response, map 520 is translated accordingly (e.g., the direction and distance of translation corresponds to the direction and distance of the movement of contact 507 from location 507-A to location 507-B). In FIG. 5R, current location icon 598 is located outside the displayed portion of map 520.

In FIG. 5S, contact 509 is detected at location 509-A on touch screen 112. Contact 509 is typically detected a certain period (e.g., the time a user spends to comprehend the displayed portion of map 520) after contact 507 is lifted off of touch screen 112. In FIG. 5T, contact 509 is moved to location 509-B on touch screen 112. During the movement from location 509-A to location 509-B, contact 509 remains in contact with touch screen 112. In response, map 520 is translated accordingly. In FIGS. 5Q-5U, the length of time when current location icon 598 is located outside predefined area 522 is determined. FIG. 5T illustrates that if the length of time is less than a predefined duration (e.g., five, ten, fifteen, or twenty seconds), the tracked mode is maintained. FIG. 5U illustrates an alternative result. If the length of time is more than the predefined duration, the tracked mode is exited (e.g., current location icon 598 is not displayed, and the current location of device 100 is not tracked) in FIG. 5U.

FIGS. 5V-5AA illustrate display of a route of the movement of device 100. In FIGS. 5V-5Z, device 100 is in a directions mode (e.g., as indicated by highlighted directions mode icon 510). In directions mode, the mapping application determines the route of the movement of device 100 (e.g., in accordance with a user input), and displays a portion of route 580 (e.g., 580-1) to be traveled. The directions mode is compatible with the tracked mode (i.e., the directions mode and the tracked mode are not mutually exclusive, and therefore, device 100 can be in the directions mode and the tracked mode concurrently).

In FIGS. 5V-5Z, the location of device 100 changes, and the route to be traveled is updated. In this example, the route initially includes a horizontal portion (e.g., 580-1 in FIG. 5V). As the location of device 100 changes, the route includes a horizontal portion (e.g., 580-2H, 580-3H, and 580-4H) and a vertical portion (e.g., 580-2V, 580-3V, and 580-4V). Current location icon 598 is positioned on the boundary of predefined area 522 such that map 520 displays more of the route to be traveled (FIGS. 5V-5Z).

In FIG. 5AA, current location icon 598 is also positioned on the boundary of predefined area 522 such that map 520 displays more of the route to be traveled. In FIG. 5AA, device 100 is in the search mode (as indicated by highlighted search mode icon 508), and the route is not predetermined (as in the directions mode). Device 100 determines the route based on potential routes in the displayed portion of map 520. In this example, when device 100 is traveling on a major street (e.g., "Main St") and side streets are smaller (or narrower) streets (e.g., "Side Street 1", "Side Street 2", "Side Street 3", and "Side Street 4"), device 100 disregards routes including travel on side streets, and determines the route as the untraveled portion of the major street (e.g., 582-1). As used herein, the terms "an untraveled portion of a route" refers to a portion of a route to be traveled. Current location icon 598 is positioned such that map 520 displays more of the route to be traveled (e.g., 582-1) and less of the route already traveled.

Similarly, when device 100 determines that device 100 is traveling on a highway, device 100 positions current location icon 598 on the boundary of the predefined area such that the map displays more of the untraveled portion of the highway and less of the traveled portion of the highway.

FIG. 5BB illustrates a detection of gesture 511 (e.g., a tap gesture) at a location on touch screen 112 corresponding to view location icon 512. In response to detection of gesture 511 at the location on touch screen 112 corresponding to the view location icon 512 while device 100 is in the tracked mode, device 100 enters a heading mode. In FIGS. 5CC-5RR, view location icon 512 is updated and heading mode icon 594 is displayed to indicate that device 100 is in a heading mode. In the heading mode, current location icon 598 is maintained in a predefined area on the display, and map 520 is displayed with an orientation that corresponds to the current orientation of device 100. Heading mode icon 594 indicates the direction the device is oriented to.

In FIGS. 5CC-5EE, the location of device 100 changes. As the current location of device 100 changes, current location icon 598 moves toward a boundary of predefined area 522, and current location icon 598 is maintained in predefined area 522. Also as the current location of device 100 changes, map 520 is updated. Compass 596 indicates that device 100 is heading north in FIGS. 5CC-5EE.

In FIGS. 5EE-5HH, the orientation of device 100 changes, and compass 596 rotates counterclockwise to indicate that the orientation of device 100 has changed from heading north to heading east. FIGS. 5EE-5HH also illustrate that current location icon 598 remains along the boundary of predefined area 522. In FIGS. 5EE-5II, map 520 is updated as the orientation and current location of device 100 change.

In FIGS. 5JJ-5NN, alternative user interfaces are illustrated when the orientation of device 100 changes. FIGS. 5JJ-5NN illustrate that compass 596 rotates clockwise to indicate that the orientation of device 100 has changed from heading east to heading north. In FIGS. 5KK-5MM, current location icon 598 is moved (or shifted) (from previous position 592) along the boundary of predefined area 522 to indicate that device is changing its orientation. In some embodiments, the amount of shift is determined in accordance with the speed of changes to the orientation of device 100 (e.g., angular speed of the pivoting motion of the device). In some embodiments, the amount of shift is proportional to the speed of changes to the orientation of device 100. In some embodiments, the amount of shift is at least a first predefined amount of shift (e.g., five degrees, ten degrees, or fifteen degrees). In some embodiments, the amount of shift is less than a second predefined amount of shift (e.g., forty-five degrees, or ninety degrees).

FIGS. 5OO-5SS illustrate exemplary user interfaces associated with translating (or panning) of a map. In FIG. 5OO, contact 513 is detected at location 513-A on touch screen 112. In FIG. 5PP, contact 513 is moved to location 513-B on touch screen 112. During the movement from location 513-A to location 513-B, contact 513 remains in contact with touch screen 112. In response, map 520 is translated accordingly (e.g., the direction and distance of translation corresponds to the direction and distance of the movement of contact 513 from location 513-A to location 513-B). In FIG. 5PP, current location icon 598 is located outside the displayed portion of map 520.

In FIG. 5QQ, contact 515 is detected at location 515-A on touch screen 112. Contact 515 is typically detected a certain period (e.g., the time a user spends to comprehend the displayed portion of map 520) after contact 513 is lifted off of touch screen 112. In FIG. 5RR, contact 515 is moved to location 515-B on touch screen 112. During the movement from location 515-A to location 515-B, contact 515 remains in contact with touch screen 112. In response, map 520 is translated accordingly. In FIGS. 5OO-5RR, the length of time when current location icon 598 is located outside predefined area 522 is determined. FIG. 5RR illustrates that if the length of time is less than a predefined duration (e.g., five, ten, fifteen, or twenty seconds), the heading mode is maintained. FIG. 5SS illustrates an alternative result. If the length of time is more than the predefined duration, the heading mode is exited (e.g., current location icon 598 is not displayed, the current location of device 100 is not tracked, and the orientation of the map is independent of the orientation of the device) in FIG. 5SS.

FIGS. 5TT-5VV illustrate exemplary user interfaces associated with a rotation of device 100. In FIG. 5TT, device 100 is in a portrait orientation. FIG. 5UU illustrates device 100 after rotation into a landscape orientation, while maintaining its direction (e.g., north, as indicated by compass 596 in FIGS. 5TT and 5UU). In response, map 520 and predefined area 522 rotate accordingly. In FIG. 5VV, device 100 is rotated back into the portrait orientation, while maintaining its direction (e.g., north, as indicated by compass 596 in FIGS. 5UU and 5VV). In response, map 520 and predefined area 522 rotate accordingly.

Figure 6A:
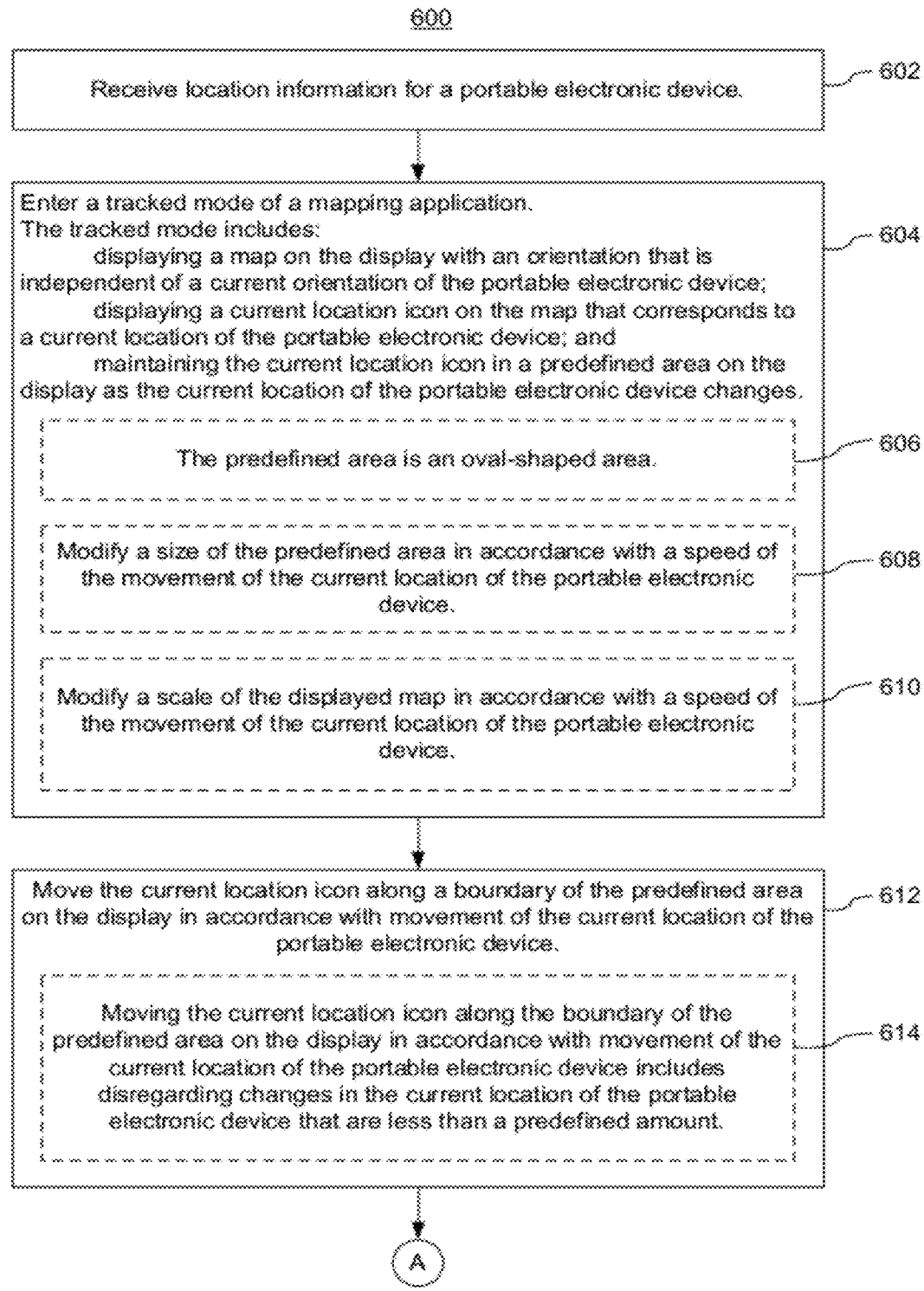
FIGS. 6A-6B are flow diagrams illustrating a method of tracking movement on a map in accordance with some embodiments.
Figure 6B:
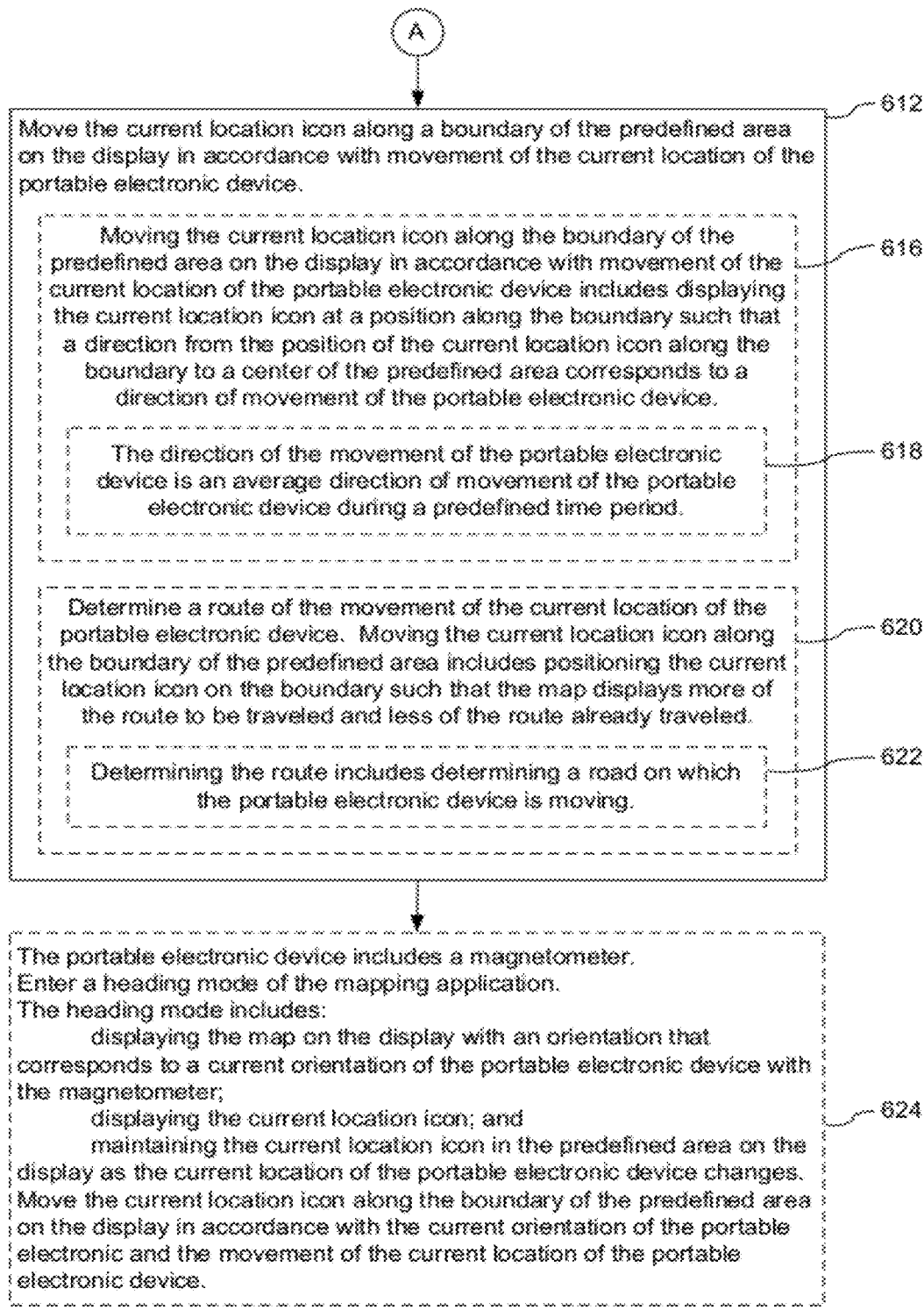

FIGS. 6A-6B are flow diagrams illustrating method 600 of tracking movement on a map in accordance with some embodiments. Method 600 is performed at a portable electronic device (e.g., device 300, FIG. 3, or portable multifunction device 100, FIG. 1) with a display. In some embodiments, the device includes a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, method 600 provides an intuitive way to track movement on a map. The method reduces the cognitive burden on a user when tracking movement on a map, thereby creating a more efficient human-machine interface. In particular, the method displays more of a route to be traveled, thereby providing the user more time to respond to an upcoming portion of the route, and reducing the cognitive burden on a user. Also by reducing the pressure to respond quicker, the method can reduce errors and accidents. For battery-operated computing devices, enabling a user to track movement on a map faster and more efficiently conserves power and increases the time between battery charges.

The device receives (602) location information for the portable electronic device. For example, the device may receive information from GPS, nearby Wi-Fi base stations, and/or nearby cell towers, as described in U.S. patent application Ser. Nos. 12/040,283, "Location Determination," filed Feb. 29, 2008; 12/103,330, "Location Determination Using Formula," filed Apr. 15, 2008; and 12/122,339, "Location Determination," filed May 16, 2008. All of these applications are incorporated by reference herein in their entirety.

The device enters (604) a tracked mode of a mapping application (e.g., in response to starting the mapping application; in response to activation of a mapping mode selection object (e.g., an icon) in the mapping application, such as tap gesture 505 in FIG. 5A; or in response to speech recognition of audio input (e.g., voice command)). The tracked mode includes: displaying a map on the display with an orientation that is independent of a current orientation of the portable electronic device; displaying a current location icon on the map that corresponds to a current location of the portable electronic device; and maintaining the current location icon in a predefined area on the display as the current location of the portable electronic device changes. For example, map 520 is displayed on touch screen 112 (FIGS. 5B-5P) with an orientation that is independent of a current orientation of device 100 (e.g., the orientation of the map is independent of the orientation of device 100 in FIGS. 5G-5P).

In some embodiments, the predefined area is (606) an oval-shaped area (e.g., FIGS. 5B-5P). In some embodiments, the predefined area is an oval. In some embodiments, the predefined area is an ellipse. An exemplary ellipse has its center located at the center of map 520, and its first and second axes match a predefined fraction of the width and height of map 520. For example, when map 520 is displayed 10" wide and 8" high, and when the predefined fraction is 60%, the ellipse is 6" (=60% of 10") wide along its major axis and 4.8" (=60% of 8") high along its minor axis. This exemplary predefined fraction of 60% effectively places current location icon 598 at an 80/20 location (i.e., 80% of the map height from the top of map 520 and 20% of the map height from the bottom of map 520, so that 80% of the map displays where the user is heading and 20% of the map displays where the user has been). In some embodiments, the predefined fraction is determined by default. In some embodiments, the predefined fraction is selected by a user (e.g., by placing and/or moving a boundary pin on map 520; by manually scaling predefined area 522; or by manually inputting a fraction or percentage value). In some embodiments, the predefined area is a circle. In some embodiments, the predefined area is a polygon, such as a rectangle. In some embodiments, the predefined area is a cross (or an "x"-shaped area). In some embodiments, when device 100 rotates, the predefined area rotates accordingly (e.g., compare FIGS. 5TT-5VV, where predefined area 522 rotates from a portrait orientation to a landscape orientation and back to the portrait orientation).

In some embodiments, device 100 modifies (608) a size of the predefined area in accordance with a speed of the movement of the current location of the portable electronic device (e.g., compare FIGS. 5N and 5O, where the size of predefined area 522 is modified in accordance with the speed of the movement of the current location of device 100).

In some embodiments, device 100 modifies (610) a scale of the displayed map in accordance with a speed of the movement of the current location of the portable electronic device (e.g., compare FIGS. 5O and 5P, where the scale of displayed map 520 is modified in accordance with the speed of the movement of the current location of device 100).

Device 100 moves (612) the current location icon along a boundary of the predefined area on the display in accordance with movement of the current location of the portable electronic device (e.g., current location icon 598 is moved along a boundary of predefined area 522 in accordance with movement of the current location of device 100 in FIGS. 5G-5I).

In some embodiments, moving the current location icon along the boundary of the predefined area on the display in accordance with movement of the current location of the portable electronic device includes (614) disregarding changes in the current location of the portable electronic device that are less than a predefined amount. In some embodiments, the predefined amount (i.e., threshold or tolerance) is determined in terms of change of directions (e.g., angle change), such as five degrees, ten degrees, twenty degrees, or thirty degrees from the direction of travel. In some embodiments, the predefined amount is determined in terms of the rate of direction change (e.g., one, two, five, ten, or fifteen degrees per second. In some embodiments, the predefined amount is determined in terms of the speed of the movement of the current location of the device (e.g., ten, twenty, fifty, or hundred centimeters per second). In some embodiments, a combination of predefined thresholds discussed above is used. In some embodiments, the predefined threshold is overridden. For example, in a U-turn where the direction changes more than the predefined angle threshold, the predefined speed threshold and the predefined rate-of-direction-change threshold are overridden.

In some embodiments, moving the current location icon along the boundary of the predefined area on the display in accordance with movement of the current location of the portable electronic device includes (616) displaying the current location icon at a position along the boundary such that a direction from the position of the current location icon along the boundary to a center of the predefined area (e.g., a center point or a central area) corresponds to a direction of movement of the portable electronic device. In other words, in some embodiments, the direction of a vector that starts at the position of the current location icon and ends in the center of the predefined area corresponds to the current direction of movement of the portable electronic device. For example, the direction of a vector starting from current location icon 598 to the center of predefined area 522 corresponds to the current direction of movement of device 100 (FIGS. 5C-5F, 5I, and 5N-5O).

In some embodiments, the direction of the movement of the portable electronic device is (618) an average direction of movement of the portable electronic device during a predefined time period (e.g., ten seconds, five seconds, two seconds, one second, or five-hundred milliseconds). For example, current location icon 598 is positioned along the boundary such that a direction from the position of current location icon 598 along the boundary to a center of predefined area 522 corresponds to the average direction of movement of device 100 during a predefined time period (e.g., FIGS. 5G-5I.). In particular, in FIG. 5H, the average direction of device 100 is the average of north-bound travel as depicted in FIG. 5G and east-bound travel as depicted in FIG. 5H, resulting in the average direction heading north-east pointing toward the center of predefined area 522. In some embodiments, the average direction is a time-weighted average of directions during a predefined time period (e.g., the current direction is more heavily weighted than prior directions during the predefined time period).

In some embodiments, device 100 determines (620) a route of the movement of the current location of the portable electronic device. Moving the current location icon along the boundary of the predefined area includes (620) positioning the current location icon on the boundary such that the map displays more of the route to be traveled and less of the route already traveled (e.g., FIGS. 5V-5AA).

In some embodiments, positioning the current location icon on the boundary such that the map displays more of the route to be traveled and less of the route already traveled includes determining the position of the current location icon on the boundary.

In some embodiments, determining the position of the current location icon on the boundary includes identifying candidate positions on the boundary. In some embodiments, identifying candidate positions includes identifying candidate positions by dividing the boundary of the predefined area in equal angles (e.g., in one degree increments, five degree increments, ten degree increments, fifteen degree increments, or thirty degree increments). In some other embodiments, identifying candidate positions include identifying candidate positions by dividing the boundary of the predefined area in variable angles (e.g., smaller increments in the section (e.g., quadrant) of the boundary where current location icon 598 is likely to be positioned). In some embodiments, identifying candidate positions include identifying a quadrant where current location icon 598 is likely to be positions (e.g., when the route includes traveling east and then south, current location icon 598 is likely to be positioned in the north-west quadrant of the boundary (when the boundary comprises north-east, north-west, south-east, and south-west quadrants; when the route includes traveling south, current location icon 598 is likely to be positioned in the north quadrant of the boundary (when the boundary comprises north, south, east, and west quadrants); other divisions into quadrants or other numbers of divisions can be also used).

In some embodiments, determining the position of the current location icon on the boundary also includes determining the displayed portion of the route to be traveled for respective candidate positions. In some embodiments, determining the displayed portion of the route to be traveled for respective candidate positions includes determining the length of the displayed portion of the route to be traveled for respective candidate positions. In some embodiments, determining the length of the displayed portion of the route includes calculating the length of the displayed portion of the route in accordance with lengths of respective sub-portions of the displayed portion of the route (e.g., by summation).

In some embodiments, determining the position of the current location icon on the boundary also includes selecting the candidate position with the most displayed portion of the route to be traveled.

In some embodiments, determining the position of the current location icon on the boundary includes determining the displayed portion of the route already traveled. The displayed portion of the route already traveled can be determined in similar manners as described above with reference to the operation of determining the displayed portion of the route to be traveled.

In some embodiments, determining the position of the current location icon on the boundary includes selecting the candidate position with the highest route-display score. In some embodiments, the route-display score includes the difference between the length of the displayed portion of the route to be traveled and the length of the displayed portion of the route already traveled (e.g., [route-display score]=[the length of the displayed portion of the route to be traveled]−[the length of the displayed portion of the route already traveled]).

In some embodiments, determining the route includes (622) determining a road on which the portable electronic device is moving. For example, device 100 determines the road (e.g., "Main St") on which device 100 is moving (FIG. 5AA). Device 100 determines the route in accordance with the determined road (e.g., the untraveled portion of the determined road is the route).

In some embodiments, device 100 enters (624) a heading mode of the mapping application (e.g., in response to starting the mapping application; in response to activation of a mapping mode selection object (e.g., an icon) in the mapping application, such as tap gesture 511 in FIG. 5BB; or in response to speech recognition of audio input (e.g., voice command)). The heading mode includes displaying the map on the display with an orientation that corresponds to a current orientation of the portable electronic device with the magnetometer; displaying the current location icon; and maintaining the current location icon in the predefined area on the display as the current location of the portable electronic device changes; and moving the current location icon along the boundary of the predefined area on the display in accordance with the current orientation of the portable electronic and the movement of the current location of the portable electronic device. For example, map 520 is displayed on touch screen 112 (FIGS. 5CC-5NN) with an orientation that corresponds to a current orientation of device 100 (e.g., the orientation of the map changes as the orientation of device 100 changes in FIGS. 5EE-5HH).

In some embodiments, the mapping application has both the heading mode and the tracked mode. In some embodiments, the mapping application has the heading mode, but does not have the tracked mode. In some embodiments, the mapping application has the tracked mode, but does not have the heading mode.

Note that details of the processes described above with respect to method 600 (e.g., FIGS. 6A-6B, and 5A-5NN) are also applicable in an analogous manner to the method described below. For brevity, these details are not repeated below.

Figure 7A:
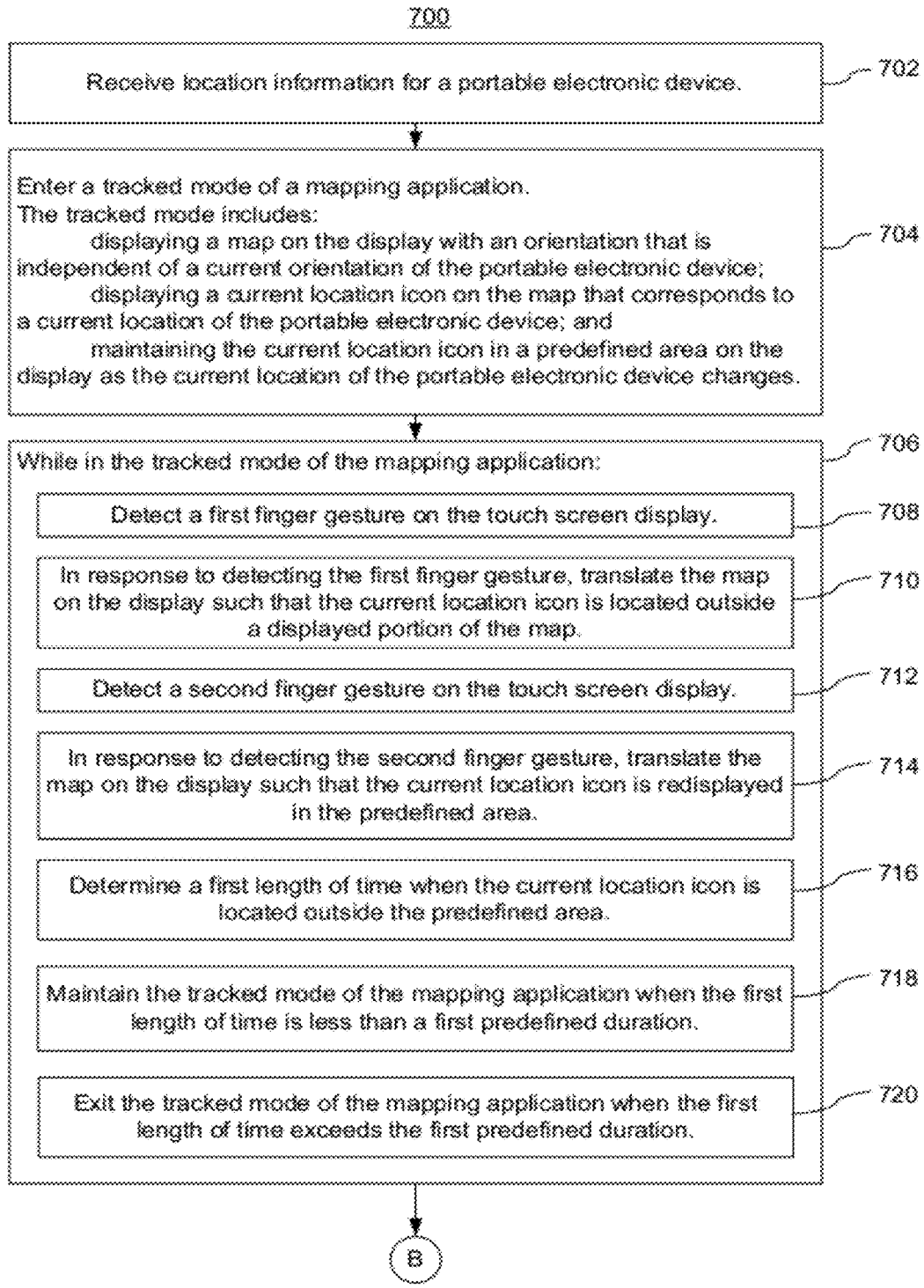
FIGS. 7A-7B are flow diagrams illustrating a method of maintaining a tracked mode in accordance with some embodiments.
Figure 7B:
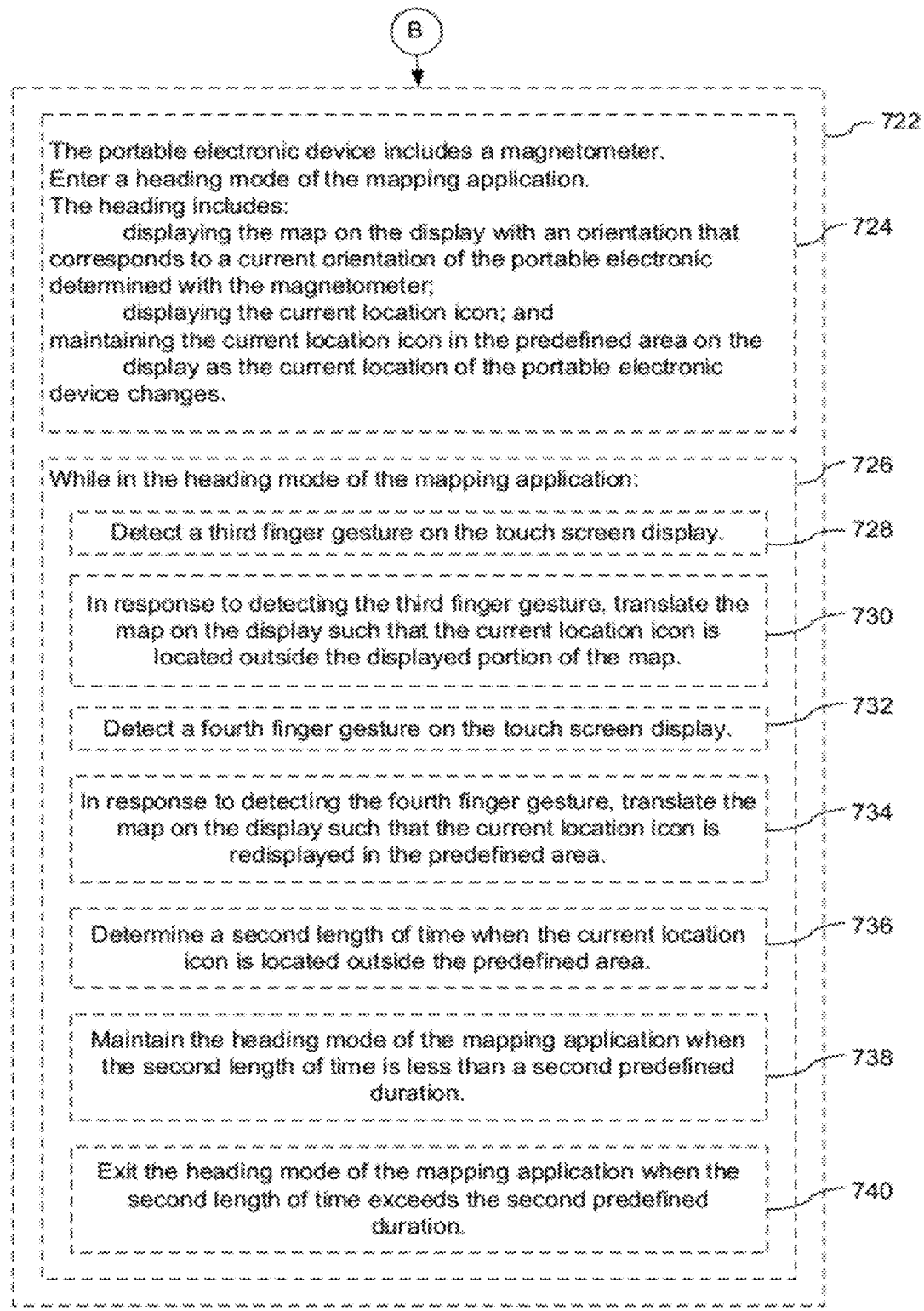

FIGS. 7A-7B are flow diagrams illustrating method 700 of maintaining a tracked mode in accordance with some embodiments. Method 700 is performed at a portable electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, method 700 provides an intuitive way to maintain a tracked mode. The method reduces the cognitive burden on a user when maintaining the tracked mode, thereby creating a more efficient human-machine interface. In particular, maintaining the tracked mode eliminates the need for repeated operations by the user to re-enter the tracked mode. For battery-operated computing devices, enabling a user to maintain the tracked mode more efficiently conserves power and increases the time between battery charges.

Device 100 receives (702) location information for the portable electronic device. For example, the device may receive information from GPS, nearby Wi-Fi base stations, and/or nearby cell towers, as described in U.S. patent application Ser. Nos. 12/040, 283, "Location Determination," filed Feb. 29, 2008; 12/103,330, "Location Determination Using Formula," filed Apr. 15, 2008; and 12/122,339, "Location Determination," filed May 16, 2008. All of these applications are incorporated by reference herein in their entirety.

Device enters (704) a tracked mode of a mapping application (e.g., in response to starting the mapping application; in response to activation of a mapping mode selection object (e.g., an icon) in the mapping application, such as tap gesture 505 in FIG. 5A; or in response to speech recognition of audio input (e.g., voice command)). The tracked mode includes: displaying a map on the display with an orientation that is independent of a current orientation of the portable electronic device; displaying a current location icon on the map that corresponds to a current location of the portable electronic device; and maintaining the current location icon in a predefined area on the display as the current location of the portable electronic device changes (e.g., FIGS. 5B-5P). In some embodiments, the predefined area is all of the display area on which the map is displayed. In some embodiments, the predefined area is a central portion of the display area on which the map is displayed. In some embodiments, the predefined area is an oval, an ellipse, a polygon (e.g., rectangle), or a cross. Note that the predefined area in this operation (704) and the predefined area in 604 need not be identical (i.e., in some embodiments, the tracked mode in 604 includes maintaining the current location icon in a first predefined area; the tracked mode in 704 includes maintaining the current location icon in a second predefined area; and the first predefined area is distinct from the second predefined area).

While in the tracked mode of the mapping application (706), device 100 performs the following operations (708, 710, 712, 714, 716, 718, and 720).

Device 100 detects (708) a first finger gesture on the touch screen display (e.g., finger drag gesture 507 in FIGS. 5Q-5R).

In response to detecting the first finger gesture, device 100 translates (710) the map on the display such that the current location icon is located outside a displayed portion of the map. In other words, the translating of the map moves the current location icon off of the display and displays a portion of the map that does not include the current location icon (e.g., FIG. 5R).

Device 100 detects (712) a second finger gesture on the touch screen display (e.g., finger drag gesture 509 in FIGS. 5S-5T). In some embodiments, the second finger gesture is a continuation of the first finger gesture (e.g., a drag gesture that initially moves the current location icon off of the display and then moves the current location icon back onto the display).

In response to detecting the second finger gesture, device 100 translates (714) the map on the display such that the current location icon is redisplayed in the predefined area. In other words, the second translating of the map moves the current location icon back onto the display in the predefined area (e.g., FIG. 5T).

Device 100 determines a first length of time when the current location icon is located outside the predefined area (716). In some embodiments, determining the first length of time includes recording a first time when the current location icon exits the predefined area; recording a second time when the current location icon re-enters the predefined area; and determining the difference between the first time and the second time. In some embodiments, determining the first length of time includes performing a hit-test between the current location icon and the predefined area, thereby determining whether the current location icon is located within the predefined area (e.g., to indicate whether the current location has exited the predefined area or whether the current location has re-entered the predefined area). In some embodiments, when the current location icon does not re-enter the predefined area within a predefined interval, the first length of time is given a default value (e.g., ten minutes or a flag value that indicates that the timing operation has expired).

Device 100 maintains (718) the tracked mode of the mapping application when the first length of time is less than a first predefined duration (e.g., ten seconds, thirty seconds, one minute, three minutes, or five minutes). For example, the tracked mode is maintained in FIG. 5T.

Device 100 exits (720) the tracked mode of the mapping application when the first length of time exceeds the first predefined duration (e.g., FIG. 5U). In some embodiments, the device enters an untracked mode of the mapping application when the first length of time exceeds the predefined duration. The untracked mode comprises displaying the map on the display with an orientation that is independent of a current orientation of the portable electronic device, without maintaining the current location icon in the predefined area on the display as the current location of the portable electronic device changes (e.g., FIG. 5U).

In some embodiments, device 100 performs (722) the following operations (724 and 726). Device 100 includes (724) a magnetometer, and device 100 enters a heading mode of the mapping application (e.g., in response to starting the mapping application; in response to activation of a mapping mode selection object (e.g., an icon) in the mapping application, such as tap gesture 511 in FIG. 5BB; or in response to speech recognition of audio input (e.g., voice command)). The heading mode includes: displaying the map on the display with an orientation that corresponds to a current orientation of the portable electronic determined with the magnetometer; displaying the current location icon; and maintaining the current location icon in the predefined area on the display as the current location of the portable electronic device changes (e.g., FIGS. 5CC-5NN).

While in the heading mode of the mapping application, device 100 performs (726) the following operations. Device 100 detects (728) a third finger gesture on the touch screen display (e.g., finger drag gesture 513 in FIGS. 5OO-5PP).

In response to detecting the third finger gesture, device 100 translates (730) the map on the display such that the current location icon is located outside the displayed portion of the map. In other words, the translating of the map moves the current location icon off of the display and displays a portion of the map that does not include the current location icon (e.g., FIG. 5PP).

Device 100 detects a fourth finger gesture on the touch screen display (e.g., finger drag gesture 515 in FIGS. 5QQ-5RR). In some embodiments, the fourth finger gesture is a continuation of the third finger gesture (e.g., a drag gesture that initially moves the current location icon off of the display and then moves the current location icon back onto the display).

In response to detecting the fourth finger gesture, device 100 translates (734) the map on the display such that the current location icon is redisplayed in the predefined area. In other words, the second translating of the map moves the current location icon back onto the display (e.g., FIG. 5RR).

Device 100 determines (736) a second length of time when the current location icon is located outside the predefined area. In some embodiments, the second length of time is determined in a manner similar to the process described above with reference to determining the first length of time (716).

Device 100 maintains (738) the heading mode of the mapping application when the second length of time is less than a second predefined duration. For example, the heading mode is maintained in FIG. 5RR. In some embodiments, the second predefined duration is distinct from the first predefined duration. In some embodiments, the second predefined duration is the same as the first predefined duration.

Device 100 exits (740) the heading mode of the mapping application when the second length of time exceeds the second predefined duration (e.g., FIG. 5SS). In some embodiments, the device enters an untracked mode of the mapping application (e.g., FIG. 5SS, as indicated by view location icon 512) when the second length of time exceeds the predefined duration. The untracked mode comprises displaying the map on the display with an orientation that is independent of a current orientation of the portable electronic device, without maintaining the current location icon in the predefined area on the display as the current location of the portable electronic device changes.

In some embodiments, the mapping application has both the heading mode and the tracked mode. In some embodiments, the mapping application has the heading mode, but does not have the tracked mode. In some embodiments, the mapping application has the tracked mode, but does not have the heading mode.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The operations described above with reference to FIGS. 6A-6B and 7A-7B may be implemented by components depicted in FIGS. 1A-1C. For example, receiving operation 602, displaying operation in 604, and moving operation 612 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates event handler 180 associated with the detection of the event or sub-event. Event handler 180 may utilize or call data updater 176 or object updater 177 to update the internal state of application 136-1 data. In some embodiments, event handler 180 accesses respective GUI updater 178 to update what is displayed by the application. Similarly, it would be clear to a person having ordinary skill in the art how other processes can be implemented based on the components depicted in FIGS. 1A-1C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A portable electronic device, comprising:
   a display;
   one or more processors;
   memory; and
   one or more programs, wherein the one or more programs are stored in the memory and configured to be executed by the one or more processors, the one or more programs including instructions for:
     receiving location information for the portable electronic device;
     entering a tracked mode of a mapping application, the tracked mode comprising:
       displaying a map on the display with an orientation that is independent of a current orientation of the portable electronic device;
       displaying a current location icon on the map that corresponds to a current location of the portable electronic device; and
       maintaining the current location icon in a predefined area on the display as the current location of the portable electronic device changes; and
     moving the current location icon along a boundary of the predefined area on the display in accordance with movement of the current location of the portable electronic device.

2. The portable electronic device of claim 1, further comprising a magnetometer, wherein the one or more programs include instructions for:
   entering a heading mode of the mapping application, the heading mode comprising:
     displaying the map on the display with an orientation that corresponds to a current orientation of the portable electronic device with the magnetometer;
     displaying the current location icon; and
     maintaining the current location icon in the predefined area on the display as the current location of the portable electronic device changes; and
   moving the current location icon along the boundary of the predefined area on the display in accordance with the current orientation of the portable electronic and the movement of the current location of the portable electronic device.

3. The portable electronic device of claim 1, wherein the predefined area is an oval-shaped area.

4. The portable electronic device of claim 1, wherein the instructions for moving the current location icon along the boundary of the predefined area on the display in accordance with movement of the current location of the portable electronic device include instructions for disregarding changes in the current location of the portable electronic device that are less than a predefined amount.

5. The portable electronic device of claim 1, wherein the one or more programs include instructions for modifying a size of the predefined area in accordance with a speed of the movement of the current location of the portable electronic device.

6. The portable electronic device of claim 1, wherein the one or more programs include instructions for modifying a scale of the displayed map in accordance with a speed of the movement of the current location of the portable electronic device.

7. The portable electronic device of claim 1, wherein the instructions for moving the current location icon along the boundary of the predefined area on the display in accordance with movement of the current location of the portable electronic device include instructions for displaying the current location icon at a position along the boundary such that a direction from the position of the current location icon along the boundary to a center of the predefined area corresponds to a direction of movement of the portable electronic device.

8. The portable electronic device of claim 7, wherein the direction of the movement of the portable electronic device is an average direction of movement of the portable electronic device during a predefined time period.

9. The portable electronic device of claim 1, wherein the one or more programs include instructions for determining a route of the movement of the current location of the portable electronic device, wherein moving the current location icon along the boundary of the predefined area includes positioning the current location icon on the boundary such that the map displays more of the route to be traveled and less of the route already traveled.

10. A method, comprising:
    at a portable electronic device with a display:
      receiving location information for the portable electronic device;
      entering a tracked mode of a mapping application, the tracked mode comprising:
        displaying a map on the display with an orientation that is independent of a current orientation of the portable electronic device;
        displaying a current location icon on the map that corresponds to a current location of the portable electronic device; and
        maintaining the current location icon in a predefined area on the display as the current location of the portable electronic device changes; and moving the current location icon along a boundary of the predefined area on the display in accordance with movement of the current location of the portable electronic device.

11. A non-transitory computer readable storage medium storing one or more programs, the one or more programs comprising instructions, which when executed by a portable electronic device with a display, cause the device to:
receive location information for the portable electronic device;
enter a tracked mode of a mapping application, the tracked mode comprising:
displaying a map on the display with an orientation that is independent of a current orientation of the portable electronic device;
displaying a current location icon on the map that corresponds to a current location of the portable electronic device; and
maintaining the current location icon in a predefined area on the display as the current location of the portable electronic device changes; and
move the current location icon along a boundary of the predefined area on the display in accordance with movement of the current location of the portable electronic device.

12. A portable electronic device, comprising:
a touch screen display;
one or more processors;
memory; and
one or more programs, wherein the one or more programs are stored in the memory and configured to be executed by the one or more processors, the one or more programs including instructions for:
receiving location information for the portable electronic device; and
entering a tracked mode of a mapping application, the tracked mode comprising:
displaying a map on the display with an orientation that is independent of a current orientation of the portable electronic device;
displaying a current location icon on the map that corresponds to a current location of the portable electronic device; and
maintaining the current location icon in a predefined area on the display as the current location of the portable electronic device changes;
while in the tracked mode of the mapping application, detecting a first finger gesture on the touch screen display;
in response to detecting the first finger gesture, translating the map on the display such that the current location icon is located outside a displayed portion of the map;
detecting a second finger gesture on the touch screen display;
in response to detecting the second finger gesture, translating the map on the display such that the current location icon is redisplayed in the predefined area;
determining a first length of time when the current location icon is located outside the predefined area;
maintaining the tracked mode of the mapping application when the first length of time is less than a first predefined duration; and
exiting the tracked mode of the mapping application when the first length of time exceeds the first predefined duration.

13. The portable electronic device of claim 12, further comprising a magnetometer, wherein the one or more programs include instructions for:
entering a heading mode of the mapping application, the heading mode comprising:
displaying the map on the display with an orientation that corresponds to a current orientation of the portable electronic determined with the magnetometer;
displaying the current location icon; and
maintaining the current location icon in the predefined area on the display as the current location of the portable electronic device changes; and
while in the heading mode of the mapping application, detecting a third finger gesture on the touch screen display;
in response to detecting the third finger gesture, translating the map on the display such that the current location icon is located outside the displayed portion of the map;
detecting a fourth finger gesture on the touch screen display;
in response to detecting the fourth finger gesture, translating the map on the display such that the current location icon is redisplayed in the predefined area;
determining a second length of time when the current location icon is located outside the predefined area;
maintaining the heading mode of the mapping application when the second length of time is less than a second predefined duration; and
exiting the heading mode of the mapping application when the second length of time exceeds the second predefined duration.

14. A method, comprising:
at a portable electronic device with a touch screen display:
receiving location information for the portable electronic device; and
entering a tracked mode of a mapping application, the tracked mode comprising:
displaying a map on the display with an orientation that is independent of a current orientation of the portable electronic device;
displaying a current location icon on the map that corresponds to a current location of the portable electronic device; and
maintaining the current location icon in a predefined area on the display as the current location of the portable electronic device changes;
while in the tracked mode of the mapping application, detecting a first finger gesture on the touch screen display;
in response to detecting the first finger gesture, translating the map on the display such that the current location icon is located outside a displayed portion of the map;
detecting a second finger gesture on the touch screen display;
in response to detecting the second finger gesture, translating the map on the display such that the current location icon is redisplayed in the predefined area;
determining a first length of time when the current location icon is located outside the predefined area;
maintaining the tracked mode of the mapping application when the first length of time is less than a first predefined duration; and
exiting the tracked mode of the mapping application when the first length of time exceeds the first predefined duration.

15. The method of claim 14, wherein the device includes a magnetometer, the method including:

entering a heading mode of the mapping application, the heading mode comprising:
 displaying the map on the display with an orientation that corresponds to a current orientation of the portable electronic device with the magnetometer;
 displaying the current location icon; and
 maintaining the current location icon in the predefined area on the display as the current location of the portable electronic device changes; and
 moving the current location icon along the boundary of the predefined area on the display in accordance with the current orientation of the portable electronic and the movement of the current location of the portable electronic device.

16. The method of claim 14, wherein the predefined area is an oval-shaped area.

17. The method of claim 14, wherein moving the current location icon along the boundary of the predefined area on the display in accordance with movement of the current location of the portable electronic device includes disregarding changes in the current location of the portable electronic device that are less than a predefined amount.

18. The method of claim 14, including modifying a size of the predefined area in accordance with a speed of the movement of the current location of the portable electronic device.

19. The method of claim 14, including modifying a scale of the displayed map in accordance with a speed of the movement of the current location of the portable electronic device.

20. The method of claim 14, wherein moving the current location icon along the boundary of the predefined area on the display in accordance with movement of the current location of the portable electronic device includes displaying the current location icon at a position along the boundary such that a direction from the position of the current location icon along the boundary to a center of the predefined area corresponds to a direction of movement of the portable electronic device.

21. The method of claim 20, wherein the direction of the movement of the portable electronic device is an average direction of movement of the portable electronic device during a predefined time period.

22. The method of claim 14, including determining a route of the movement of the current location of the portable electronic device, wherein moving the current location icon along the boundary of the predefined area includes positioning the current location icon on the boundary such that the map displays more of the route to be traveled and less of the route already traveled.

23. A non-transitory computer readable storage medium storing one or more programs, the one or more programs comprising instructions, which when executed by a portable electronic device with a touch screen display, cause the device to:
 receive location information for the portable electronic device; and
 enter a tracked mode of a mapping application, the tracked mode comprising:
  displaying a map on the display with an orientation that is independent of a current orientation of the portable electronic device;
  displaying a current location icon on the map that corresponds to a current location of the portable electronic device; and
  maintaining the current location icon in a predefined area on the display as the current location of the portable electronic device changes;
 while in the tracked mode of the mapping application, detect a first finger gesture on the touch screen display;
 in response to detecting the first finger gesture, translate the map on the display such that the current location icon is located outside a displayed portion of the map;
 detect a second finger gesture on the touch screen display;
 in response to detecting the second finger gesture, translate the map on the display such that the current location icon is redisplayed in the predefined area;
 determine a first length of time when the current location icon is located outside the predefined area;
 maintain the tracked mode of the mapping application when the first length of time is less than a first predefined duration; and
 exit the tracked mode of the mapping application when the first length of time exceeds the first predefined duration.

24. The computer readable storage medium of claim 23, wherein the device includes a magnetometer, the computer readable storage medium including instructions which cause the device to:
 enter a heading mode of the mapping application, the heading mode comprising:
  displaying the map on the display with an orientation that corresponds to a current orientation of the portable electronic device with the magnetometer;
  displaying the current location icon; and
  maintaining the current location icon in the predefined area on the display as the current location of the portable electronic device changes; and
 move the current location icon along the boundary of the predefined area on the display in accordance with the current orientation of the portable electronic and the movement of the current location of the portable electronic device.

25. The computer readable storage medium of claim 23, wherein the predefined area is an oval-shaped area.

26. The computer readable storage medium of claim 23, wherein moving the current location icon along the boundary of the predefined area on the display in accordance with movement of the current location of the portable electronic device includes disregarding changes in the current location of the portable electronic device that are less than a predefined amount.

27. The computer readable storage medium of claim 23, including instructions which cause the device to modify a size of the predefined area in accordance with a speed of the movement of the current location of the portable electronic device.

28. The computer readable storage medium of claim 23, including instructions which cause the device to modify a scale of the displayed map in accordance with a speed of the movement of the current location of the portable electronic device.

29. The computer readable storage medium of claim 23, wherein moving the current location icon along the boundary of the predefined area on the display in accordance with movement of the current location of the portable electronic device includes displaying the current location icon at a position along the boundary such that a direction from the position of the current location icon along the boundary to a center of the predefined area corresponds to a direction of movement of the portable electronic device.

30. The computer readable storage medium of claim 29, wherein the direction of the movement of the portable electronic device is an average direction of movement of the portable electronic device during a predefined time period.

31. The computer readable storage medium of claim 23, including instructions which cause the device to determine a route of the movement of the current location of the portable electronic device, wherein moving the current location icon along the boundary of the predefined area includes positioning the current location icon on the boundary such that the map displays more of the route to be traveled and less of the route already traveled.

* * * * *